(12) United States Patent
Sautter et al.

(10) Patent No.: US 7,031,309 B1
(45) Date of Patent: Apr. 18, 2006

(54) USER DATA PROTOCOL FOR INTERNET DATA COMMUNICATIONS

(75) Inventors: Robert B. Sautter, Long Pond, PA (US); Charles H. Braun, Carmel, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1010 days.

(21) Appl. No.: 09/810,452

(22) Filed: Mar. 19, 2001

Related U.S. Application Data

(63) Continuation of application No. 08/950,158, filed on Oct. 14, 1997, now Pat. No. 6,233,248.

(51) Int. Cl.
*H04Q 7/00* (2006.01)

(52) U.S. Cl. .................................. 370/392
(58) Field of Classification Search .............. 370/392, 370/464, 465, 466, 467, 469, 470, 471, 472, 370/473, 474, 476, 450, 351, 352, 400, 401, 370/475, 406, 389, 398, 395.1, 396, 399, 370/390, 296; 709/238, 236; 711/162; 707/3
See application file for complete search history.

(56) References Cited

U.S. PATENT DOCUMENTS

| | | | | |
|---|---|---|---|---|
| 5,517,497 A | * | 5/1996 | Le Boudec et al. | 370/399 |
| 5,559,883 A | * | 9/1996 | Williams | 713/201 |
| 5,570,202 A | * | 10/1996 | Shishido et al. | 358/405 |
| 5,613,096 A | * | 3/1997 | Danknick | 709/236 |
| 5,809,543 A | * | 9/1998 | Byers et al. | 711/162 |
| 5,872,786 A | * | 2/1999 | Shobatake | 370/398 |
| 5,946,679 A | * | 8/1999 | Ahuja et al. | 707/3 |
| 6,233,248 B1 | * | 5/2001 | Sautter et al. | 370/465 |
| 6,269,404 B1 | * | 7/2001 | Hart et al. | 709/238 |
| 6,356,553 B1 | * | 3/2002 | Nagami et al. | 370/397 |
| 6,396,809 B1 | * | 5/2002 | Holden et al. | 370/236 |
| 6,466,608 B1 | * | 10/2002 | Hong et al. | 375/137 |

\* cited by examiner

*Primary Examiner*—Dang Ton
(74) *Attorney, Agent, or Firm*—Edell, Shapiro, Finnan LLC

(57) ABSTRACT

An improved user data protocol involves a multi-addressing capability that allows a user at a source node to address a single message to many users at respective destination nodes within a communication network. The multi-address messages that are provided to the network are inserted once at the source node, and messages routed between network nodes going to the same next node travel once across each interconnecting communication channel, thereby minimizing the communication bandwidth consumed.

33 Claims, 60 Drawing Sheets

LAYER 7 USER GENERATES A MESSAGE — | TEXT |

LAYER 6 USER ADDRESSES MESSAGE & BUILDS THE INTERNET HEADER — | HEADER | TEXT |

LAYER 5 SESSION    NOT USED (DATA GRAM SERVICE)

LAYER 4 TRANSPORT CONTROL    SEGMENTS MESSAGE INTO MULTIPLE FRAMES WHEN TEXT EXCEEDS A SINGLE FRAME SIZE, RECONSTRUCTS THE MESSAGE FROM RECEIVED FRAMES, PROVIDES AN END-TO-END WITH ITS PEER TRANSPORT LAYERS

LAYER 3A ROUTES FRAME/MESSAGE TO INTRANET STATIONS OR SELECTS FDX CIRCUIT — | INTRA HDR | CTL | HEADER | TEXT |

LAYER 3B  ROUTES THE INTRANET ADDRESSES & BUILDS THE LINK ADDRESS LIST WITH RELAYS — | LINK ADR | INTRA HDR | CTL | HEADER | TEXT |

LAYER 2 FRAME HDX BUILDS THE CONTROL FIELD, ADDS THE FCS — | FLG | LINK ADR | INTRA HDR | CTL | HEADER | TEXT | FCS | FLG |

LAYER 2 FRAME FDX BUILDS THE CONTROL & ADDRESS FIELDS, ADDS THE FCS, & PRESENTS THE FRAME TO THE LINK — | FLG | ADDRESS | CTL | HEADER | TEXT | FCS | FLG |

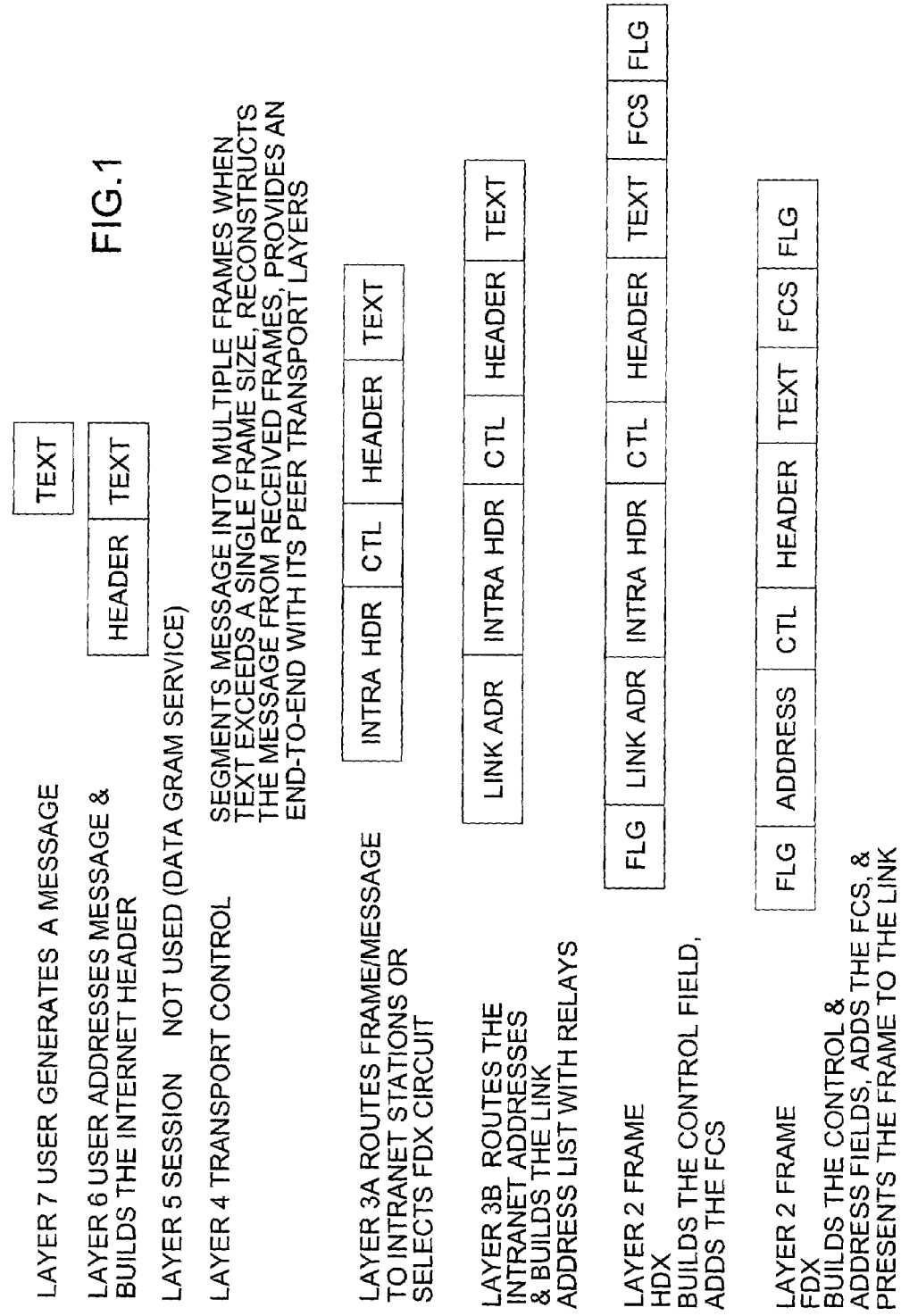

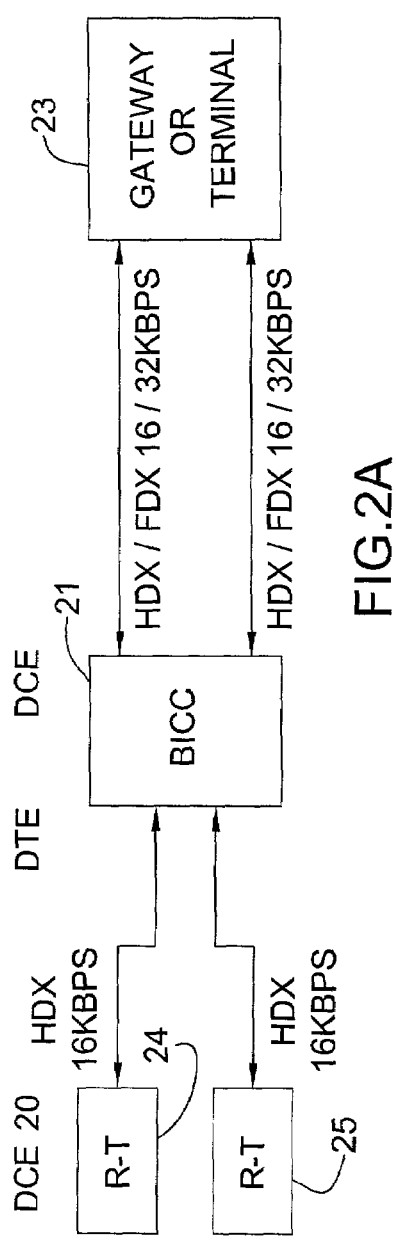
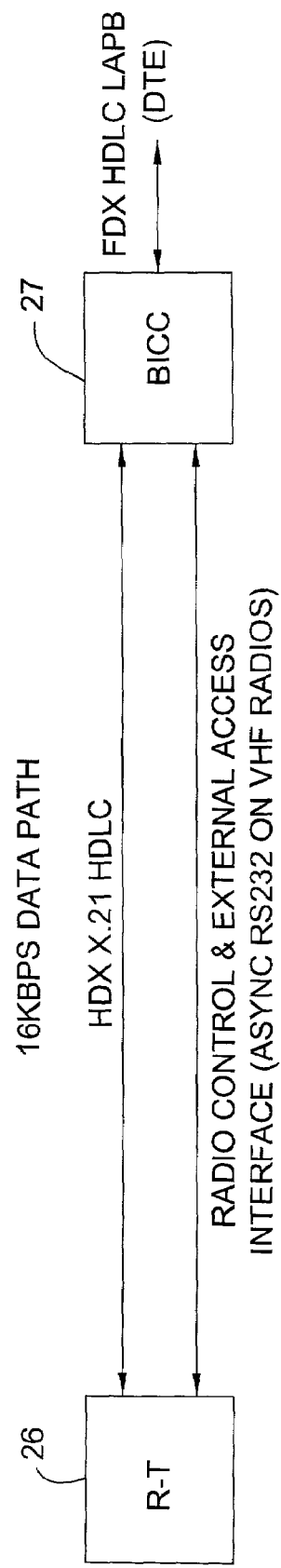
FIG.2A
FIG.2B

LAYER 1
DATA TRANSMISSION COMPONENTS

| SYNC DATA BIT STREAM (4 Octets) |
|---|
| DATA FRAME AREA<br>1 TO "N" FRAMES<br>(AND FILLER FOR THE RADIO BUFFER) |

70

SYNC DATA BIT STREAM (AT LEAST 4 HDLC FLAGS)

71

| 4 FLAG CHARACTERS (01111110011111100111111001111110) |
|---|

DATA FRAME AREA

72

| BYTE SIZE | CONTENTS |
|---|---|
| 1 | OPENING FLAG FOR FRAME #1 |
| N | DATA FRAME #1 |
| 1 | CLOSING FLAG FOR FRAME #1 |
| 1 | OPENING FLAG FOR FRAME # 2 |
| N | DATA FRAME #2 |
| 1 | CLOSING FLAG FOR FRAME #2 |
| N | PADDING/FILLER FOR THE RADIO BUFFER |

EACH DATA FRAME

73

| ADDRESS FIELD | CONTROL FIELD | INFORMATION FIELD | FCS |
|---|---|---|---|

FIG.4

| SYSTEM CLASSMARK PARAMETER | DEFAULT SETTING | PURPOSE |
|---|---|---|
| LAYER 2 FRAME SIZE | 256 OCTETS | DEFINE THE SIZE OF THE MAXIMUM LAYER 2 FRAME SIZE |
| TRANSPORT TEXT SIZE | 128 OCTETS | DEFINE THE MAXIMUM NUMBER OF OCTETS TRANSPORT MAY PUT IN A FRAME (MUST BE LESS THAN FRAME SIZE) |
| TRANSPORT WINDOW TIMER | 10 SECONDS | THE AMOUNT TIME THAT TRANSPORT WILL WAIT FOR AN ACKNOWLEDGEMENT |
| TRANSPORT ACCUMULATION TIMER | 8 SECONDS | THE AMOUNT OF TIME THE DESTINATION TRANSPORT WILL ACCUMULATE FRAME BEFORE SENDING AN ACKNOWLEDGEMENT |
| TRANSPORT MAXIMUM RE-TRANSMIT COUNT | 2 | THE MAXIMUM NUMBER OF TIME TRANSPORT WILL RE-TRANSMIT A FRAME THE MESSAGE WILL BE CANCELED IF EXCEEDED |
| TRANSPORT MAXIMUM FRAME COUNT | 80 | THE MAXIMUM NUMBER OF FRAMES TRANSPORT MAY GENERATE PER MESSAGE INPUT THE MESSAGE WILL BE CANCELED IF EXCEEDED |
| SYSTEM HIGH SECURITY CLEARANCE | SECRET | THE HIGHEST SECURITY LEVEL MESSAGE THAT CAN BE PROCESSED IN THE NETWORK. |

FIG.5

| ADDRESS | MASK VALUE HEX (3 OCTETS) | PURPOSE |
|---|---|---|
| USER CLASS I NIS MASK | 3FFF00 | ISOLATES THE NIS PORTION OF THE INTERNET ADDRESS |
| USER CLASS I CALL SIGN MASK | 0000FF | ISOLATES THE CALL SIGN PORTION OF THE INTERNET ADDRESS |
| INTERNET EQUIP CLASS 1 NIS MASK | 3FFF00 | ISOLATES THE NIS PORTION OF THE INTERNET ADDRESS |
| INTERNET EQUIP CLASS 1 CALL SIGH MASK | 0000FF | ISOLATES THE CALL SIGN PORTION OF THE INTERNET ADDRESS |
| INTERNET ADDRESS CLASS FIELD | C00000 | ISOLATES THE ADDRESS CLASS FIELD |

FIG.6

| STATION CLASSMARK PARAMETER | VALUE RANGE | DEFAULT VALUE | PURPOSE |
|---|---|---|---|
| NUMBER OF NETS | | 1 | MULTI-NET USER OR INTERNET POINT INDICATES THE NUMBER OF CLASSMARK SETS |
| NET ID | NIS | | HOME NET ID |
| LOCAL USER-ID(S) | NIS/CS | | USER-IDS ASSIGNED TO THIS STATION (UP TO 12) |
| DCE TYPE | VHF SC<br>VHF FH<br>HF SC<br>HF FH<br>BICC IP<br>BICC EA<br>BICC<br>GATEWAY IP<br>GATEWAY EA<br>GATEWAY HN | VHF FH | SPECIFY THE DCE (RADIO) TYPE. THE DCE TYPE ALSO IMPLIES ADDITIONAL STATION CAPABILITIES & RESPONSIBILITIES. NOTES:<br>SC = SINGLE CHANNEL<br>FH = FREQ HOPPING<br>IP = INTERNET POINT<br>EA = EXTERNAL ACCESS<br>HN = HOME NET |
| DTE TYPE | UDT HH<br>UDT HQ<br>MIS | UDT HH | SPECIFY THE DTE TYPE CONNECTED. NOTES:<br>HH = HAND HELD<br>HQ = HEADQUARTER |

FIG.7

| STATION VARIABLE PARAMETER | VALUE RANGE | INITIAL VALUE | PURPOSE |
| --- | --- | --- | --- |
| STATION FRAME SEQUENCE NUMBER | 0-3F (HEX) | 0 | IDENTIFIES EVERY FRAME ORIGINATED BY THIS STATION TO DETECT DUPLICATE FRAMES IN THE NETWORK |
| FRAME PROCESS LOG | 50-500 ENTRIES UPPER LIMIT SET BY THE LINK CLASSMARKS | 50 (DEFAULT) | HOLDS THE ORIGINATING STATION ADDRESS AND FRAME SEQUENCE OF THE LAST "N" FRAMES RECEIVED |

FIG.8

| LINK / NET CLASSMARK PARAMETER | VALUE RANGE | DEFAULT VALUE | PURPOSE |
|---|---|---|---|
| NET PRECEDENCE CATEGORY | LOW<br>HIGH | LOW | USED TO QUALIFY THE MESSAGE PRECEDENCE LEVEL, ie ROUTINE vs ROUTINE-LOW |
| NET CATEGORY | VOICE H<br>VOICE L<br>DATA L<br>DATA H | VOICE H | THIS IS THE PRIORITY OF THE NET. THESE VALUES ESTABLISH MAXIMUM NUMBER OF I FRAMES IN A RADIO TRANSMISSION |
| DTE TYPE | UDT HH<br>UDT HQ<br>MIS | UDT HH | SPECIFY THE DTE TYPE ASSIGNED TO THE LINK |
| DCE TYPE | VHF SC<br>VHF FH<br>HF SC<br>HF FH<br>BICC IP<br>BICC EA<br>BICC<br>GATEWAY IP<br>GATEWAY EA<br>GATEWAY HN | VHF FH | SPECIFY THE DCE (RADIO) TYPE ASSIGNED TO THE LINK. THE TYPE ALSO IMPLIES ADDITIONAL STATION CAPABILITIES & RESPONSIBILITIES.<br>NOTES:<br>SC=SINGLE CHANNEL<br>FH=FREQ HOPPING<br>IP=INTERNET POINT<br>EA=EXTERNAL ACCESS<br>HN=HOME NET |
| RELAY NET | YES / NO | NO | SPECIFIES IF THE RADIO NET IS RELAY OR ALL INFORMED MODE |
| RELAY UPDATE | YES / NO | NO | IF IN THE RELAY MODE, IS THE ROUTING TABLE UPDATE MESSAGE TO BE SENT OVER THE NET. |

FIG.9A

| LINK/NET CLASSMARK PARAMETER | VALUE RANGE | DEFAULT VALUE | PURPOSE |
|---|---|---|---|
| FRAME RETRIES | 0 TO 3 | 2 | THE MAXIMUM NUMBER OF TIME THE LINK LAYER WILL RETRANSMIT A FRAME. APPLIES TO HDX PROTOCOL ONLY. |
| RESPONSE MODE | YES/NO | YES | ENABLES THE ACKNOWLEDGEMENT OF I FRAMES. APPLIES TO HDX PROTOCOL ONLY. |
| DATA INVERT | YES/NO | NO | ENABLES THE COMPLEMENTING OF RECEIVED AND TRANSMITTED DATA TO AND FROM THE PHYSICAL INTERFACE. |
| HDX TI TIMER | 5 TO 120 SECONDS | ? | MAXIMUM TIME TP WAIT FOR AN I FRAME ACKNOWLEDGEMENT PRIOR TO RETRANSMISSION OF THE FRAME. HDX PROTOCOL ONLY. |
| NET CONTROLLERS INTERNET ADDRESS | NIS/CS | | THE INTERNET ADDRESS OF THE NET CONTROLLER. |
| MIS MANAGER'S INTERNET ADDRESS | NIS/CS | | THE INTERNET ADDRESS OF THE MIS MANAGER. |
| RADIO KEYTIME | 0 TO 5.6 SECONDS IN 0.1 INCREMENTS | 0 | RADIO KEYTLME FOR THOSE RADIOS THAT REQUIRE A KEYTIME SEQUENCE PRIOR TO DATA TRANSMISSIONS. ZERO INDICATES NO KEYTIME REQUIRED. |
| FEC | YES/NO | NO | ENABLE GOLAY 23,12 FORWARD ERROR CORRECTION (FEC) |
| TDC | YES/NO ONLY VALID IF FEC IS YES | NO | ENABLE TIME DISPERSAL CODING (TDC) 16 BY 24 OF FEC ENCODED DATA. |
| DATA RATE PHYSICAL INTERFACE | 16, 32KBPS X.21 FDX X.21 HDX ASYNCHRONOUS CDP | 16 X.21 HDX | DATA TRANSMISSION/RECEPTION RATE IN THOUSAND BITS PER SECOND PHYSICAL INTERFACE TYPE. CDP IS CONDITIONED DIPHASE. |
| FCS | 16 BIT 32 BIT NONE | 32 | FRAME CHECK SEQUENCE (FCS) 16 BIT 32 BIT, OR NONE (ASYNC I/F) |
| L2 PROTOCOL | FDX HDX (P-T-P) | HDX | SELECTS THE LAYER 2 PROTOCOL. USED FOR ASYNC & CDP I/F. |
| THIS NIS | NIS | | THIS IS THE NET ID SIGN (NIS) FOR THIS NET. |
| SIZE OF FRAME PROCESS LOG | 50-500 | 50 | THIS DEFINES THE SIZE OF THE FRAME PROCESS LOG MAINTAINED AS A DYNAMIC STRUCTURE. |

FIG.9B

FRAME FORMATS WITHOUT AN INFORMATION FIELD - HALF DUPLEX RADIO OPERATION

| FLAG | INTRANET ADDRESS FIELD | CONTROL FIELD | FCS FIELD | FLAG |
|---|---|---|---|---|
| F 01111110 | A | C | FCS | F 01111110 |
| 1 OCTET | 3 OCTETS | 1 OCTET | 2 OR 4 OCTETS | 1 OCTET |

FIG.10A

FRAME FORMATS WITH AN INFORMATION FIELD - HALF DUPLEX RADIO OPERATION

| FLAG | INTRANET ADDRESS FIELD | CONTROL FIELD | INFORMATION FIELD | FCS FIELD | FLAG |
|---|---|---|---|---|---|
| F 01111110 | A | C | INFO | FCS | F 01111110 |
| 1 OCTET | 3-18 OCTETS | 1 OCTET | N-OCTETS | 2 OR 4 OCTETS | 1 OCTET |

FIG.10B

FRAME FORMATS WITHOUT AN INFORMATION FIELD - HALF DUPLEX P-T-P OPERATION

| FLAG | INTRANET ADDRESS FIELD | CONTROL FIELD | FCS FIELD | FLAG |
|---|---|---|---|---|
| F 01111110 | A | C | FCS | F 01111110 |
| 1 OCTET | 1 OCTET | 1 OCTET | 2 OR 4 OCTETS | 1 OCTET |

FIG.10C

FRAME FORMATS WITH AN INFORMATION FIELD - HALF DUPLEX P-T-P OPERATION

| FLAG | INTRANET ADDRESS FIELD | CONTROL FIELD | INFORMATION FIELD | FCS FIELD | FLAG |
|---|---|---|---|---|---|
| F 01111110 | A | C | INFO | FCS | F 01111110 |
| 1 OCTET | 1 OCTET | 1 OCTET | N-OCTETS | 2 OR 4 OCTETS | 1 OCTET |

FIG.10D

FRAME FORMAT WITH THE LINK LAYER RELAY ADDRESS FIELD - USED IN RELAY NETS

| FLAG | ADDRESS FIELD | | CONTROL FIELD | INFORMATION FIELD | FCS FIELD | FLAG |
|---|---|---|---|---|---|---|
| | LINK LAYER RELAY ADDRESS FIELD | INTRANET ADDRESS FIELD | | | | |
| 01111110 | | | | | | 01111110 |
| 1 OCTET | N OCTETS | 3-18 OCTETS | 1 OCTET | N OCTETS | 2 OR 4 OCTETS | 1 OCTET |

FIG. 10E

| INTRANET ADDRESS FIELD | |
|---|---|
| FRAME TYPE & SEQUENCE NUMBER | ORIGINATOR'S STATION ADDRESS | DESTINATION STATION ADDRESSEE LIST (1 TO 16 ADDRESSEES) |
| 1 OCTET | 1 OCTET | 1 TO 16 OCTETS |

FIG.12

| FRAME TYPE | FRAME SEQUENCE NUMBER |
|---|---|
| 2 BIT CODE | 6 BIT BINARY NUMBER |

FIG.13

| BIT 7 | BIT 6 | BIT 5 | BIT 4 | BIT 3 | BIT 2 | BIT 1 | BIT 0 |
|---|---|---|---|---|---|---|---|
| STATION ADDRESS/NUMBER | | | | | | | LAST ADDRESS |

| CONTROL FIELD (1 OCTET) | |
|---|---|
| ACKNOWLEDGEMENT REQUIRED | ACKNOWLEDGEMENT NOT REQUIRED |
| I4 I3 I2 I1 1 0 0 0 (HEX VALUE) | I4 I3 I2 I1 0 0 0 0 (HEX VALUE) |

WHEN I4 IS SET THIS FRAME IS THE FOURTH I-FRAME IN A TRANSMISSION BLOCK
WHEN I3 IS SET THIS FRAME IS THE THIRD I-FRAME IN A TRANSMISSION BLOCK
WHEN I2 IS SET THIS FRAME IS THE SECOND I-FRAME IN A TRANSMISSION BLOCK
WHEN I1 IS SET THIS FRAME IS THE FIRST I-FRAME IN A TRANSMISSION BLOCK

WHEN I4, I3, I2, & I1 = 0000 THIS FRAME IS IN A SINGLE IFRAME TRANSMISSION BLOCK

FIG.16B

| INFORMATION FIELD (VARIABLE SIZE) 13 TO 256 OCTETS | |
|---|---|
| INTERNET HEADER (VARIABLE SIZE) 13 TO 105 OCTETS | TEXT (VARIABLE SIZE) 0 TO 243 OCTETS (MIN HEADER) 0 TO 151 OCTETS (MAX HEADER) |

| CONTROL FIELD (1 OCTET) HALF DUPLEX PROTOCOL | |
|---|---|
| RESPONSE FRAME | COMMAND FRAME |
| I4 I3 I2 I1 1 0 0 0 1 RR | 0 0 0 0 0 1 0 1 RNR<br>0 0 0 0 0 0 0 1 RR |

WHEN I4 = 1 ACKING FRAME NO. 4 IN THE BLOCK
WHEN I3 = 1 ACKING FRAME NO. 3 IN THE BLOCK
WHEN I2 = 1 ACKING FRAME NO. 2 IN THE BLOCK
WHEN I1 = 1 ACKING FRAME NO. 1 IN THE BLOCK

FRAME FORMATS WITHOUT AN INFORMATION FIELD - BASIC (modulo 8) OPERATION

| FLAG | ADDRESS | CONTROL | FCS | FLAG |
|---|---|---|---|---|
| F<br>01111110<br>1 OCTET | A<br>1 OCTET | C<br>1 OCTET | FCS<br>2/4 OCTETS | F<br>01111110<br>1 OCTET |

FIG.20B

FRAME FORMATS WITH AN INFORMATION FIELD - BASIC (modulo 8) OPERATION

| FLAG | ADDRESS | CONTROL | INFORMATION | FCS | FLAG |
|---|---|---|---|---|---|
| F<br>01111110<br>1 OCTET | A<br>1 OCTET | C<br>1 OCTET | INFO<br>N-OCTETS | FCS<br>2/4 OCTETS | F<br>01111110<br>1 OCTET |

| CONTROL BITS | BIT 7 | BIT 6 | BIT 5 | BIT 4 | BIT 3 | BIT 2 | BIT 1 | BIT 0 |
|---|---|---|---|---|---|---|---|---|
| I FORMAT | N(R) | | | P | N(S) | | | 0 |
| S FORMAT | N(R) | | | P/F | S | S | 0 | 1 |
| U FORMAT | M | M | M | P/F | M | M | 1 | 1 |

N(S) TRANSMITTER SEND NUMBER
N(R) TRANSMITTER RECEIVE NUMBER
S SUPERVISORY FUNCTION BIT
M MODIFIER FUNCTION BIT
P/F POLL BIT WHEN USED IN A COMMAND,
 FINAL BIT WHEN ISSUED AS A RESPONSE
P POLL BIT (SET)

THE FOLLOWING TABLE SPECIFIES THE S FRAME FORMAT
AND THOSE SPECIFIC FORMATS WHICH ARE
USED BY THE IMPROVED USER DATA PROTOCOL.

| CONTROL BITS | BIT 7 | BIT 6 | BIT 5 | BIT 4 | BIT 3 | BIT 2 | BIT 1 | BIT 0 |
|---|---|---|---|---|---|---|---|---|
| S FORMAT | N(R) | | | P/F | S | S | 0 | 1 |
| RR RECEIVE READY | N(R) | | | P/F | 0 | 0 | 0 | 1 |
| RNR RECEIVE NOT READY | N(R) | | | P/F | 0 | 1 | 0 | 1 |
| REJ REJECT | N(R) | | | P/F | 1 | 0 | 0 | 1 |

FIG.21

| CONTROL BITS | BIT 7 | BIT 6 | BIT 5 | BIT 4 | BIT 3 | BIT 2 | BIT 1 | BIT 0 |
|---|---|---|---|---|---|---|---|---|
| U FORMAT | M | M | M | P/F | M | M | 1 | 1 |
| UI INFORMATION | 0 | 0 | 0 | P/F | 0 | 0 | 1 | 1 |
| SABM SET ASYNCHRONOUS BALANCE MODE | 0 | 0 | 1 | P/F | 1 | 1 | 1 | 1 |
| DISC DISCONNECT COMMAND | 0 | 1 | 0 | P/F | 0 | 0 | 1 | 1 |
| SIM SET INITIALIZATION MODE | 0 | 0 | 0 | P/F | 0 | 1 | 1 | 1 |
| UA UNNUMBERED ACKNOWLEDGEMENT | 0 | 1 | 1 | P/F | 0 | 0 | 1 | 1 |
| DM DISCONNECT MODE | 0 | 0 | 0 | P/F | 1 | 1 | 1 | 1 |
| FRMR FRAME REJECT (w/ INFO FIELD) | 1 | 0 | 0 | P/F | 0 | 1 | 1 | 1 |

FIG.22

FRMR INFORMATION FIELD CODING

| COPY OF THE REJECTED CONTROL FIELD 8 BITS | SENDERS N (R) & N (S) 8 BITS | REJECT REASONS 8 BITS |
|---|---|---|

FRMR RESPONSE INFORMATION FIELD
3 OCTETS

SENDERS N (R) & N (S)

| N (R) 3 BITS | C/R | N (S) 3 BITS |
|---|---|---|

REJECT REASONS

| | | | | 0 | 0 | 0 | 0 |
|---|---|---|---|---|---|---|---|
| 0 | 0 | 0 | 0 | Z | Y | X | W |

WHERE:
W=1　IF THE REJECTED CONTROL FIELD IS INVALID OR NOT IMPLEMENTED.
X=1　IF THE REJECTED CONTROL FIELD WAS DUE TO A NON-PERMITTED INFORMATION FIELD (W IS ALSO SET TO ONE).
Y=1　IF INFORMATION FIELD EXCEEDS MAXIMUM LENGTH FOR THIS LINK.
Z=1　IF THE REJECTED CONTROL FIELD CONTAINS AN INVALID N(R) VALUE.
C/R　SET TO 1 IF REJECTED FRAME WAS A RESPONSE FRAME, AND SET TO 0 IF THE REJECTED FRAME WAS A COMMAND FRAME.

FIG.23

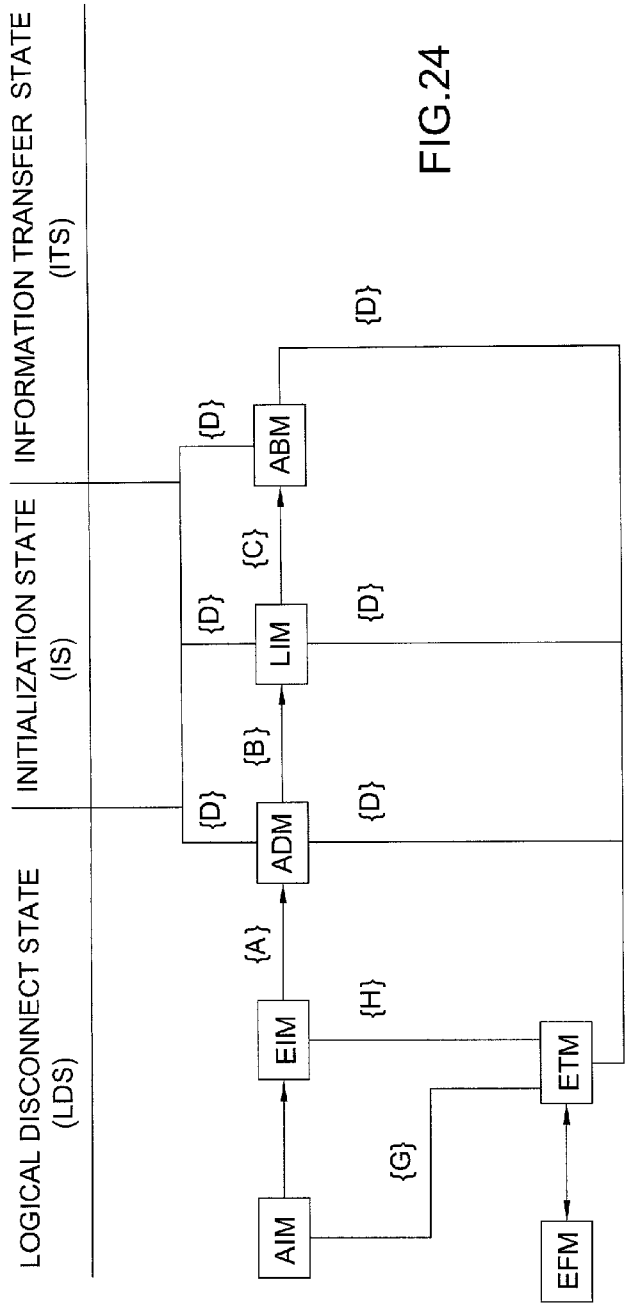

| RECEIVED FRAME | STATION STATE | | | | | |
|---|---|---|---|---|---|---|
| | ADM OF LDS | | LIM OF IS | | ABM OF ITS | |
| | SEND | FINAL STATE | SEND | FINAL STATE | SEND | FINAL STATE |
| SIM | UA | LIM | UA | LIM | DM | ADM |
| DISC | UA | ETM | UA | ETM | UA | ETM |
| UI | DM | ADM | UA | LIM | UA | ABM |
| SABM | DM | ADM | UA | ABM | UA | ABM |
| I FRAME | DM | ADM | NONE | LIM | N (R) | ABM |

FIG. 25

| BIT/BYTE | 7 | 6 | 5 | 4 | 3 | 2 | 1 | 0 |
|---|---|---|---|---|---|---|---|---|
| 00 | EOM | FRAME SEQUENCE NUMBER ||||||| 
| 01 | ORIGINATORS INTERNET ADDRESS ||||||||
| 02 | ||||||||
| 03 | ||||||||
| 04 | MSN #1 |||| MSN #2 ||||
| 05 | MSN #3 |||| MSN #4 ||||
| 06 | PRECEDENCE |||| SECURITY ||||
| 07 | MESSAGE TYPE/PROTOCOL ||||||||
| 08 | MAXIMUM HOP COUNT ||||||||
| 09 | DESTINATION ADDRESSEE STATUS BYTE ||||||||
|  | DEL | EXTEND | U | EOR | X | A1 | A2 | A3 |
| 10 | DESTINATION ADDRESSEE BASIC INTERNET ADDRESS ||||||||
| 11 | ||||||||
| 12 | ||||||||
| 13 | DESTINATION ADDRESSEE STATUS BYTE ||||||||
|  | DEL | EXTEND | U | EOR | X | A1 | A2 | A3 |
| 14 | DESTINATION ADDRESSEE EXTENDED INTERNET ADDRESS ||||||||
| 15 | ||||||||
| 16 | ||||||||
| 17 | ||||||||
| 18 | ||||||||

FIG.26

INTERNET HEADER ELEMENTS

| INFORMATION ELEMENT | BIT REPRESENTATION | CHARACTER REPRESENTATION |
|---|---|---|
| EOM STATUS | MSB = 1, LAST FRAME | |
| FRAME SEQUENCE NUMBER 01-127 | 7 BINARY BIT VALUE | 3 NUMERIC CHARACTERS 001-127 |
| ORIGINATOR'S INTERNET ADDRESS (USER-ID) | 3 BYTES<br>XX = NIS ID<br>Z = CALL SIGN | TRANSLATED TO A SYMBOLIC OR USE THE XX/Z FORMAT |
| MESSAGE SERIAL NUMBER 0000-9999 | 4 BCD (4 BIT DIGITS) | 4 NUMERIC CHARACTERS 0000-9999 |
| MESSAGE PRECEDENCE<br>  NETCON<br>  FLASH (HIGH)<br>  FLASH (LOW)<br>  PRIORITY (HIGH)<br>  PRIORITY (LOW)<br>  ROUTINE (HIGH)<br>  ROUTINE (LOW) | 4 BIT CODE<br>0000<br>0001<br>0010<br>0011<br>0100<br>0101<br>0110 | 1 ALPHA CHARACTER<br>N<br>F<br>F<br>P<br>P<br>R<br>R |
| MESSAGE SECURITY<br>  TOPSECRET<br>  SECRET<br>  CONFIDENTIAL<br>  RESTRICTED<br>  UNCLASS | 4 BIT CODE<br>1000<br>0100<br>0011<br>0010<br>0001 | 1 ALPHA CHARACTER<br>T<br>S<br>C<br>R<br>U |
| MESSAGE TYPE OR PROTOCOL | 8 BIT CODE | SEE THE MESSAGE TYPE/PROTOCOL TABLE |
| MAXIMUM HOP COUNT | 8 BIT BINARY | MAXIMUM NUMBER OF INTERNET HOPS TRANSMISSION |
| DESTINATION STATUS | 8 BIT CODE | SEE STATUS TABLE |
| DESTINATION INTERNET ADDRESS (USER-ID)<br>XXZ<br><br>YYXXZ | 3 BYTES OR 5 BYTES<br>XX = NIS ID<br>Z = CALL SIGN<br>YY = ATTACHED NIS<br>XXZ = ORIG USER-ID | TRANSLATED TO A SYMBOLIC OR<br>XX/Z<br><br>YY:XX/Z |

FIG.27

MESSAGE TYPE/PROTOCOL TABLE

| MESSAGE TYPE PROTOCOL | VALUE | DESCRIPTION |
|---|---|---|
| INTERNET CONTROL | 00-20 | RANGE OF INTERNET CONTROL MESSAGE PROTOCOL MESSAGE TYPES |
| SYSCON MESSAGES | 21-40 | RANGE OF SYSTEM CONTROL MESSAGES |
| USER DEFINED MESSAGE FORMATS | 41-60 | RANGE OF USER DEFINED MESSAGE FORMATS. THE FOLLOWING VALUES HAVE BEEN ASSIGNED; 41, & 42. THESE VALUES ARE ASSIGNED TO THE USERS END-TO-END ACKNOWLEDGEMENT AND MESSAGE NON DELIVERY NOTIFICATION. |
| ENCAPSULATED PROTOCOLS | 61-80 | RANGE OF PROTOCOL WHICH CAN BE ENCAPSULATED BY THE BOWMAN USER DATA PROTOCOL. THESE PROTOCOLS USE THE BUDP FOR BACKBONE SERVICES TO CONNECT THEIR "OWN NETWORK" NODES OR TO EXTEND THE RANGE OF THEIR "HOST SYSTEMS." |

FIG.28

SYSCON MESSAGE TYPES

| SYSCON MESSAGE | MESSAGE TYPE VALUE | DESCRIPTION |
|---|---|---|
| SYSCON DIRECTIVES | 21 | THIS MESSAGE CONTAINS A SYSCON DIRECTIVE. THE TEXT HEADER SPECIFIES THE DIRECTIVE TYPE AND THE TEXT CONTAINS THE DIRECTIVE TEXT. |
| STSCON ALARM & NOTIFICATIONS | 22 | THIS MESSAGE CONTAINS AN ALARM OR NOTIFICATION. THE TEXT HEADER SPECIFIES THE TYPE. |
| SYSCON REPORTS | 23 | THIS MESSAGE CONTAINS A SYSCON REPORT. THE TEXT HEADER SPECIFIES THE REPORT TYPE. |
| SYSCON ACKNOWLEDGEMENT | 24 | THIS MESSAGE CONTAINS A SYSCON ACKNOWLEDGEMENT. THE TEXT HEADER SPECIFIES THE ACKNOWLEDGEMENT TYPE. |

FIG.29

ICMP MESSAGE TYPES

| ICMP MESSAGE | MESSAGE TYPE VALUE | DESCRIPTION |
|---|---|---|
| TRANSPORT ACKNOWLEDGEMENT | 01 | TRANSMITTED BY THE DESTINATION TRANSPORT TO THE ORIGINATING TRANSPORT SPECIFYING THE FRAMES RECEIVED FOR THE SPECIFIED DESTINATION ADDRESSEE(s) |
| LINK CONGESTION CONTROL NOTIFICATION (LCCN) | 02 | SENT TO RESTRICT/RESUME THE SPECIFIED PRECEDENCE INTERNET TRAFFIC |
| NET CONGESTION CONTROL NOTIFICATION | 03 | SENT TO RESTRICT/RESUME THE SPECIFIED PRECEDENCE NET TRAFFIC |
| INTERNET NODE QUERY MESSAGE | 04 | MESSAGE SENT/RECEIVED BETWEEN INTERNET NODES TO DETERMINE/MAINTAIN COMMUNICATION CAPABILITIES |
| INTERNET STSTUS REPORT | 05 | REPORT SENT TO THE NET CONTROLLER CONTAINING INTERNET NODE STATUS AND TRAFFIC METERS |
| INTERNET NODE FAILURE/RECOVERY NOTIFICATION | 06 | SENT TO INTERNET NODES REPORTING EITHER A FAILURE OR RECOVERY OF ANOTHER INTERNET NODE |
| USER REGISTRSTION MESSAGES | 07 | SENT BETWEEN NET CONTROLLERS AND GATEWAYS WHEN A USER REGISTERS IN A NET. THIS MESSAGE CAUSES THE NET MEMBERS LIST IN THE AFFECTED NETS TO BE MODIFIED. |

FIG.30

USER DEFINED MESSAGE TYPES

| USER DEFINED MESSAGE | MESSAGE TYPE VALUE | DESCRIPTION |
|---|---|---|
| USER ACKNOWLEDGEMENT | 41 | THE ACKNOWLEDGEMENT SENT TO THE ORIGINATOR OF A MESSAGE INDICATING THE ACKNOWLEDGEMENT TYPE IN THE TEXT HEADER |
| MESSAGE NON DELIVERY NOTIFICATION | 42 | MESSAGE SENT TO THE ORIGINATOR WHICH SPECIFIES THE ADDRESSES WHICH WERE NOT DELIVERED, WITH A REASON CODE. |

FIG.31

USER ACKNOELEDGEMENT TEXT HEADER

| TEXT HEADER ELEMENT | VALUE/RANGE | DESCRIPTION |
|---|---|---|
| ACKNOWLEDGEMENT TYPE | RECEIVED<br>READ<br>PRINTED | ACK FOR MSG RECEIVED<br>ACK FOR MSG READ<br>ACK FOR MSG PRINTED |

ENCAPSULATED PROTOCOLS

| ENCAPSULATED PROTOCOL | MESSAGE VALUE TYPE | DESCRIPTION |
|---|---|---|
| X.25 PACKET LAYER | 61 | AN X.25 PACKET FOLLOWS THE INTERNET HEADER. THE X.25 PACKET HEADER SPECIFIES THE PACKET TYPES: CALL REQUEST, CONFIRM, CLEAR, AND DATA PACKETS. |
| MIL-STD-1777 INTERNET PROTOCOL HEADER | 62 | A MIL-STD-1777 IP HEADER FOLLOWS THE IUDP INTERNET HEADER. THE MIL-STD-1777 IP HEADER DEFINES THE NEXT PROTOCOL LAYER |
| MIL-STD-1778 TRANSMISSION CONTROL PROTOCOL | 63 | THE MIL-STD-1778 TCP HEADER FOLLOWS THE IUDP INTERNET HEADER. (IN THIS CASE TCP IS OVER THE IUDP INTERNET DATA GRAM SERVICE) THE MIL-STD-1778 TCP HEADER DEFINES THE NEXT PROTOCOL LAYERS. |
| MARINE CORPS MODE VII LOOP PROTOCOL | 64 | THE MODE VII TACTICAL HEADER FOLLOWS THE IUDP INTERNET HEADER. THE MESSAGE TYPE FIELD IN THE TACTICAL HEADER SPECIFIES THE MESSAGE FORMAT AND CONTENT. |
| MARINE CORPS MODE VII TRUNK PROTOCOL | 65 | THE MODE VII NETWORK HEADER FOLLOWS THE IUDP INTERNET HEADER, WHICH IS FOLLOWED BY THE TACTICAL HEADER. |

STATUS BYTE TABLE

| STATUS/BYTE NAME | BIT POSITION | MEANING |
|---|---|---|
| DEL | 7 | WHEN SET, INDICATES THAT THIS ADDRESSEE HAS BEEN DELIVERED |
| EXTEND | 6 | WHEN SET, INDICATES THAT THIS ADDRESSEE IS AN EXTENDED ADDRESS (5 BYTES) WHEN RESET, INDICATES THAT THIS ADDRESSEE IS A BASIC ADDRESS (3 BYTES) |
| U | 5 | USER DEFINED |
| EOR | 4 | END OF ROUTING BIT WHEN SET, INDICATES THAT THIS IS THE LAST ADDRESSEE IN THE INTERNET HEADER |
| X | 3 | NOT ASSIGNED |
| A1 | 2 | USER ACKNOWLEDGEMENT 1 REQUIRED WHEN SET. ACKNOWLEDGE ON MESSAGE RECEIPT |
| A2 | 1 | USER ACKNOWLEDGEMENT 2 REQUIRED WHEN SET. ACKNOWLEDGE WHEN MESSAGE IS READ |
| A3 | 0 | USER ACKNOWLEDGEMENT 3 REQUIRED WHEN SET. ACKNOWLEDGE WHEN MESSAGE IS PRINTED |

FIG.35

BASIC ADDRESS ENTRY

|       | 7 | 6 | 5 | 4 | 3 | 2 | 1 | 0 |
|-------|---|---|---|---|---|---|---|---|
| BYTE 0 | STATUS |||||||||
| BYTE 1 | X |||||||||
| BYTE 2 | X |||||||||
| BYTE 3 | Z |||||||||

FIG. 36

EXTENDED ADDRESS ENTRY

|       | 7 | 6 | 5 | 4 | 3 | 2 | 1 | 0 |
|-------|---|---|---|---|---|---|---|---|
| BYTE 0 | STATUS |||||||||
| BYTE 1 | Y |||||||||
| BYTE 2 | Y |||||||||
| BYTE 3 | X |||||||||
| BYTE 4 | X |||||||||
| BYTE 5 | Z |||||||||

FIG. 37

| INTERNET ADDRESS 3 OCTETS |||
|---|---|---|
| CLASS CODES | NIS | CALL SIGN |

FIG. 38

ICMP MESSAGE TYPES

| ICMP MESSAGE | MESSAGE TYPE VALUE | DESCRIPTION |
|---|---|---|
| TRANSPORT ACKNOWLEDGEMENT | 01 | TRANSMITTED BY THE DESTINATION TRANSPORT TO THE ORIGINATING TRANSPORT SPECIFYING THE FRAMES RECEIVED FOR THE SPECIFIED DESTINATION ADDRESSEE(S) |
| LINK CONGESTION CONTROL NOTIFICATION (LCCN) | 02 | SENT TO RESTRICT / RESUME THE SPECIFIED PRECEDENCE INTERNET TRAFFIC |
| NET CONGESTION CONTROL NOTIFICATION | 03 | SENT TO RESTRICT / RESUME THE SPECIFIED PRECEDENCE NET TRAFFIC |
| INTERNET NODE QUERY MESSAGE | 04 | MESSAGE SENT/RECEIVED BETWEEN INTERNET NODES TO DETERMINE / MAINTAIN COMMUNICATION CAPABILITIES |
| INTERNET STATUS REPORT | 05 | REPORT SENT TO THE NET CONTROLLER CONTAINING INTERNET NODE STATUS AND TRAFFIC METERS |
| INTERNET NODE FAILURE/RECOVERY NOTIFICATION | 06 | SENT TO INTERNET NODES REPORTING EITHER A FAILURE OR RECOVERY OF ANOTHER INTERNET NODE |
| USER REGISTRATION MESSAGES | 07 | SENT BETWEEN NET CONTROLLERS AND GATEWAYS WHEN A USER REGISTERS IN A NET. THIS MESSAGE CAUSES THE NET MEMBERS LIST IN THE AFFECTED NETS TO BE MODIFIED |

TRANSPORT ACKNOWLEDGEMENT MESSAGE

| MESSAGE ELEMENT | VALUE/RANGE | DESCRIPTION |
|---|---|---|
| NUMBER OF INTERNET ADDRESSES ACKNOWLEDGING | 1 TO 16 | EACH DESTINATION TRANSPORT CONTROL CAN ACKNOWLEDGE FOR UP TO 16 DESTINATION ADDRESSEES |
| ACKNOWLEDGEMENT STATUS | ACK LAST ACK ABORT | THIS FIELD SPECIFIES THE TYPE OF ACKNOWLEDGEMENT. ACK INDICATES THAT THE DESTINATION WILL ACCEPT RE-TRANSMITTED FRAMES, LAST ACK INDICATES A COMPLETE MESSAGE HAS BEEN RECEIVED, & ABORT SPECIFIES THE FRAMES THAT WERE RECEIVED BUT THE DESTINATION WILL NOT ACCEPT ANY MORE FRAMES FOR THIS MESSAGE. |
| FRAME NUMBER BIT MAP | 16 OCTET BIT MAP FOR 127 BITS | THIS BIT MAP REPRESENTS EACH FRAME OF A MULTI-FRAME MESSAGE. THE FRAME NUMBER RANGES FROM 1 TO 127. THE BIT MAP USES ONE BIT PER FRAME NUMBER (127 BITS) IN A 16 OCTET FIELD. THE MSB REPRESENTS FRAME 1 AND THE LSB REPRESENTS FRAME 127. |
| DESTINATION ADDRESS 1 | BASIC INTERNET ADDRESS | THIS FIELD INDICATED THE FIRST DESTINATION ADDRESS THAT IS ACKNOWLEDGING THE FRAMES AS SPECIFIED ABOVE. |
| DESTINATION ADDRESS "N" | BASIC INTERNET ADDRESS | THIS FIELD INDICATED THE "N"th DESTINATION ADDRESS THAT IS ACKNOWLEDGING THE FRAMES AS SPECIFIED ABOVE. |

LCCN MESSAGE

| MESSAGE ELEMENT | VALUE / RANGE | DESCRIPTION |
|---|---|---|
| RESTRICTING ROUTINE PRECEDENCE TRAFFIC | TRUE / FALSE | TRUE INDICATES THAT THIS PRECEDENCE IS BEING RESTRICTED |
| RESTRICTING PRIORITY PRECEDENCE TRAFFIC | TRUE / FALSE | TRUE INDICATES THAT THIS PRECEDENCE IS BEING RESTRICTED |
| RESTRICTING FLASH PRECEDENCE TRAFFIC | TRUE / FALSE | TRUE INDICATES THAT THIS PRECEDENCE IS BEING RESTRICTED |

FIG.41

NCCN MESSAGE

| MESSAGE ELEMENT | VALUE / RANGE | DESCRIPTION |
|---|---|---|
| RESTRICTING ROUTINE PRECEDENCE TRAFFIC | TRUE / FALSE | TRUE INDICATES THAT THIS PRECEDENCE IS BEING RESTRICTED |
| RESTRICTING PRIORITY PRECEDENCE TRAFFIC | TRUE / FALSE | TRUE INDICATES THAT THIS PRECEDENCE IS BEING RESTRICTED |
| RESTRICTING FLASH PRECEDENCE TRAFFIC | TRUE / FALSE | TRUE INDICATES THAT THIS PRECEDENCE IS BEING RESTRICTED |

FIG.42

TABLE ICMP STATUS REPORT TEXT HEADER

| FIELD | VALUE / RANGE | DESCRIPTION |
|---|---|---|
| REPORT ID | INTERNET STATUS ROUTE REPORT | IDENTIFIES THE SPECIFIC REPORT |

FIG.43

TABLE REPORT TEXT

| FIELD | VALUE / RANGE | DESCRIPTION |
|---|---|---|
| REPORT TEXT | VARIABLE | ACTUAL REPORT TEXT |

FIG.44

TABLE INTERNET STATUS REPORT FORMAT

| FIELD | VALUE / RANGE | DESCRIPTION |
|---|---|---|
| NET IDENTIFIER | 0 - 64K | THIS IS THE NET IDENTIFIER FOR THE INTERNET INTERFACE BEING REPORTED. |
| NUMBER OF FRAMES TRANSMITTED | 0 - 64K | THE NUMBER OF INTERNET FRAMES TRANSMITTED INTO THE NET |
| NUMBER OF FRAMES RECEIVED | 0 - 64K | THE NUMBER OF INTERNET FRAMES RECEIVED FROM THE NET. |
| AVERAGE NUMBER OF FLASH FRAMES IN QUEUE | 0 - 64K | THE AVERAGE NUMBER OF FLASH FRAMES WAIT TO BE TRANSMITTED. SAMPLES TAKEN EVERY "N" SECOND, TOTAL DIVIDED BY THE NUMBER OF SAMPLES. |
| AVERAGE NUMBER OF PRIORITY FRAMES IN QUEUE | 0 - 64K | THE AVERAGE NUMBER OF PRIORITY FRAMES WAIT TO BE TRANSMITTED. SAMPLES TAKEN EVERY "N" SECOND, TOTAL DIVIDED BY THE NUMBER OF SAMPLES. |
| AVERAGE NUMBER OF ROUTINE FRAMES IN QUEUE | 0 - 64K | THE AVERAGE NUMBER OF ROUTINE FRAMES WAIT TO BE TRANSMITTED. SAMPLES TAKEN EVERY "N" SECOND, TOTAL DIVIDED BY THE NUMBER OF SAMPLES. |
| PEAK NUMBER OF FLASH FRAMES IN QUEUE | 0 - 64K | THE HIGHEST NUMBER OF FRAMES IN QUEUE PER SAMPLE PERIOD. |
| PEAK NUMBER OF PRIORITY FRAMES IN QUEUE | 0 - 64K | THE HIGHEST NUMBER OF FRAMES IN QUEUE PER SAMPLE PERIOD. |
| PEAK NUMBER OF ROUTINE FRAMES IN QUEUE | 0 - 64K | THE HIGHEST NUMBER OF FRAMES IN QUEUE PER SAMPLE PERIOD. |
| NET OCCUPANCY | 0 - 100% | THE PERCENTAGE OF TIME THE NET IS BUSY IN A REPORT PERIOD. |
| NEXT NET IDENTIFIER | NIS NULL | THE NEXT NET IDENTIFIER FOR THE INTERNET INTERFACE BEING REPORTED OR NULL FOR END OF REPORT |
| SAME DATA AS ABOVE FOR THE NEXT NIS | | |

FIG.45

TABLE INTERNET ROUTE REPORT TEXT

| FIELD | VALUE / RANGE | DESCRIPTION |
|---|---|---|
| NIS (ROUTE) | NIS<br>NULL | THIS IS THE NIS (ROUTE) BEING REPORTED. NULL INDICATES THE END OF THE REPORT. |
| USAGE FLAG | YES / NO | INDICATES IF THE ROUTE HAS BEEN USED. |
| FRAME COUNT | 0 - 64K | THE NUMBER OF FRAME THAT USED THIS ROUTE SINCE THE LAST REPORT. |

FIG.46

| FIELD | VALUE / RANGE | DESCRIPTION |
|---|---|---|
| REGISTRATION MESSAGE ID | REGISTRATION DE-REGISTRATION CHANGE REGISTRATION | THIS IS THE ACTUAL DIRECTIVE IDENTIFICATION |
| DATA BASE SELECTED | i.e. NET "A"'s DATA BASE | SPECIFIES THE DATA BASE THAT THIS REGISTRATION IS TO BE APPLIED (NET MEMBERS LIST) |
| USER'S USER-ID | USER-ID (NIS / CS) | THE USER-ID OF THE USER REGISTERING |
| NEW NIS | NULL NIS | EITHER NULL OR THE NEW OUT-OF-NET NIS WHERE THE USER IS NOW REGISTERED |

FIG.47

| SYSCON MESSAGE | MESSAGE TYPE VALUE | DESCRIPTION |
|---|---|---|
| SYSCON DIRECTIVES | 21 | THIS MESSAGE CONTAINS A SYSCON DIRECTIVE. THE TEXT HEADER SPECIFIES THE DIRECTIVE TYPE, AND THE TEXT CONTAINS THE DIRECTIVE TEXT. |
| SYSCON ALARMS & NOTIFICATIONS | 22 | THIS MESSAGE CONTAINS AN ALARM OR NOTIFICATION. THE TEXT HEADER SPECIFIES THE ALARM OR NOTIFICATION TYPE. |
| SYSCON REPORTS | 23 | THIS MESSAGE CONTAINS A SYSCON REPORT. THE TEXT HEADER SPECIFIES THE REPORT TYPE. THE TEXT AREA CONTAINS THE ACTUAL REPORT TEXT. |
| SYSCON ACKNOWLEDGEMENTS | 24 | THIS MESSAGE CONTAINS A SYSCON ACKNOWLEDGEMENT. THE TEXT HEADER SPECIFIES THE ACKNOWLEDGEMENT CLASS (POS OR NEG) IN ADDITION TO THE ACKNOWLEDGEMENT TYPE (DIRECTIVE RECEIPT / IMPLEMENTED, ETC.) |

FIG.48

SYSCON DIRECTIVE TEXT HEADER

| FIELD | VALUE / RANGE | DESCRIPTION |
|---|---|---|
| DIRECTIVE ID | i.e. UPDATE NET MEMBERS LIST | THIS IS THE ACTUAL DIRECTIVE IDENTIFICATION |
| NUMBER OF OPERATIONS IN THIS MESSAGE | 1 TO N | THIS FIEL SPECIFIES THE NUMBER OF OPERATIONS FOR THE DIRECTIVE ID IN THIS SYSCON MESSAGE. THE DIRECTIVES ARE IN THE DIRECTIVE TEXT FIELD. |
| DATA BASE SELECTED | i.e. NET "A"'s DATA BASE | SPECIFIES THE DATA BASE THAT THIS DIRECTIVE IS TO BE APPLIED |

FIG.49

DIRECTIVE TEXT

| FIELD | VALUE / RANGE | DESCRIPTION |
|---|---|---|
| DIRECTIVE OPERATION | ADD / CHANGE<br>DELETE<br>PURGE / RESET | ADD OR CHANGE A RECORD<br>DELETE A RECORD<br>DELETE ALL RECORDS |
| DIRECTIVE ARGUMENTS | VARIABLE | RECORD KEY, FOLLOWED BY THE ADD / CHG DATA IF APPLICABLE |
| NEXT DIRECTIVE OPERATION | ADD / CHANGE<br>DELETE<br>PURGE / RESET | ADD OR CHANGE A RECORD<br>DELETE A RECORD<br>DELETE ALL RECORDS |
| NEXT DIRECTIVE ARGUMENTS | VARIABLE | RECORD KEY, FOLLOWED BY THE ADD / CHG DATA IF APPLICABLE |

FIG.50

SYSCON ALARMS & NOTIFICATION TEXT HEADER

| FIELD | VALUE / RANGE | DESCRIPTION |
|---|---|---|
| ALARM OR NOTIFICATION ID | i.e. 'INTERNET OVERLOAD" | IDENTIFIES THE SPECIFIC ALARM OR NOTIFICATION |

FIG. 51

ALARM & NOTIFICATION TEXT

| FIELD | VALUE / RANGE | DESCRIPTION |
|---|---|---|
| ALARM / NOTIFICATION TEXT | VARIABLE | ACTUAL ALARM OR NOTIFICATION TEXT |

FIG. 52

SYSCON REPORT TEXT HEADER

| FIELD | VALUE / RANGE | DESCRIPTION |
|---|---|---|
| REPORT ID | i.e. "INTERNET LINK USAGE REPORT" | IDENTIFIES THE SPECIFIC REPORT |

FIG.53

REPORT TEXT

| FIELD | VALUE / RANGE | DESCRIPTION |
|---|---|---|
| REPORT TEXT | VARIABLE | ACTUAL REPORT TEXT |

FIG.54

SYSCON ACKNOWLEDGEMENT TEXT HEADER

| FIELD | VALUE / RANGE | DESCRIPTION |
|---|---|---|
| ACKNOWLEDGEMENT ID | RECEIVED<br>IMPLEMENTED<br>NOT IMPLEMENTED | IDENTIFIES THE SPECIFIC ACKNOWLEDGEMENT TYPE |

FIG.55

ACKNOWLEDGEMENT TEXT

| FIELD | VALUE / RANGE | DESCRIPTION |
|---|---|---|
| DIAGNOSTIC CODE | VARIABLE | REASON WHY DIRECTIVE WAS NOT IMPLEMENTED |

FIG.56

| INTERNET HEADER FOR LAYERS FOUR AND BELOW | FRAME NUMBER & EOM FLAG | | INTERNET HEADER FOR THE PRESENTATION LAYER |
|---|---|---|---|
| | ORIGINATOR ADDRESS | | |
| | MESSAGE SEQUENCE NUMBER | | |
| | PRECEDENCE | | |
| | SECURITY | | |
| | HOP COUNT | | |
| | DESTINATION ADDRESSES | | |
| | GPS POSITION | USER POSITION DATA | |
| | TIME | | |

FIG.57

STATE 1

DTE ——— READY ——— DCE
C = OFF
I = OFF

STATE 13S                    STATE 13R

SEND                         RECEIVE
C = ON                       C = OFF
I = OFF                      I = ON

STATE 13

DCE ——— READY ——— DTE
C = ON
I = ON

COLLISION, DROP TX IN FAVOR OF RX

DTE                          DCE

PULSE TX        85           PULSE RX
DATA ON t                    DATA ON r
CLOCKS ON                    CLOCKS ON

NOTE: C = CONTROL INTERCHANGE CIRCUIT
      I = INDICATION INTERCHANGE CIRCUIT
      t = TRANSMIT DATA CIRCUIT
      r = RECEIVE DATA CIRCUIT
      OFF = BINARY 1        ON = BINARY 0
      CLOCKS ON = CLOCKS PRESENT FROM THE DCE

FIG.58

| IUDP FRAME's INFORMATION FIELD | | |
|---|---|---|
| IUDP INTERNET HEADER MESSAGE TYPE / PROTOCOL=62 | MIL-STD-1777 IP PACKET | |
| | MIL-STD-1777 IP HEADER "PROTOCOL" FIELD INDICATES THE NEXT PROTOCOL HEADER | AS SPECIFIED BY THE SECONDARY HEADER |
| | NEXT PROTOCOL AS SPECIFIED BY THE 1777 IP HEADER | |

THE MIL-STD-1777 IP "PROTOCOL" FIELD CAN SPECIFY THE NEXT LAYERS TO BE:

MIL-STD-1778 TRANSMISSION CONTROL PROTOCOL (TCP)
MIL-STD-1777 INTERNET CONTROL MESSAGE PROTOCOL (ICMP)
MIL-STD-XXXX. USER DATAGRAM PROTOCOL

NOTE: THIS IS NOT AN ALL INCLUSIVE LIST OF PROTOCOLS TRANSFERRED BY THE MIL-STD-1777 IP.

FIG.62

| IUDP FRAME's INFORMATION FIELD | | |
|---|---|---|
| IUDP INTERNET HEADER MESSAGE TYPE / PROTOCOL=63 | MIL-STD-1778 INFORMATION PACKET | |
| | MIL-STD-1778 TCP HEADER "PROTOCOL" FIELD INDICATES THE NEXT PROTOCOL HEADER | NEXT PROTOCOL AS SPECIFIED BY THE 1778 TCP HEADER | AS SPECIFIED BY THE SECONDARY HEADER |

THE MIL-STD-1778 TCP HEADER SPECIFIES THE NEXT LAYER PROTOCOL. TWO OF THESE PROTOCOLS ARE LISTED BELOW.
IT SHOULD BE NOTED THAT IN THIS EXAMPLE THE IUDP IS USED AS THE DATA GRAM SERVICE (NETWORK LAYER) INSTEAD OF THE MIL-STD-1777 INTERNET PROTOCOL.

MIL-STD-1780 FILE TRANSFER PROTOCOL
MIL-STD-1781 SIMPLE MAIL TRANSFER PROTOCOL

FIG.63

USER DATA PROTOCOL FOR INTERNET DATA COMMUNICATIONS

CROSS REFERENCE TO RELATED APPLICATION

This application is a continuation application of U.S. patent application Ser. No. 08/950,158, entitled "Improved User Data Protocol for Internet Data Communications", filed Oct. 14, 1997 now U.S. Pat. No. 6,233,248. The disclosure of the foregoing patent application is incorporated herein by reference in its entirety.

FIELD OF THE INVENTION

This invention relates to an improved user data protocol for Internet data communications and more particularly to a user data protocol which enables communications between computer systems and further enables data communications across radio networks and packet switching nodes.

BACKGROUND OF THE INVENTION

As is well known, two computer systems can communicate successfully if they recognize and utilize the same set of communicaion protocols. Therefore, if computers manufactured by different entities each use a different set of communication protocols designed by their manufactureres, these computers will not be able to communicate. A computer in principle could be provided with techniques for translating protocols, but it becomes extremely burdensome for such a computer to operate.

As one will ascertain, most computers manufactured by any entitiy can gain access to the Internet or gain access to various other networks. The Internet commonly uses a standard protocol for interface which is referred to as the TCP/IP protocol which stands for Transmission Control Protocol/Internet Working Protocol. A relatively standard protocol is indicated as the OSI/ISO model. The term OSI stands for open system interconnection and this was formulated to create a single set of standard protocols operating on the best features of existing practice. Therefore, use of an OSI protocol opens the possibility of communication between any two computer systems regardless of their origin.

The OSI standards define only the protocols between systems and do not constrain the internal structures of the systems that use them. This would limit the freedom of the computer manufacturers to improve their designs. Thus, the same protocol may be used to convey information between systems with totally different internal structures and user interfaces. In testing that a system conforms to the published standard, only the data that flows between computers is considered. As one will understand, the OSI reference model divides the process of communication into a number of functional layers, splitting it into pieces that are small enough to handle and specify separately. The layers build up from the underlying electrical signals transmitted to a much more abstract description of the user activity that exploits the communication. Two types of standards are defined for each layer. The first is a service definition which states what the layer does on behalf of the layers above so that higher layers are shielded from lower layer detail. The second is the protocol specification which sets out how the layer performs its function and achieves the service by defining the messages actually exchanged and the actions taken in consequence.

Thus, the OSI/ISO model provide the basis for developing communication networks. The OSI/ISO model identifies a seven layer architecture. Each of the layers have been assigned a unique role in seven layered network architecture. Typical distribution of the seven layer architecture in layers 7 and 6 are application layer and unique to the applications that are exchanging information across the network. Layer 5 is the session layer, opened at the start of a data exchange, responsible for establishing connectivity to the distant end, closes when all data exchanges have been completed, and closed when connection to distant end is no longer required. Layer 4 is the transport layer and is responsible for assuring that complete messages get delivered. Layer 4 (transport layer) is responsible for breaking down messages into message segments that conform to the network datagram size constraints and is responsible for re-assembling message segments into a complete message. Layer 4 is an end to end reliability protocol normally implemented in the user terminal equipment. Layer 3 (network layer) is the routing layer responsible for pushing the Datagram towards its final destination. Layer 2 (link layer) is responsible for providing communication between two or more nodes interconnected by a physical media. Layer 1 (physical) is the communication media. Layer 1 media can be point to point or broadcast wire or wireless media.

The basic OSI/ISO model protocol does not provide source directed multi-addressed message distribution. The OSI/ISO does not provide the ability to send a single multi-datagram message to multiple destinations via a single transmission. The OSI/ISO model does not provide multi-addressing of messages. The OSI/ISO implementations require messages sent to multiple users to be sent from the source once for each user destined to receive the information. This requires each network node to route multiple copies of the message through the same inter-network communication channel. This consumes excessive communication bandwidth and congests bandwidth limited network communication channels.

It is therefore an object of the present invention to provide an improved user data protocol which eliminates many of the above-noted problems.

SUMMARY OF THE INVENTION

The Improved User Data Protocol (IUDP) incorporates a multi-addressing capability. This allows a user to address a single message to many users. Multi-addressed messages that are given to the network are inserted once at the source network node. Multi-addressed messages routed between network nodes going to the same next node travel once across each interconnecting communication channel. This reduces the communication bandwidth consumed to a minimum. The improved data protocol can be used for data communications networks, consisting of wire lines, HF, VHF and UHF radios.

BRIEF DESCRIPTION OF THE DRAWINGS

FIG. 1 shows the IMPROVED User Data Protocol according to this invention. Depicting the various communication layers used in this invention.

FIG. 2A shows a connection utilizing the IMPROVED Protocol between two radios.

FIG. 2B shows a connection between a basic Internet communications card and a radio using this protocol.

FIG. 4 is a series of diagrams depicting the data transmission components for a first layer of this invention including a synch data bit stream, a data frame area, and a data frame.

FIG. 5 is a table showing classmarks parameters for this protocol.

FIG. 6 is a table depicting the address class and purpose of use for this protocol.

FIG. 7 is a table depicting the station classmark parameters and purposes for this protocol.

FIG. 8 is a table showing the protocol used in a half duplex radio communication.

FIGS. 9A and 9B are tables showing link/net classmarks used in this protocol.

FIGS. 10A–10E depict Frame formats used to implement this protocol.

FIG. 12 is a table depicting the Intranet address field according this protocol.

FIG. 13 is a table depicting a frame format according to this protocol.

FIG. 14 is a table depicting a station address/number according to this protocol.

FIG. 16A depicts a control field according to this protocol.

FIG. 16B is a table showing an information field according to this protocol.

FIG. 18 shows another example of a control field for a half duplex protocol.

FIGS. 20A and 20B show Frame formats with and without an information field.

FIG. 21 shows a format of control bits for a special frame format according to this protocol.

FIG. 22 is a table showing a bit format for each of the different modes according to this protocol.

FIG. 23 shows a table of information field coding.

FIG. 24 is a diagram indicating the possible states between equipment according to this invention.

FIG. 25 is a diagram depicting a received frame and responses regarding to the same.

FIG. 26 is a diagram depicting an extended Internet address.

FIG. 27 is a table depicting Internet header elements according to this protocol.

FIG. 28 is a table depicting a message type/protocol.

FIG. 29 is a table depicting a SYSCON Message type.

FIG. 30 is a table depicting an ICMP Message type.

FIG. 31 is a table depicting a User Defined Message type.

FIG. 32 is a table showing a User Acknowledgment.

FIG. 33 is a table showing Encapsulated Protocols.

FIG. 35 is a table depicting a Status Byte Table.

FIG. 36 is a diagram showing an address entry.

FIG. 37 is a diagram showing an extended address entry.

FIG. 38 is a diagram showing an Internet address.

FIG. 39 is a diagram showing ICMP Message Types.

FIG. 40 is a table showing Transport Acknowledgment Message.

FIG. 41 is a table depicting an LCCN Message.

FIG. 42 is a table depicting the NCCN Message.

FIG. 43 is a table depicting the ICMP Status Report Text Header.

FIG. 44 is a table depicting Report Text.

FIG. 45 is a table depicting an Internet Status Report Format.

FIG. 46 is a table depicting an Internet Route Report Text.

FIG. 47 is a table depicting the Field of a message.

FIG. 48 is a table depicting the Field of another type of message according to this protocol.

FIG. 49 is a table depicting a SYSCON Directive Text Header.

FIG. 50 is a table depicting a Directive Text.

FIG. 51 is a table depicting alarms and notifications.

FIG. 52 is another table depicting alarms and notification text.

FIG. 53 is a table showing a report text header.

FIG. 54 is a table depicting a report text.

FIG. 55 is a table showing a SYSCON Acknowledgment Text Header.

FIG. 56 is a table depicting an Acknowledgment Text.

FIG. 57 is a table depicting a Internet Format according to this protocol.

FIG. 58 is a state diagram showing the connection between a DCE and a DTE.

FIG. 62 is a table showing the IMPROVED Users Data Protocol Frame Information Field.

FIG. 63 is a table showing an encapsulated frame information field according to this protocol.

Figure 2C:
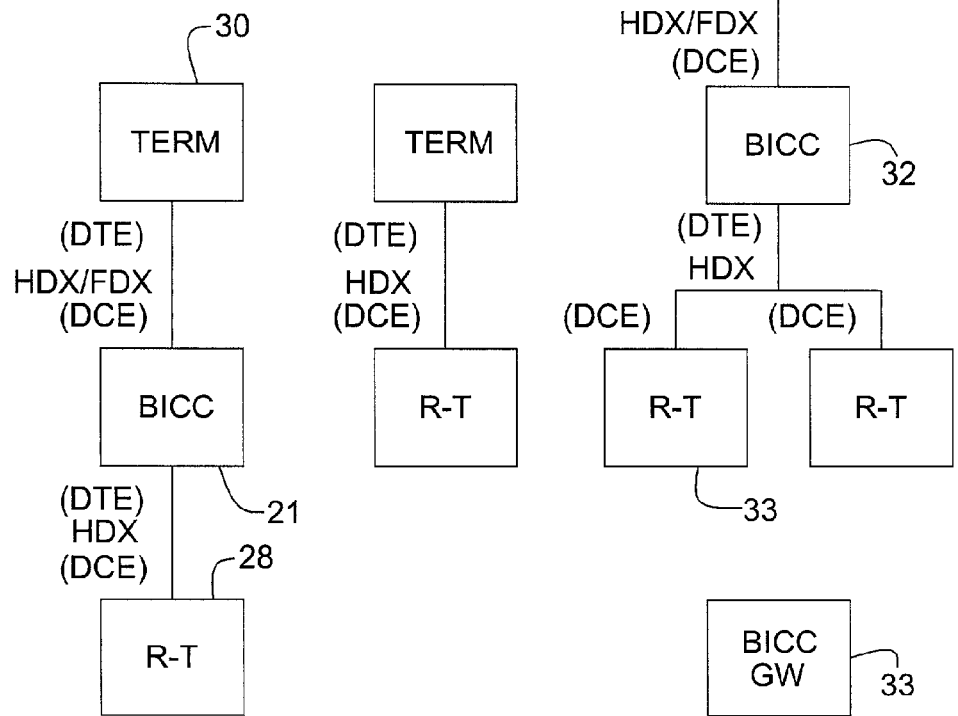
FIG. 2C shows a connection between a DCE which is a Data Communications Equipment and a DTE which is a Data Terminal Equipment using this protocol.

Appendix—Table of Acronyms consisting of 4 pages.

DETAILED DESCRIPTION OF THE INVENTION

The IMPROVED User Data Protocol (IUDP) provides for both full and half duplex data communications over synchronous and asynchronous interfaces. The full duplex interface is used on point-to-point links using HDLC.LAPB (Higher Data Level Communications. Link Access Procedure Balanced) procedures. The half duplex interface is used on both multi-point radio and point-to-point links using a modified HDLC LAPB procedure. Radio links or nets provide an optional relay protocol for those nets that require range extension due to distance or hostile interference. The relay protocols exist over the intranet address field.

The IMPROVED User Data Protocol is well suite for both internet radio and packet switching networks and provides BUILT-IN internet addressing and Transport Control capabilities. The IMPROVED User Data Protocol consists of layers 4, 3, & 2 of the 7 layer OSI/ISO model. The Physical Layer (layer 1 of the OSI/ISO model) used in figures depicts X.21, IUDP's primary interface; however, the upper layers are designed to interact with various physical layers. The X.21 physical interface is used as an example because it is one of the Primary physical interfaces used in communication systems.

The X.21 protocol is an extremely popular protocol which is widely known. The protocol provides full duplex communication across point-to-point circuits such as lead circuits using the higher data level communication (HDLC Protocol). The X.21 HDLC requires that the circuit be connected end to end both "C" & "I" lead inserted and a continuous exchange of flags before advancing from the ready state to the data transfer state. Basically, the protocol has been developed for a communications data protocol and is widely known. The protocol uses a continuous synchronous data stream consisting of abort, flag, and zero inserted information characters. When the communication line is not transmitting information characters it is transmitting flag carriers. Zero inserted information characters are concatenated together to form data frames. Data frames are bounded by opening and closing flag characters.

Referring to FIG. 1, there is shown a diagram depicting the IMPROVED User Data Protocol according to this invention. As seen, the protocol follows a seven layer OSI/ISO model. In FIG. 1 there is shown basically seven layers where layer 7 generates a message by a user, layer 6 the user addresses the message and builds the Internet header, and layer 5 which is a session layer and is not used except for Datagram service. Layer 4 is the transport layer. In any event, as can be seen the layers that are unique to the protocol consists of layers 2 and 3 which will be further explained but which essentially operate as link layers and briefly perform the following functions.

The layer 2 (link layer) functions are: Frame Formatting, Frame Addressing, FDX, HDX-Point-to-Point, Commands and Responses, Media Access, Scheduled Access, CSMA (In conjunction with the radio), Frame Transfer, Link Acknowledgments, Frame Retransmission, and Error Detection.

The FDX layer 2 conforms to HDLC LAPB.

The HDX Layer 2 is a modified HDLC LAPB for random access multipoint media and Point-To-Point access circuits.

The layer 3 functions are: Layer 3A Inter-Network routing, builds the Intranet Header for half duplex radio interfaces, selects the proper access circuit in full and half duplex packet switching interfaces, Layer 3B Intra-Network routing HDX Link Layer Connectivity, routes to the next node within a net, provides routing data for distribution to other nodes on a net, processes routing data received from other nodes on a net.

The layer 4 functions are: segment large messages into frames, interface to layer 3, accumulate frames from layer 3, reassemble frames into large messages, provide End-to-End acknowledgments for multi-frame messages.

Internet support functions and Internet Control Message protocols provide for: Internet status reports, Adaptive Routing procedures and protocols, Interface protocols to/from the Network Management System, Congestion control protocol for internet traffic, Man/Machine Interface to/from user (operators).

The IUDP is relatively independent of the radio Data Communications Equipment Dce and the Data Terminal Equipment DTE.

The Radio in conjunction with a DTE provides both voice and data communications for Users. The radio's Layer 1 procedures are performed for both VOICE and DATA transmissions.

The IUDP's Layer 2 and 3 procedures are only performed for data message transmissions. The protocol interacts with the radio on nets which have been voice and data communications. Most of this interaction is managed by the X.21 interface between the radio and the terminal and the relationship of the radio and terminal.

The IUDP's data service can support Data Messages up to 10,240 Bytes, 80 frames of 128 Bytes of actual text. Message sizes can vary by changing the frame size, the text size, and the maximum frame count in the System Classmarks.

The "External Access Voice" messages are generated by the radio and consists of: Call Request, Call Accept, Call Reject, and Call Release.

These message are received by the DTE (BICC) Basic Internet Controller Card over the control interface.

Referring to FIG. 2A there is shown a basic block diagram showing the connection of two radios or a data communication equipment terminal 20 interfacing with a data terminal equipment 23 which may be a radio or a gateway through a BICC which is a basic internet controller car 21. All components are well known. The data communication equipment consists of a receive and transmit terminal 24 for voice and a receive and transmit terminal 25 for data. As can be seen, the data rates are 16 KPBS as interfacing with the BICC 21 and a data rates between the radio or gateway or DTE 23 can be at 16 or 32 KPBS.

Referring to FIG. 2B, there is shown a BICC 27 coupled to a radio 26 through this communication path and indicating the data path as well as the control path between the two modules. It will be clearer how connections are implemented and how they are made in further discussions.

Referring to FIG. 2C, there is shown interconnections between a DCE, which is a data communications equipment, such as a radio and a DTE, which is a data terminal equipment. FIG. 2C shows all the possible configurations, as for example, between a terminal 30 and a DCE or radio 28 as well as between a DTE or data terminal equipment 31 and a DCE having received transmit sections 33. Basically, as one can ascertain from FIG. 2C, the radio is always a DC interface and operates at HDX. The terminal, such as terminal 30, is always a DTE interface and can operate with HDX/FDX. The BICC as 29 or gateway has a DCE and DTE interface and therefore can operate with HDX or FDX. This is shown in FIG. 2C which shows the DCE/DTE configurations.

Figure 2D:
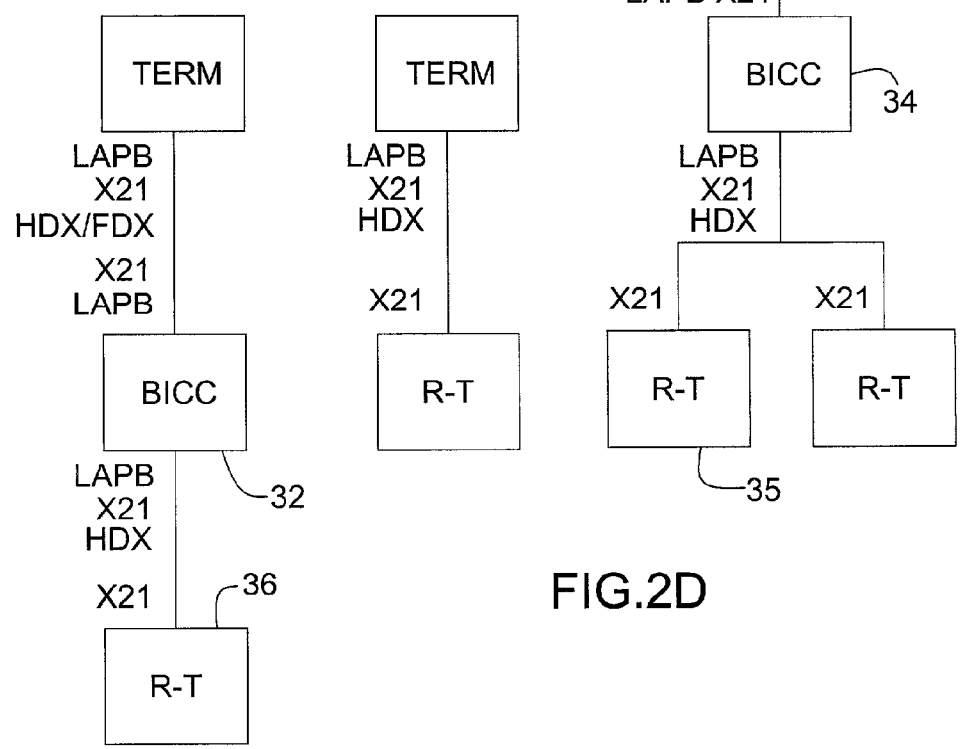
FIG. 2D depicts protocol configurations according to the IMPROVED Protocol of this invention.
Figure 2E:
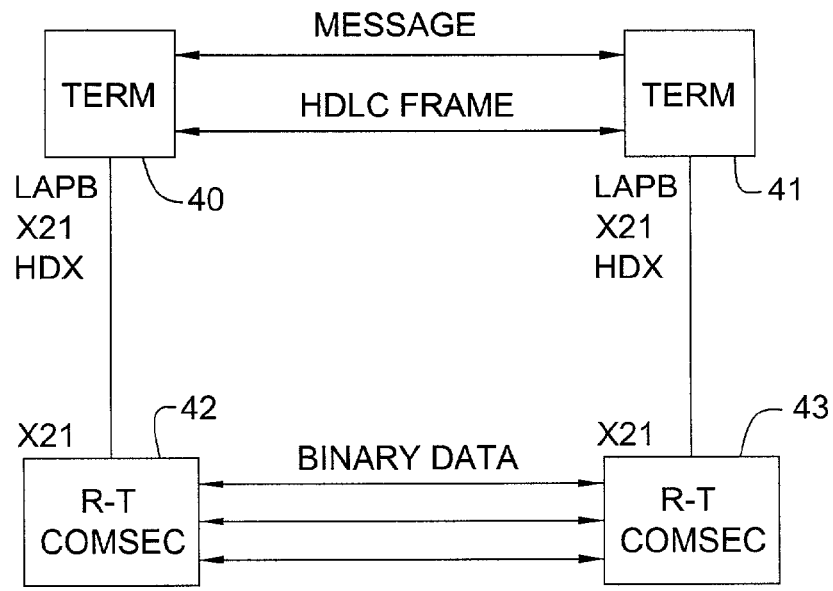
FIG. 2E depicts a terminal interface configuration according to this invention.

Referring to FIG. 2D, there is shown protocol configurations and basically in FIG. 2D it is seen that a radio such as module 31 has two data interfaces. One is control, which is not shown, and the other is the X.21 data port. The BICC such as 32 processes the LAPB protocol on its input and regenerates the LAPB protocol on the output as seen in FIG. 2D. This essentially shows how the protocols are accommodated. For example, on the right side of FIG. 2D there is shown a BICC 33 which interfaces with a BICC 34. The protocols, as well as the interface rates are shown on the connecting lines. Similarly the BICC 34 interfaces with DCE 35 using the X.21 protocol. Thus, the protocol format or protocol configurations for the various terminal equipments are shown in FIG. 2D.

Figure 2F:
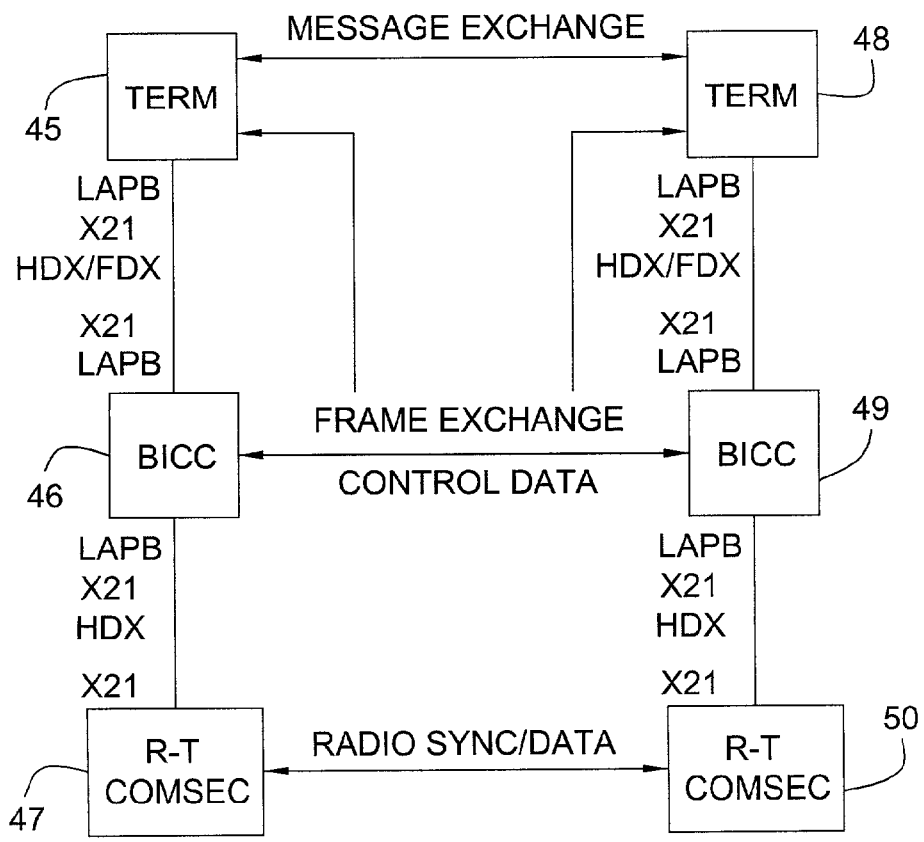
FIG. 2F depicts an interface configuration according to this invention.

FIG. 2F shows the terminal interface configurations whereby terminals 40 and 41 communicate via each other via messages and the HDLC Frame. Terminals 40 and 41 can communicate with the receive/transmit COMSEC, which is communication security devices, such as radios 42 and 43 through the LAPB X.21 Protocol as well as the units 42 and 43 can communicate one with the other through binary data and according to this protocol. The LAPB is a modified protocol for half duplex radio interfaces. The users data, as the data between radios 42 and 43, is binary data stream for the radio. The radios as 42 and 43 do not have its own radio to radio protocol. The radio has a control protocol for both the terminal and the BICC/Gateway which is not shown. This will be described subsequently. Referring to FIG. 2G, there is shown interface configurations which are possible according to the protocol to be described herein. Hence, as seen in FIG. 2G a terminal 45 can communicate with a terminal 48, terminals can communicate through BICC 46 and 49 to respective radios as 47 and 50. The BICCs can communicate and pass control data from one to the other. The terminals can also provide message exchange and frame exchange can be provided between the various modules. The radios can interface through the BICC to the terminals 48 and 45 and communicate between each other through the radio sync data. Hence FIG. 2G shows a fairly detailed interface configuration which can utilize the above noted protocol as will further be explained.

Thus, FIGS. 2A to 2G show the various formats which can be implemented in this system enabling data terminal equipment to communicate with data communications equipment and using basic internet controller card which is a well known component. In this manner, the radio can communicate over land lines, point-to-point uses full duplex communications as will be explained. The attribute of making all connections as shown in the above noted FIGS. 2A to 2G is due to the improved user data protocol according to this invention as will be further explained.

Figure 3:
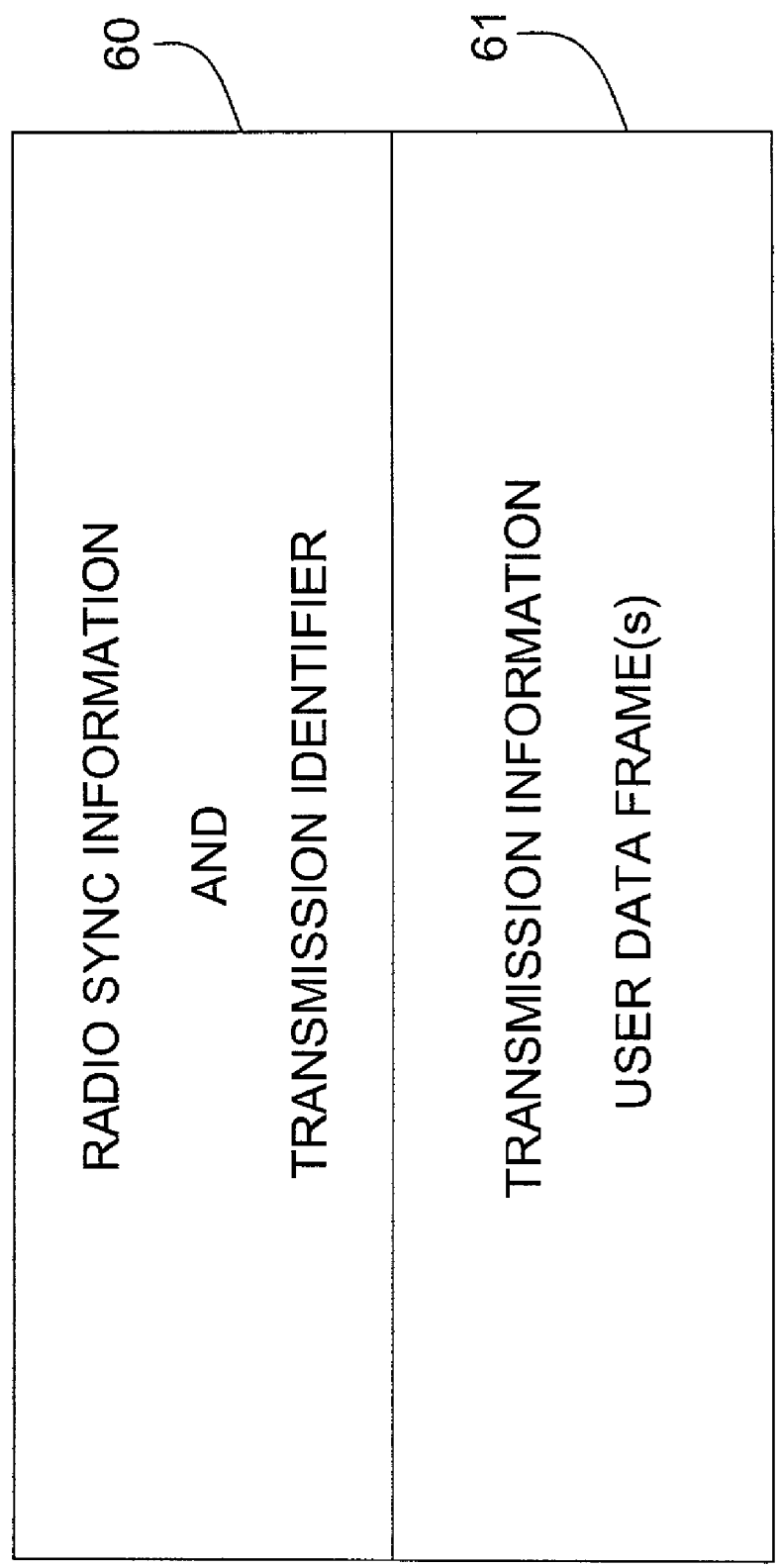
FIG. 3 depicts a table showing the general requirements for radio data transmission according to this invention.
Figure 11:
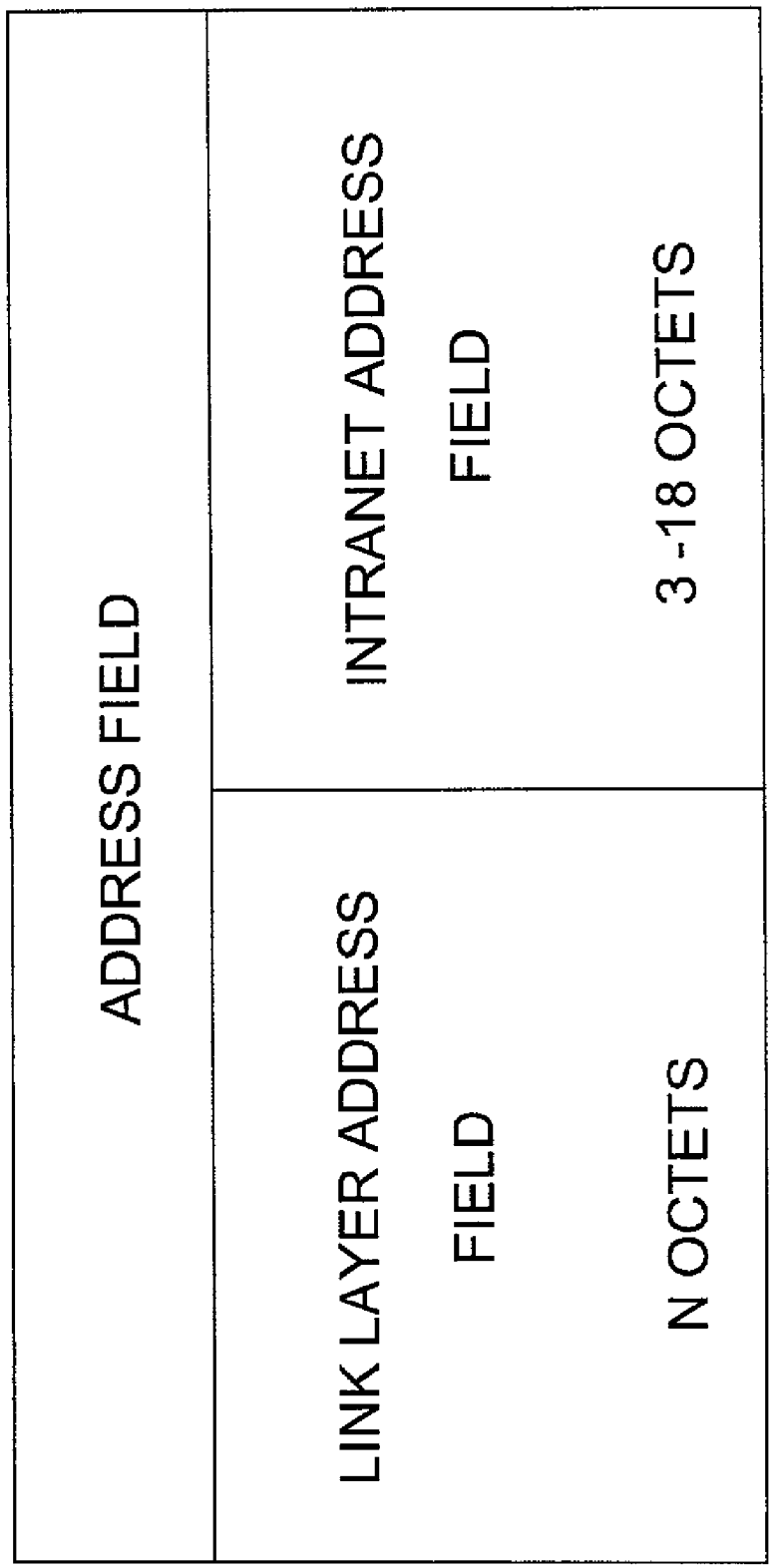
FIG. 11 is a table depicting the address field according to this protocol.

Voice transmissions from the DTE or radio are activated by the analog port and cause the radio to generate the Voice transmission identifier (FIG. 3). The radio indicates a BUSY condition to the data port via the X.21 "I" circuit when it is transmitting voice.

When the radio is receiving voice, that information with a Voice identifier is presented to the analog port. The radio indicates a BUSY condition to the data port via the X.21 "I" circuit when it is receiving voice.

Data transmission is activated by the X.21 "C" circuit. The radio performs its synchronization and then supplies clock to accept the data for transmission. When all the data has been sent to the radio for transmission the X.21 "C" circuit is deactivated.

The IMPROVED User Data Protocol permits multiple data frames to be transmitted in a single radio "transmission".

Referring to FIG. 3 there is shown a general depiction for radio data transmissions. It is noted that the transmission identifier which is depicted in module 60 specifies either voice transmission from the radio or data transmission and directs the path of the transmission information to the data port or the voice port of the DTE. Data transmissions may be framed data or CVSD, which is continuous variable slope delta data this is a form of modulated information or voice information and one can use all different types of digital modulation to transmit voice.

Digitized Voice Transmission requirements are well known and can be accommodated by other access protocol specifications. In any event, there are many ways of digitizing voice and as indicated in FIG. 3 the general requirements for radio data transmissions are to give transmission information regarding user data frames as shown in 61 or telling a unit whether it is a voice transmission or data transmission as shown in FIG. 3 by reference numeral 60.

Referring to FIG. 4 there is shown the data transmission components in the single radio transmission. Essentially, as seen in FIG. 4, layer 1 contains the data transmission components as indicated by module 70. These include the synch data bit steam, which is 4 octets and a data frame area which is one to end frames. Shown beneath is the synch data bit stream, which is at least 4 HDLC flags and indicated by the reference numeral 71. Shown beneath the synch data bit stream is the data frame area which depicts the bit contents as for example the opening flag, the data frame, the closing flag, and the opening flag for the next frame all depicted in module 72. Essentially, reference numeral 73 of FIG. 4 depicts each data frame which has an address field, a control field, an information field, and an FCS (Frame Check Sequence).

During radio data reception, the data transmission are presented to the data port of the radio with clocks while activating the X.21 "I" circuit. The DTE receives the data while the clocks are present. When the data has been transferred from the radio to the DTE the clocks and the X.21 "I" circuit are deactivated to inform the DTE that all the data has been transferred.

Radio Data Reception

Data transmissions are presented to the data port with clocks while activating the X.21"1" circuit. The DTE receives the data while clocks are present. When the data has been transferred from the radio to the DTE the clocks and the X.21 "I" circuit are deactivated to inform the DTE that all the data has been transferred.

The IMPROVED User Data Protocol enables a User Data Terminal (UDT) to communicate with another Terminal using VHF/HF Combat Net Radios in a point-to-point, in a radio Net, or across radio Nets. In addition, data communications can also be transmitted across packet switching nodes, such as Internet Gateways or other switching backbone systems. The IMPROVED User Data Protocol specifies both the half duplex and full duplex link layer protocols, as well as the Network and Transport layer protocols.

The IMPROVED User Data Protocol enables data communications in combined Voice/Data radio nets. The Voice issues are not addressed in this specification, however the radio is assumed to indicate that the net is busy with voice traffic through the data interface.

The concept of INTERNET communications for data is supported with the use of Internet Points (I.P.). Internet Points are defined as dual radios with a BICC applique or a gateway which is connected to multiple radios and/or multiple BICCs. These Internet Points also support directly connected user terminals.

The Radio and the User Data Terminal (UDT) or a BICC applique and terminal are referred to as a STATION. The station acts as a collective and provides the features/functions of IUDP.

To provide both voice and data transmissions the radio indicates the transmission type. Analog voice transmission normally originate and terminate at the radio's audio port. Data transmissions normally originate and terminate at the dat port (X.21). Digital voice originate and terminate at the data port (X.21) when providing External Access.

Access Circuit Layer 1 processing is accommodated by dedicated point-to-point circuits which are full or half duplex and provide communications between two combined stations using balanced link control capabilities.

The half duplex protocol for the radio layer 2 processing uses the HDLC frame. There are three modes of the half duplex protocol, the "ALL-INFORMED" mode, the "RELAY" mode, and the point-to-point mode. The ALL-INFORMED mode uses the Intranet header which specifies the station(s) that are to receive the frame. The "RELAY" mode adds the link layer relay header to the frame which specifies those stations that are to receive and/or relay the frame to other stations. The network can run with any combination of "ALL-INFORMED" and "RELAY" nets.

The point-to-point mode uses the same procedures and frame structures as the radio modes, however, it does not use either the Intranet or Relay headers. It does use the address field as specified in the full duplex protocol (the command and response address). This layer 2 can use either a 16 or 32 bit FCS on synchronous interfaces.

Access Circuit Layer 2 processing is accommodated by the full duplex layer 2 protocol uses the HDLC LAPB protocol. This layer 2 is restricted to the basic mode (modulo 8), does not use the SREJ (selective reject), and uses a 16 or 32 bit FCS. The half duplex protocol uses HDLC and a modified form of LAPB.

The Layer 3 is divided into two sub-layers, the internet layer 3A and the intranet relay layer 3B (FIG. 1). Layer 3A performs the routing of Internet Addresses to; local users or functional entities, to radio nets, or to directly connected point-to-point nodes.

The Layer 3A Processing first performs routing of the internet addresses in the internet header. For half duplex radio nets this routing process builds a list of stations on the "home" net in the intranet header. Addresses which belong to other net are either sent to an Internet Router or to an Internet Point.

For access circuits the addresses are placed in a list for each circuit. When routing is complete, a new Internet Header is built for each circuit using its addresses.

A complete description of the Internet Header, address structures, and routing concepts will be given.

Layer 3B processing is only performed for radio nets which are classmarked as "Relay" nets. When active, this layer performs routing of the station addresses or station Ids found in the intranet header to determine if a relay transmission is required to reach the destination station. When a radio net is in the "RELAY" mode, those station addresses in the Intranet header are routed using the "connectivity" tables. Each station is examiner to determine the shortest relay path. See reference 1 for a full description of the Relay Protocol, the structure of the "connectivity" tables, and the self-organization protocols that support Layer 3B.

The Transport layer on layer 4 provides a limited end-to-end accountability for messages which have been fragmented/segmented into multiple frames.

The originating transport segments the message into frames, passes the frames to layer three and maintains the status of those frames. When the destination transport layer receives segmented frames it builds a list sorting the frames in their original order, deleting any duplicates. When the complete message is received or an accumulation timer expires, the destination transport sends an acknowledgment message to the originating transport layer for those frames that were received. The originating transport retransmits all frames missing from the acknowledgment message. When a message has been completely acknowledged the resources are released. When a message has been completely received it is reassembled and passed to the upper layer.

The Transport layer controls the number of bytes that are placed in the information field of a frame. This byte count may be equal to or less than the size accepted by layer 2. This facility regulates the user's text size. Frames generated by other application interfaces may produce frames with information fields larger than those produced by the transport layer.

A complete description of the Internet Header and the Transport layer fields will be given.

The IMPROVED User Data Protocol requires operational parameters. These parameters are established by the operator/user and the MIS. Some parameters are maintained only by remote system and/or net managers.

The operator interface consists of the establishment of station, net, link and system classmarks which support the IUDP. These data elements can also be maintained by a remote operator, ie Net Controller or NIS System or Sub-System manager. Remote or local operations shall use the System Control (SYSCON) message protocol for all directives, alarms/notifications, and reports. The System Classmarks are established by the MIS System Manager prior to deployment and activation of the Network. The System Classmarks are NOT permitted to be modified during operations. In the event the MIS did not establish the System Classmarks prior to deployment, the Default System Classmarks values specified in this section shall be used.

The System Classmarks are established by a central control facility. These classmarks define those parameters which MUST be defined for the entire network/system. These parameters establish frame sizes, transport text size limits, valid address list, etc.

Referring to FIG. 5, there is shown a table which depicts the parameters that must be maintained on a network wide basis. As seen, the table of FIG. 5 consists of a left hand column designated as system classmark parameter, a central column designated as default setting, and the end column indicating the purpose. Thus, for example, for the layer 2 frame size depicted in FIG. 5 by row 75 one sees that the default setting is 256 octets and the purpose is to define the maximum size of the layer 2 in regard to the frame. Similarly, as one can ascertain there is given the transport text size, the transport window timer, the transport accumulation timer and so on. These parameters are as indicated maintained at a full network basis and are important to maintain reliable system operation.

Referring to FIG. 6, there is shown a table which depicts the Internet address masks which are used in conjunction with address class indicator. The masks values shown specify a 14 bit NIS (maximum size) and an eight (8) bit call sign. Implementers may vary these masks however, these masks must be used by every station in the system network. Thus, as seen from FIG. 6, the masks consists of the following information: on the left is an address class, in the center is a mask value in HEX code and on the right column is a purpose. Thus looking at reference numeral 76 of FIG. 6 one can see that the address class of user class 1, uses a NIS mask which is 3 octets and is 3 FFF00. The purpose is to isolate the NIS portion of the Internet address. Thus, each user class and equipment class including the Internet address class field are shown in FIG. 6 together with their values and together with the indication of the purpose. It is noted that the Internet address is a 3 octet field.

Referring to FIG. 7, there is shown a table depicting the station (NODE) classmarks and parameters. The operator of the unit shall be permitted to enter all classmark data required by the station or NODE. As a minimum, this data shall include the parameters shown in the table of FIG. 7. Referring to FIG. 7, there is shown a table indicating the station class mark parameter on the left hand side column, the value range, the default range, and the purpose on the right hand column. For example, referring to row 77, the station classmark parameters is the number of nets. There is no value range, the default value is one, and the purpose is multinet user, internet point indicates the number of classmark sets. Thus, as shown there is the appropriate value ranges for the data communications terminal, which is the DCE type, as well as for the data terminal equipment which is the DTE type.

Referring to FIG. 8, there is shown a table depicting use of half duplex radio protocol whereby each station or NODE shall maintain dynamic parameters per net/link as indicated in the table shown in FIG. 8. The table in FIG. 8 as shown has a left hand column indicated station variable parameter with a value range, an initial value, and a right hand column showing the purpose. Thus, column 78, for example, indicates a station frame sequence number which has a value range of 0–3 F in HEX code, initial value of zero. The purpose of this is to identify every frame originated by a station to detect duplicate frames in the network.

Referring to FIGS. 9A and 9B, there is shown a link/net classmarks. The operator is permitted to define the link/net classmarks as specified in FIGS. 9A and 9B for each external interface, as for an example, for each link and/or net. This represents the minimum data required to operate the improved user data protocol. These classmarks can be combined in a single structure or they can be distributed between multiple structures. For example, referring to FIG. 9A there is shown a left column designated link/net classmark parameter, then the value range, then the default value, then the purpose. Again referring to row 79 there is shown the net precedence. The value range is low or high, the default value is low. The purpose of this it is used to qualify the message precedence level, as for example, in routine high precedence levels versus routine low precedence levels. Referring, for example, to row 80 there is shown a DTE type where a value range is UDTHH or UDTHQ, which is user data terminal high priority with a default range as user data terminal HH and which specifies the DTE type assigned to the particular link. As one can understand these link net class marks are given for the relay net, relay update, the TDC, the FEC, and so on.

The half duplex radio protocol is based on HDLC LAPB. The concept of the frame, the link layer acknowledgments, and error detection have been adapted to facilitate the random access multi-point media of a combat radio net. The N(R) and N(S) have been replaced with a window size of four for a single radio broadcast (transmission). The radio link/net is assumed to be in the Asynchronous Balance Mode of the Information Transfer State, therefore link initialization procedures are not required. The options and classmarks enable this protocol to be implemented on a wide range radios with varying radio capabilities Features such as Forward Error Correction (FEC), and Time Dispersal Coding (TDC) are assumed to be functions of the modem; however, they can be implemented as the last step of the data interface in the physical layer. When present the FEC shall be transparent to the protocol described herein.

The IMPROVED User Data Protocol is implemented using various physical interfaces. The physical layer between Radios (HF & VHF) and terminals uses the X.21 protocol using the Half Duplex Mode of operation. The Physical layer between terminals can be, X.21 (FDX Physical) using the IUDP Half Duplex point-to-point, or an Asynchronous (FDX Physical) also using the IUDP Half Duplex point-to-point.

The data link layer is independent of the physical layer. The datal link processing is based on HDLC LAPB which is a widely used protocol. The data link protocol has the following restrictions/limitations:
1. Uses a 16 or 32 Bit Frame Check Sequence (FCS)
2. Transmits the low-order bit first of each octet (Address Control & Information Fields)
3. Transmits the Frame Check Sequence high-order bit first
4. Does not use the N(R) or N(S) modulus
5. Does use an I Frame window of four (4) in a single half duplex (radio) transmission
6. Only uses the UI Frame (Unnumbered Information) of the U Frame Formats
7. Uses a Special Address Field for radio nets.

For the purposes of illustrations, all figures and tables depict the bit assignments in a binary format (hex). The bits are transmitted as specified above.

The synchronization pattern consist of at least 4 HDLC FLAGS. This sequence is used for LINK Synchronization prior to the actual processing of HDLC Frames in each half duplex (radio) transmission.

The Data Link Layers perform that processing required by "I", "S", and "U" Frames. The Data link software discards all frames which are not addressed to its station. Link layer acknowledgments are processed and status alerts are returned/sent to the upper layer software.

A radio (half duplex) transmission can contain multiple frames. These multiple frames may be a combination of "S", "U", or "I" Frames. However a radio (half duplex) transmission may NOT contain more than four (4) "I" Frames.

FIGS. 10A to 10E there is shown the frame structures. The frame structures dictate all transfers of information, commands, and responses. These are accomplished utilizing frames which are bounded by Flags. The FIGS. 10A to 10E show the frame structures for the half duplex operation. The frame fields are mandatory with the exception of the information field which can vary accordingly. Referring to FIG. 10A, there is shown a frame format without an information field such as utilized by a half duplexed radio operation. As one can ascertain, a half duplex radio is a radio that can only receive or transmit and cannot receive and transmit simultaneously. In any event, the frame format is shown with the left column indicating the Flag format, the next column indicating the Intranet address field, the next column the control field, then the FCS field and then the Flag.

In a similar manner, referring to FIG. 10B there is shown the frame format with an information field for half duplex radio operation. FIG. 10C shows the frame format without an information field for half duplex PTP operation, PTP standing for point-to-point.

Lastly, FIG. 10D shows the frame format with the link layer address relay field which is used in relay nets. As one can ascertain all values are given in order to perform the frame format. The column designated FCS field stands for frame check sequence. Essentially, the sequence of every frame is checked by the FCS field which consists of two or four octets. It is noted that when a radio net is in a relay mode the address field for the relay protocol is placed over or positioned over the Intranet address field. This functionally expands the frames address field.

FIG. 10E depicts the general format of the frame when the relay link layer address field is used.

The Flag is a unique eight-bit sequence of a zero, six ones, and a zero (01111110). A Flag is transmitted at the beginning and at the end of each frame. Frames received without beginning and ending flags are ignored.

At the transmitting station, the flag that ends a frame cannot be the opening flag of the next frame; that is at least two flags separate successive frames. The receiving station, however, is capable of accepting frames separated by only one flag. This feature facilitates the ability to discern a valid frame on a link which has experienced data corruption due to a link error.

The frame's address field contains an Intranet Address field or in the case of "Relay" nets, a Link Layer Relay Address field and the Intranet Address field as shown in FIG.

11. This specification does not define the Link Relay Address field. For Point-to-Point links the address field consists of a single octet of the Full Duplex Point-to-Point protocol, as will be explained.

Each link is classmarked specifying the type of interface:
1. Radio Net "All Informed"
2. Radio Net "Relay"
3. Point-to-Point access circuit This classmark data defines the type of validation and processing required for the address field.

The Address field is variable in size and consists of three (3) to 18 octets. The subfields consists of a Type/Sequence field, the originators station address and a list of up to 16 destination addresses. Each address octet contains seven bits of station address followed by a continuation bit. When the continuation bit is reset (zero), it indicates that another address octet follows. The LASR destination addressee shall have it's continuation bit set (one).

The coding of the Intranet Address Field shown in FIG. 12.

The Frame Type and Sequence number are used in conjunction with the originator's station address to identify the frame and report the station's mode, Ready/Not Ready. The Type field is set to the IMPROVED User Data Protocol "User Frame" value which indicates the mode, and the station's sequence number is assigned just prior to the initial transmission of the frame. This sequence number is NOT changed on retransmission of the frame. This sequence number is NOT changed on retransmission of the frame, however the station mode may change.

Each station shall keep a sequence number for originating frames. In addition each station shall keep a record of frames processed in a process log. The number of entries shall be specified in the Station Classmarks. If a received frame is valid and requires an acknowledgment, the frame is acknowledged. The process log is examined for the sequence number and the station address of the frame just received. If the frame is found, it is discarded, if NOT found, it is placed in the process log. This procedure prevents duplicate frames from being transmitted through the Internet. The typical reason for a frame being retransmitted is that the originating station did NOT receive the acknowledgment correctly. The FIG. 13 depicts the format of this subfield.

The Frame Type Codes are as follows:
00=User Frame and Station Ready
01=User Frame and Station Not Ready
10=Reserved
11=Reserved The Frame Type indicates the station's mode, Ready or Not Ready. This data is a duplication of information when the frame is a Receiver Ready or a Receiver Not Ready S Frame; however, it eliminates the need for periodic S Frames by indicating the station's mode with every I Frame, or U Frame transmission.

Each Address octet for the Half Duplex Protocols contain two fields; the station address field and the continuation bit or LAST address indicator. The Address field is variable and each address octet indicates if additional address octets follow. The station address or station number is a seven (7) bit field. Two special addresses are reserved for the IMPROVED User Data Protocol, the Null address and the Global address. The NULL address has a station address of zero and the Global address has a station number of 127 (all bits set). The Global address MUST be the last address in the Intranet address field (LAST in set). The global address can be used in combination with specific addresses; however, it MUST be the last addressee. The NULL address is reserved and User's shall not assign zero as a station address.

FIG. 14 shows the format of an Address Octet.

For half duplex operation the control field consists of one octet. The control field specifies the frame type and contains an I Frame sequence number bit map. The coding of the control field for the S Frame and the I Frame will be described later.

The information field follows the control field in I Frames. The information field contains an integral number of octets, up to a maximum as specified in the configuration parameters. Any bits added to the information field to make it an integral number of octets are set to zero.

All frames include a Frame Check Sequence (FCS) (FIGS. 10A–10E). The FCS for the half duplex protocol shall be a 16 or 32 bit remainder of a modulo 2 polynomial division process on the contents of the address, control and information fields prior to the zero bit insertion. The FCS size to defined in the Link/Net Classmarks.

A station may terminate a frame at any time in the process of transmission by the transmission of an abort sequence. An abort sequence consists of seven (7) to 15 contiguous one bits.

To provide complete transparency for transmitted data a zero bit insertion mechanism is used to prevent a flag sequence from occurring in the frame. A zero is inserted by the transmitting station following five (5) contiguous one bits in the data stream. This includes the last five bits of the FCS.

Receive data is examined to remove these inserted zero bits. When five contiguous one bits are detected, the sixth bit is examined. If the sixth bit is a zero, it is deleted; if the sixth bit is one, the seventh bit is examined. If the seventh bit is a zero, a Flag is detected. If the seventh bit is one, then an abort sequence is detected.

An invalid frame is one which is not bounded by a beginning and ending flag, or one which is too short, or one which is too long. Frames which have an invalid Frame Type, an invalid address field, an invalid control field or a FCS error are discarded as an invalid frame.

A frame is too short when there are less than four octets between flags for the 16 bit FCS Point-to-Point or six octets between flags for the 32 bit FCS. A frame is too long when the number of octets exceeds the SPECIFIED maximum size. A frame which has terminated by an abort sequence is invalid. Invalid frames are ignored and discarded upon detection of the error.

Half duplex LAPB system parameters apply to both the DCE and the DTE. No variation exists between the two stations. The values of these parameters are either fixed as indicated or as specified in the Station or Link/Net Classmarks (FIG. 9A, 9B). The DCE and DTE LAPB system parameters are as follows:

HDX T1 Timer

The HDX T1 timer is the maximum time a station waits for an acknowledgment of a frame transmitted before the frame is retransmitted. The value of T1 is in seconds as specified in the Link/Net Classmarks. Each frame transmitted is assigned to T1 timer. When the T1 timer expires for an I Frame, that I Frame is retransmitted in the next transmission opportunity, assuming the maximum retransmission count has not been reached. Also the HDX T1 timers for I Frames are halted in the event the receive station replies with an RNR S Frame indicating a busy condition. The I Frames for that station are removed from the transmit queue until the station clears its busy condition and resumes traffic with a RR S Frame.

T2 Timer

The T2 timer is the amount of time a station should wait before an acknowledging S Frame is initiated for received I Frame(s). For the IMPROVED User Data Protocol this value is 200 milliseconds (RADIO TURNAROUND TIME). Pending acknowledging S Frames are transmitted at the next opportunity.

HDX N2 Maximum Transmission Attempts

The HDX N2 parameter indicates the maximum number of attempts to complete the successful transmission of an I Frame. The value of HDX N2 is the maximum retransmit value as specified in the Station Classmarks (FIG. 9) plus one (1) for the original transmission.

N1 Maximum Number of Bits in an I Frame

N1 is an adjustable parameter based on the system classmarks. The default value is 2,048 or 256 octets. This parameter must be padded to align on an octet boundary.

HDX K Maximum Number of Outstanding I Frames

The value of K indicates the maximum number of sequentially numbered I Frames that a station may have outstanding (Not acknowledged) at any given time. For the IMPROVED User Data Protocol this value is four (4).

Originating Station Frame Sequence Number

The value of the station's sequence number is a binary (6 Bit) value starting at a value of zero, and being incremented by one for every frame that originates from the station. This value is not incremented for retransmitted frames.

Information Transfer State

Stations shall enter the Information Transfer State (ITS) without any special initialization procedures.

The Information Transfer State allows the exchange of I-frames, S-frames, and U-frames.

I-Frame Processing

The I-frame is either a new message frame from the local user, or a retransmission of an I-frame which was not acknowledged within the Timeout Period (TP). I-frames are retransmitted up to HDX N2 times, where HDX N2 is as specified by the station classmarks.

Figure 15A:
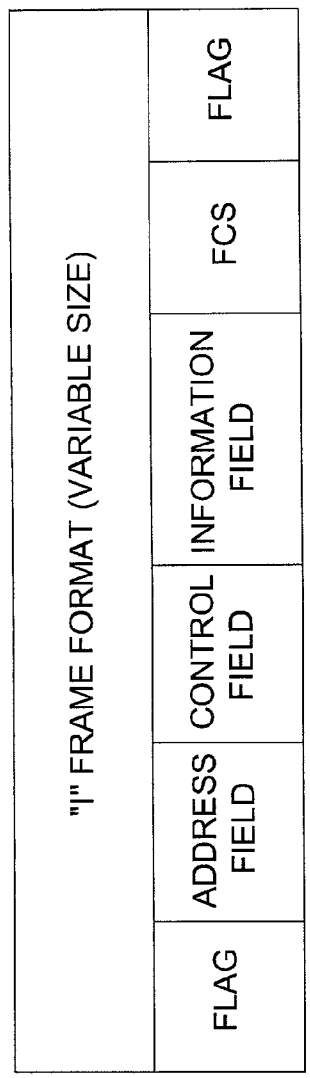
FIGS. 15A and 15B show a frame format and address field according to this protocol.
Figure 15B:
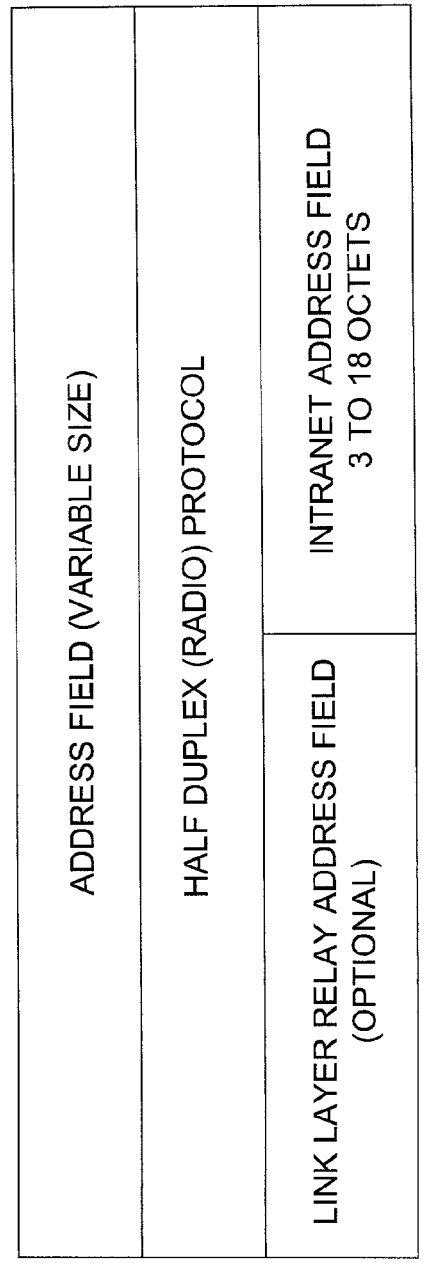

Referring to FIGS. 15A and B there is shown I-Frame formats. Message data is exchanged using "I" Frames. The IMPROVED User Data Protocol specifies the format of "I" Frames as shown in FIGS. 15A and 15B.

A description of the Address Field is presented later on.

FIG. 16A shows the CONTROL FIELD FORMAT and FIG. 16B shows the INFORMATION FIELD FORMAT.

The numbers in FIGS. 16A and 16B reflect the Default Values as specified in the System Classmarks. The Transport Layer uses the text size as specified in the System Classmarks. The half duplex link layer will accept frame sizes as specified in the System Classmarks. The sizes quoted for the Internet Header (FIG. 16B) are 13 for the minimum size header and 105 for the maximum size header. The minimum size header contains a single Basic Address and the maximum size header contains 16 Extended addressses.

Transmitted I-frames are acknowledged by RR response S-FRAMES from the receiving stations, except for the following cases:

1. The Control field of the I-frame specifies no acknowledgement.
2. The user has set the Response Mode in the station classmarks to disable acknowledgment.
3. The receiving station is a global addressee only.
4. The receiving station's unique link address (Station number/identifier) is not in the Intranet Address field.
5. The receiving station's unique link address is not in the Link Relay Header.

Figure 17A:
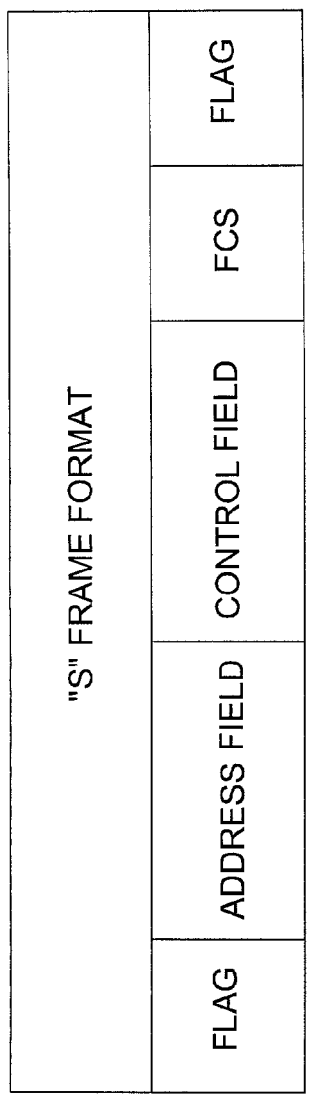
FIG. 17A is an "S" Frame format.
Figure 17B:
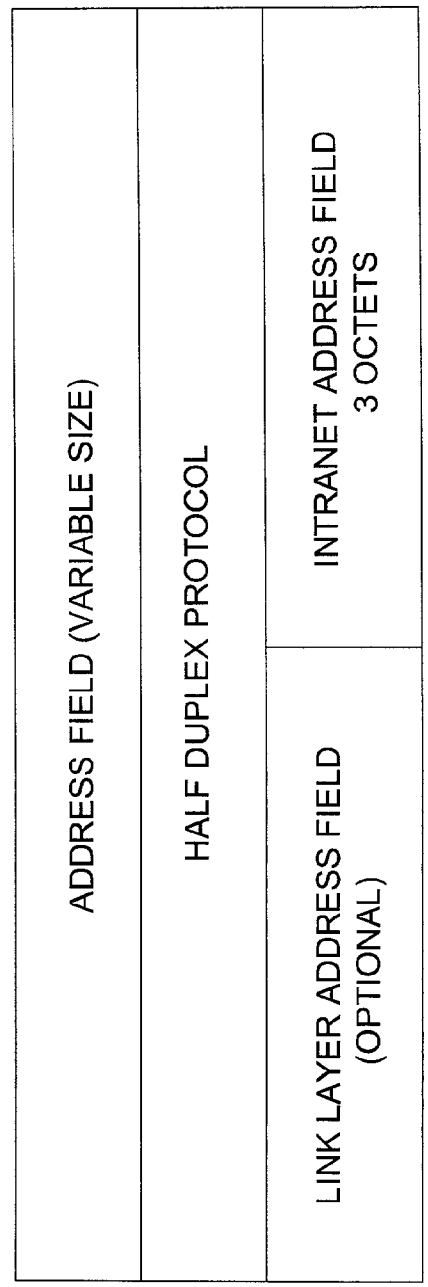
FIG. 17B is an address field based on a half duplex protocol.

S-frames are used to convey link supervisory data including acknowlegement of an I-frame and whether or not a station is ready to receive. The S-frame format is as shown in FIGS. 17A and 17B.

The Intranet Address Field is limited to two addressee octets, the first octet is the originating station (of the S Frame), and the second is the destination station of the S Frame. The destination address may be the global station value when transmitting either the RR or RNR Command Frame. The Frame Type also indicates the station mode (Ready/Not Ready).

FIG. 18 depicts the format of the control field for HALF DUPLEX (DTE) RADIO PROTOCOL.

In FIG. 18, I1 is used to acknowledge a Single Frame Transmissions I1 not set in the received "I" frame. Also any combination of bits may be set, acknowledging multiple "I" frames (up to 4).

"05" HEX=RNR Command–Does NOT acknowledge "I" frames.

"01" HEX=RR Command–Does NOT acknowledge "I" frames.

Receive Not Ready Procedure

A station shall generate and transmit an RNR Command if its Response Mode station classamark is enabled and it receives an I-frame which it cannot accept because its receive buffers are full. A station shall also generate an RNR command when directed by the user interface. The RNR S-FRAME does NOT acknowledge any I-FRAME. The Frame Type Field is also set to the Not Ready value.

Upon receipt of an RNR frame from the interfacing station, a station shall temporarily inhibit transmission of I-Frames to that station and shall transfer a Degraded Performance Signal to the user interface. Normal transmissions of I-Frames to that station shall resume upon receipt of an RR command from the station, when it receives an I Frame with the Frame Type field set to Ready, or when commanded by the local user/operator.

To implement a receive ready procedure, a station generates and transmits an RR frame if its Response Mode station classmark is enabled and one of the following conditions exist:

1. The station is no longer busy and had previously sent an RNR command.
2. The station has accepted an I-frame from a transmitting station which requires acknowledgement.
3. As directed by the user/operator.

The control field of the RR frame indicates RR command and RR response. The RR response is generated and transmitted by a station to acknowledge the acceptance of an I-frame, and is addressed to the I-frame originator.

The RR command is generated and transmitted by a station to indicate the end of the busy/buffer full condition. The Frame Type field is also set to the Ready value when a busy condition clears. The RR command frame is addressed to the global address (ALL ONES). The RR Command S-FRAME does NOT acknowledge any I-FRAMES.

For U-FRAME Processing the half duplex protocol only uses the UI Frame. This frame has an information field. The UI Frame is not acknowledged in the half duplex protocol.

Within the Frame priority, the UI Frame is transmitted before any pendng S or I Frames. The UI Frame uses the appropriate address field for the half duplex mode. Received UI frames are passed to an intermediate Layer for processing.

Figure 19:
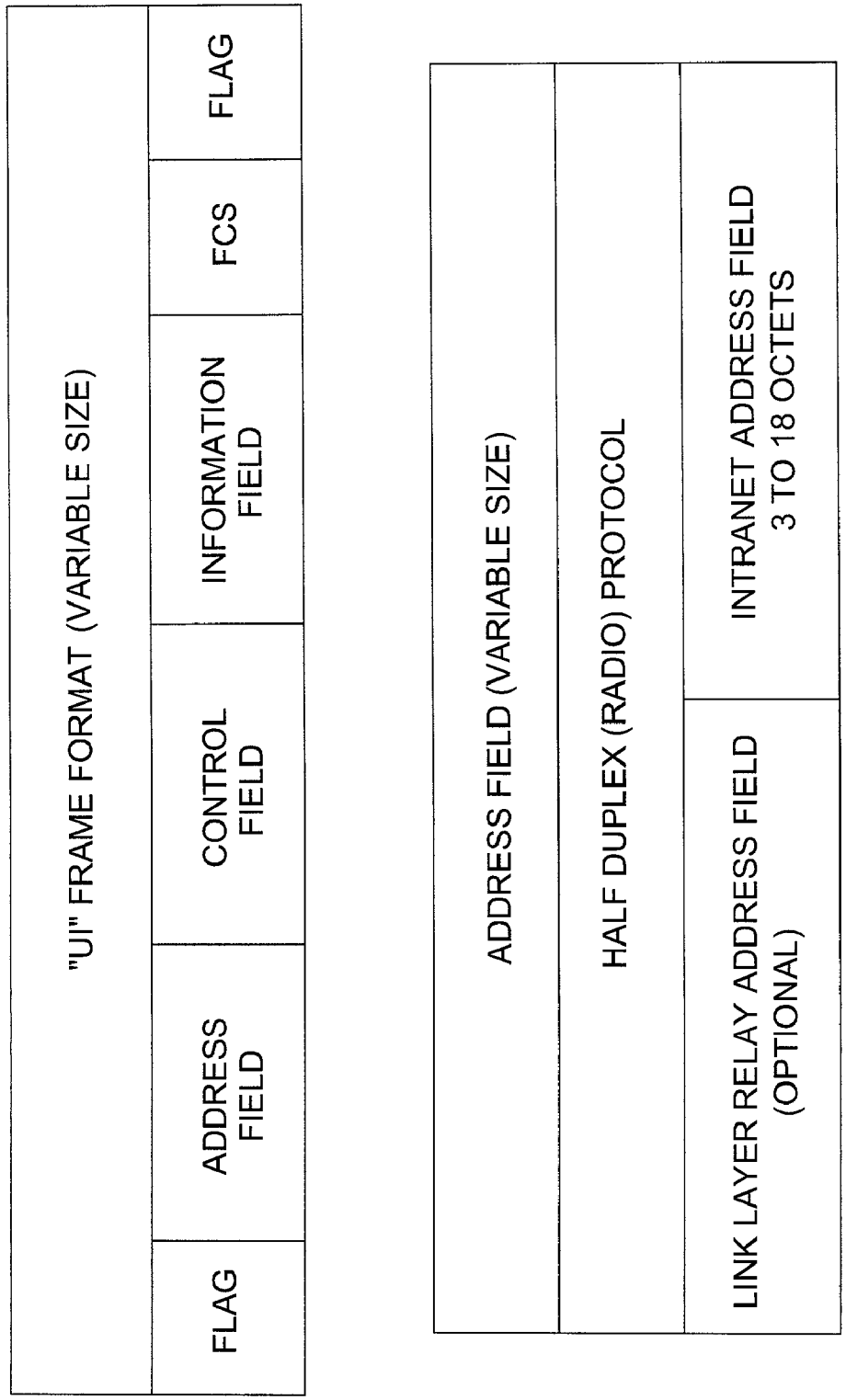
FIG. 19 depicts a "UI" Frame format and an address field.

The UI Frame has the format shown in FIG. 19.

A description of the Address Field will be presented. The Address field for Point-To-Point interfaces shall also be described.

The UI Frame Control field is coded as follows:
UI FRAME CONTROL FIELD
1 OCTET
0 0 0 0 0 0 1 1

The Information field is User defined and is limited to the frame size as specified in the System Classmarks. The FCS shall be either a 16 or 32 bit field as defined in the Link/Net Classmarks.

The multiple station net access and data net sensing ensures orderly and nonconflicting transmissions. There are four basic subfunctions that are implemented to ensure coordinated net access by its stations:

Net Busy Sensing

The presence of multiple stations on a single random access communications net requires data Net Busy Sensing and the use of the net access control to reduce the possibility of data collisions on the net.

The combined Data and Voice Nets require cooperation between the DTE and the DCE (radio). The Data itself is based on precedence and therefore is used in Net Access Delay calculations.

The DCE (radio) indicates the presence of receive data with the "I" signal on the X21 interface. The "I" ON represents:
1. Data being received
2. Voice being received
3. Radio Busy (not available)
4. Voice being transmitted Message transmissions resume after the data Net Busy Sensing indicator (the X.21 "I") is reset (OFF) for the following conditions:
1. loss of RF signal (voice or data)
2. Voice transmission complete
3. Radio is no longer busy Response Hold Delay (RHD)

There are two modes of Response Hold Delay:
1. "Scheduled" Acknowledgement
2. "CSMA" Acknowledgement The Scheduled Acknowledgement is where the layer two schedules the acknowledgement based on ly on the RHD. The CSMA Acknowledgement is where layer two sends the acknowledgement (transmit request) as soon as it can and the radio Carrier Sense Multiple Access (CSMA) resolves the net access problem. In the "CSMA" mode the RHD is set to zero. In the "Scheduled" mode the RHD is computed based on the address position. This calculation is described in the paragraphs below.

The RHD is the time each receiving station delays before responding with an RR, or RNR S-FRAME upon receiving an I-FRAME. The number of RHD periods used is determined by the position of the receiving station's address in the I-FRAME Address Field. One RHD period is calculated by the following formula:

$$RHDo = A + F + D + T$$

Where:
A RADIO SYNC TIME
F=FRAME TRANSMIT TIME (S-FRAME)
D=FORWARD ERROR CORRECTION (RADIO) DELAY
T=TRANSFER TIME (DCE to DTE)

The individual addressee's Response Hold Delay (RHDi) is calculated by:

$$RHDi = (i-1)RHDo + P$$

Where: $(1 <= i <= 16)$=the individual station's position in the Intranet Address field

OR

Where: $(1 <= i <= 64)$=the individual station's position in the Intranet
Address field of the last frame in a multi-frame transmission

AND

P=Processing/safe store time (1st addressee only)

Timeout Period (TP)

The TP is defined as the time required by the transmitting station to:
1) provide a window of time in which to receive the anticipated response frame(s), and
2) to establish a period of time before it will schedule the Net Access Delay (NAD).

The TP is required by the receiving station to establish a period of time before it will schedule the NAD. The TP is for all stations regardless if they are an addressee or not.

Upon completion of a message transmission, the transmitting station will start the TP timer. If all expected responses are NOT received before the TP, the message is queued (LIFO by precedence) for retransmission with the previsouly acknowledged addresses deleted from the new Intranet Address field. The message is retransmitted when its precedence is at the top of the queue.

In the "Scheduled" Acknowledgement mode the TP is calculated by all stations on the net as follows:

$$TP = j(RHDo) + P$$

Where j=The total number of addressees in ALL the frames in the transmission that require acknowledgement In the "CSMA" Acknowledgement mode the TP is calculated by all stations receiving the message as follows:

$$TP = HDX\ T1$$

Where HDX T1 is defined in the Link/Net Classmarks

Net Access Delay (NAD)

NAD is defined as the time a station must wait after detecting a net NOT busy before attempting to access the net. This procedure is dependent on the acknowledgement mode. The "CSMA" Acknowledgement mode is where the protocol relies on the radio CSMA algorithm to resolve contention in a given priority category. For the "Scheduled" Acknowledgement mode, the layer two resolves the contention.

The message precedence is used in this calculation to ensure that the highest precedence message occupies the net.

If an I-frame is received satisfactorily, each receiving station initiates a TP timer to allow the addressees to respond.

If an I-frame is not received satisfactorily, the receiving station waits for the expiration of the message length time before initiating the NAD. The message length time is calculated as:

TP=16×RHDo(Assume 16 addresses) for the Scheduled mode

TP=1.5 seconds for the CSMA Mode

After the TP timer expires, each station calculates its individual NAD. The NAD shall be calculated by the following formula for the scheduled mode:

AND=(C+(10 ms*R)+(50 ms*p))

Where:
  C=Channel Access Time
  p=Precedence of I-FRAME on the top of the queue (0=the Highest & 3=the Lowest)
  R=Random integer from 0 to 7

The NAD shall be calculated by the following formula for the CSMA mode:

NAD=(50 ms*p)

Where: p=Precedence of I-FRAME on the top of the queue

After NAD expires the Net Busy is tested.
1. If the Net is NOT BUSY, the Highest precedence I-FRAME is transmitted.
2. If the Net is BUSY, the receive must process the data after the X.21 "I" lead is OFF.
3. If there is no data, voice is assumed and NAD is recomputed.
4. When data is present TP is calculated.

The full duplex protocol and procedures is used on synchronous communications links between two stations.

The Full Duplex IMPROVED User Data Protocol is based on the X.25 recommendations as specified in the CCITT RED BOOK. This protocol uses the Link Access Procedures Balanced (LAPB). The physical interface for this protocol is X.21 leased circuit service—point-to-point and packet-switched service. The class of procedure is balanced asynchronous, using only the basic mode of operation.

The IMPROVED User Data Protocol is implemented using various physical interfaces. The X.21 interface is one of these interfaces.

The data link layer is independent of the physical layer. The data link layer requires synchronous full duplex communications links. The data link processing is based on HDLC LAPB as described in recommendation X.25. The data link protocol has the following restrictions/limitations:
1. uses the basic mode only (Modulus 8);
2. does not use the SREJ S-Frame;
3. uses a 16 or 32 Bit Frame Check Sequence (FCS);
4. transmits the low-order bit first of each octet (Address Control & Information Fields);
5. transmits the Frame Check Sequence high-order bit first;

For the purposes of illustration, all figures and tables depict the bit assignments in a binary format (hex). The bits are transmitted as specified above.

Frame Structures

All transfers of information, commands, and responses is accomplished utilizing frames bounded by flags. The following tables shown in FIGS. 20A and 20B depict the frame structure for the basic (Modulo 8) operation. All frame fields are mandatory, with the exception of the information field.

FLAG SEQUENCE

The Flag is unique eight-bit sequence of a zero, six ones, and a zero (01111110). A Flag is transmitted at the beginning and at the end of each frame. When the link is "active", flags are transmitted between frames as interframe time fill and whenever the station is not transmitting a frame or an abort sequence. Frames received without beginning and ending flags are ignored.

At the transmitting station, the flag that ends a frame is not the opening flag of the next frame; that is at least two flags separate successive frames. The receiving station, however, is capable of accepting frames separated by only one flag. This feature facilitates the ability to discern a valid frame on a link which has experienced data corruption due to a link error.

Address Field

The Address field consists of one octet. The coding of the Address Field is as follows:
  Single link Operation Command 00000011
    Response 00000001

Each station shall discard frames received with an address other than Command or Response.

Control Field

For modulo 8 (basic) operation the control field consists of one octet.

The control field contains a command or a response, and sequence numbers where applicable. Three types of control field formats are used: numbered information transfers (I format), supervisory functions (S format) and unnumbered control functions (U format). The control field formats for basic operation are presented in the table shown in FIG. 21.

Receive Ready (RR) Frame

The receive ready (RR) supervisory frame is used to:
1. indicate that the station is ready to receive an I Frame
2. acknowledge previously received I Frames numbered up to and including N(R)−1
3. clear a previously busy condition.

The RR frame transmitted with the P bit set (command) is used by a station to ask for the status of receiving station. The response (RR/RNR) is returned with the final bit set.

Receive Not Ready (RNR) Frame

The receive not ready (RNR) supervisory frame is used to indicate a busy condition by the transmitter. The RNR acknowledges previous I Frames up to and including N(R)−1. The RNR frame transmitted with the P bit set (command) may be used by a station to ask for the status of receiving station. The response (RRIRNR) would be returned with the final bit set. When a station is in the busy condition, and an I Frame is received, a RNR frame is transmitted to reinforce the busy condition. The N(R) does not acknowledge the I frame received during the busy condition.

Reject (REJ) Frame

The reject (REJ) supervisory frame is used by a station to request transmission of I frames starting with the frame number N(R). I frames numbered N(R)−1 and below are acknowledged. Additional I frames pending initial transmission may be transmitted following the retransmitted I frames. Only one REJ exception condition for a given direction may be established at any time. The REJ exception condition is cleared upon receipt of an I frame with a N(S) equal to the N(R) of the REJ frame. The REJ may be used to clear a busy condition that was reported earlier by a RNR. A REJ with the P bit set also requests the status of the receiving station.

The following table of FIG. 22 depicts the general U Frame format and those specific formats which are used by the IMPROVED User Data Protocol.

It is indicated in conjunction with FIG. 22, unnumbered frames (commands and response) are used to extend the number of link supervisory functions. Unnumbered frames do not directly modify the send or receive variables at either the sending or receiving stations. Unnumbered frames can alter the link mode and therefore reset the send and receive variables. A link has on unnumbered frame outstanding in each direction. Unnumbered frames require an acknowledgment is performed by the receiving station sending an Unnumbered Acknowledgment (UA) frame. The transmission of the UA frame is an indication that the receiving station has received, accepted, and implemented the command. The recipient of the UA frame can implement the command at it's station when applicable. The following are descriptions of the Unnumbered Frames exchanged by the IMPROVED User Data Protocol. References to the link state and modes by the mode setting frames are discussed in detail later.

Unnumbered Information (UI) Frame

UI frames are used to contain information exchanges for protocol layers higher than the link level. A UI frame's contents are analyzed at the higher layers, but a UI frame is acknowledged with a UA response frame at the link layer. UI frames are accepted in a busy condition but not in a disconnected state.

Set Asynchronous Balance Mode (SABM) Frame

The SABM command is used to place both stations in an asynchronous balanced mode (ABM) Information Transfer State where all command/response control fields are one octet in length. When an SABM frame is acknowledged or when an acknowledge is received for an SABM sent, the station resets both the send and receive variables and clears all exception conditions.

Previously transmitted I frames that are unacknowledged when this command is implemented remain unacknowledged. It will be the higher layer protocols responsibility for the recovery/retransmission of those I frames.

The SABM causes the transition from the Link Initialization Mode (LIM) of the Initialization State (IS) to the Asynchronous Balance Mode (ABM) of the Information Transfer State (ITS).

Disconnect Command (DISC) Frame

The DISC command is used to terminate the current mode. The command informs the receiving station that operations are being suspended or terminated. The receiving station acknowledges the DISC command by the transmission of an UA frame. Previously transmitted I frames that are acknowledged remain unacknowledged. It is the responsibility of the higher layer protocol to take recovery actions. When a station transmits a DISC command frame, it does not accept additional I frames by the use of a RNR S frame.

Set Initialization Mode (SIM) Frame

The SIM command is used to cause the receiving station to initiate procedure for the initialization of the link layer functions. The SIM command causes the transition from the Asynchronous Disconnect Mode (ADM) of the Logical Disconnect State (LDS) to the Link Initialization Mode (LIM) of the Initialization State (IS).

Unnumbered Acknowledgment (UA) Frame

The UA response is used by a station to acknowledge the receipt and acceptance of Unnumbered frames. Received made setting commands are not actuated until the UA response is transmitted/received.

Disconnect Mode (DM) Frame

The DM respones is used to report a status where the station is in the Logical Disconnect State.

Frame Reject (FRMR) Frame

The FRMR response is used by a station to report an error condition not recoverable by the retransmission of the identical frame.

The IMPROVED User Data Protocol only uses the FRMR to report an invalid N(R). The recommended action by the recipient of an FRMR for an invalid N(R) is to send an SABM to clear the send and receive variables. A station accepts a FRMR frame which indicates other detected errors, and the recommended action is to forward the information to the User/Operator. These other error conditions causes the frame to be discarded by the recipient. The sender retrys until all retransmissions have failed and then initiates disconnect procedures by the transmission of the DISC command.

The FRMR U Frame contains an information Field and the coding is shown in FIG. 23.

As stated above the IUDP discards and ignores frames that contain the errors as specified by the reason bits W, X, & Y. It is assumed that the sending station will retransmit the frame in question and the receiving station will receive it correctly. If the frame is not received correctly the sending station will initiate disconnect procedures and both stations will enter the ETM of LDS and test their respective hardware.

Information Field

The information field follows the control field in I Frames, and UI Frames. The information field contains an integral number of octets, up to a maximum as specified in the configuration parameters. Any bits added to the information field to make it an integral number of octets shall be set to zero.

The structure of the I Frame Information field is the same as in the half duplex protocol. The Information field structure will be described.

Frame Check Sequence

All frames include a Frame Check Sequence (FCS). The FCS for the full duplex protocol is a 16 or 32 bit remainder of a modulo 2 polynomial division process on the contents of the address, control and information fields prior to the zero bit insertion. The FCS size is defined in the Link/Net Classmarks.

Abort Sequence

A station may terminate a frame at any time in the process of transmission by the transmission of an abort sequence. An abort sequence consists of seven (7) to 15 contiguous one bits.

Zero Bit Insertion/Deletion

To provide complete transparency for transmitted data a zero bit insertion mechanism is used to prevent a flag sequence from occurring in the frame. A zero is inserted by the transmitting station following five (5) contiguous one bits in the data stream. This includes the last five bits of the FCS.

Receive data is examined to remove these inserted zero bits. When five contiguous cone bits are detected, the sixth bit is examined. If the sixth bit is a zero, it is deleted; if the sixth bit is a one, the seventh bit is examined. If the seventh bit is a zero, a Flag is detected. If the seventh bit is a one, then an abort sequence is detected.

Invalid Frame

An invalid frame is one which is not bounded by a beginning and ending flag, or one which is too short, or one which is too long. Frames which have an invalid address field or a FCS error are discarded as invalid frames.

A frame is too short when there are less than four octets between flags. A frame is too long when the number of octets exceeds the SPECIFIED maximum size. A frame which has terminated by an abort sequence is invalid. Invalid frames are ignored and discarded upon detection of the error.

Logical States, Modes, and Conditions

All stations shall be in one of three states: logical disconnect, initialization, or information transfer. Within each are modes which specify response opportunities and a logical data link configuration. FIG. 24 shows the logical states and modes, and the transitions between stations.

As shown in FIG. 24, there exists three distinct states for the equipment which are dictated by the protocol. Each station as any DTE or DCE is in one of the three states which is shown in FIG. 24 is a logical disconnect state shown on the left hand side, an initialization state shown in the center, and an information transfer state. As seen by the legend an AIM stands for automatic initialization mode, EIM is equipment initialization mode and so on. Therefore, one can determine based on events exactly what will occur by reference to FIG. 24. Thus as depicted in FIG. 24, equipment can be transferring information or can be transferring flags as attempting to obtain synchronization, can be in a local test mode or can experience a protocol or hardware failure which would initiate a time-out.

Referring to FIG. 25, there is shown a table which shows the station responses to received frames in the three link states. For example, in the row designated as I Frame, one state can be the asynchronous disconnect mode where the equipment sends a disconnect mode signal (DM) or an asynchronous disconnect mode signal. In the link initialization mode which is the LIM of the initial state the equipment sends nothing or sends a link initialization mode signal. In the ABM state, which is the asynchronous balance mode, one can send no response or a asynchronous balance mode signal.

Logical Disconnect State (LDS)

The LDS is provided to prevent a station from appearing on the link in a fully operational sense during unusual situations or during exception conditions. No information or supervisory frames are transmitted or accepted while a station is in LDS. When a station is in the Asynchronous Disconnect Mode (ADM) of LDS, only Unnumbered frames may be transmitted or responded to. Each LDS mode is described in the following paragraphs.

Equipment Initialization Mode (EIM)

A station enters the equipment initialization mode when a link is activated by the operator or when auto initialization (Optional Mode) is active following a loss of synchronization or a protocol disconnect/failure. During the time no frame activity is sent to or received from the link. The station transmits flag characters and monitors the link for receipt of flag characters. Link synchronization is established upon receipt of flag characters, and the station enters the Asynchronous Disconnect Mode (ADM). The station shall remain in EIM until synchronization is achieved (no time limit) or exit to Equipment Test Mode on operator command or on detecting a hardware fault.

Asynchronous Disconnect Mode (ADM)

The station enters ADM from EIM upon achieving link synchronization (transmitting and receiving flags) or from the Asynchronous Balanced Mode of the Information Transfer State when a DM Response Frame is received. While an ADM, the station continues to transmit flags sequences to maintain synchronization and a SIM Command Frame is transmitted on the link. The station exits ADM:

1. to the equipment test mode upon loss of synchronization, operator command, or upon five transmission of the SIM without acknowledgment followed by acceptance of a DISC Command Frame, or five transmissions of the DISC frame without an acknowledgment.
2. to the link initialization mode of the initialization state upon receipt of an acknowledgment for the transmitted SIM, or upon transmitting an acknowledgment for a received SIM Frame.
3. to the equipment test mode upon transmitting an acknowledgment for a received DISC Frame.

The following specify the procedure which are followed to effect recovery after detection of exception conditions.

SIM Received after SIM Sent

If a station receives a SIM after having sent a SIM, the station acknowledges the received SIM and enters the Link Initialization Mode of the Initialization State. However the sent SIM condition (U Frame outstanding) must be cleared by the receipt of an acknowledgment (UA Frame) or a timeout (basic mode, 2 seconds) before another U frame an be sent.

SIM not Acknowledged

If a SIM times out, it shall be retransmitted (up to 4 retransmissions). A received SIM is acknowledged and the station enters the LIM of IS. While in LIM of IS, the outstanding SIM prevents another U Frame from being transmitted. This condition is cleared when an acknowledgment is received. Due to synchronization timing, a station may miss a SIM Frame. When a SIM timeout occurs after the transition to LIM of IS, the SIM condition is considered resolved and the pending U Frame is transmitted.

Automatic Initialization Mode (AIM)

The AIM is an optional mode. Its purpose is to relieve the operator from the task of initializing the link after a disconnect (assuming local equipment test pass).

The AIM procedures are entered from ETM and simulate the operator command to initialize the link.

Equipment Test Mode (ETM)

Stations enter ETM when:

1. Equipment validation tests fail or the operator stops the synchronization process while in ETM, or the operator halts the link while in the Information Transfer State.
2. Synchronization, or protocol failure occurs in LDS. IS, or ITS.
3. A DISC Frame was acknowledged.
4. After 15 seconds without receiving any valid frame A protocol failure is defined as exceeding the maximum number of retransmission of a frame without receiving an acknowledgment. The ETM executes those diagnostic tests required to determine that the hardware associated with the link is working correctly. No frames are transmitted or accepted while in the ETM. The station shall remain in ETM until:

1. Internal tests fail, and the station enters the Equipment Failure Mode (EFM)
2. The operator request the link to be initialized, and the station enters the EIM
3. A successful test sequence has completed an the AIM option is enabled, the station enters the AIM Equipment Failure Mode (EFM)

Stations enter the EFM upon failure of the internal equipment tests while in ETM. In EFM, stations shall neither transmit or accept any data on the link. Stations exit EFM to ETM upon direction from the operator after correcting/replacing the failed equipment.

Initialization State

The Initialization State only contains one (1) mode, the Link Initialization Mode (LIM).

Link Initialization Mode (LIM)

The LIM is entered when a station acknowledges a SIM or receives an acknowledgment for a transmitted SIM.

Only U Frames may be exchanged during the initialization state. A SIM timeout clears the SIM condition in the LIM.

The station exchanges SABM frames with the distant station. When either a station sends an acknowledgment for a received SABM or received an acknowledgment for a transmitted SABM the station transitions to the Information State (ITS). The SABM specifies the basic mode (modulus 8).

Information Transfer State (ITS)

All frame types are permitted in the ITS. The ITS encompasses one mode, the Asynchronous Balance Mode (ABM).

Asynchronous Balance Mode (ABM)

There are conditions within ABM used to facilitate the control of traffic flow. The ABM of ITS is where I frames are exchanged between the two stations.

The ABM of ITS is entered from LIM of IS when a UA is received for a transmitted SABM or when a UA is transmitted for a received SABM. While in ABM, each station is capable of transmitting and receiving I, S, and U frames, subject to the constraints of the station condition within ABM as defined in the following paragraphs.

A station exits ABM and goes to ETM or ADM as follows:
1. To ETM when a frame is repeated five (5) times without acknowledgment followed by the acknowledgment of a transmitted DISC or after five (5) transmissions of the DISC without an acknowledgment.
2. To ETM when a DISC is received and acknowledged, or when NO VALID frame is received for 15 seconds.
3. To ADM when a DM is received.

The following are descriptions of the various conditions which can exists in ITS. NORMAL CONDITIONS The normal condition of ABM within ITS has the following characteristics:
1. Both stations are in the receive ready condition, both exchanging RR Frames.
2. There exists no link exceptions, when neither station is retransmitting I Frames or waiting for retransmitted I Frames as a result of one or both stations transmitting/receiving a REJ Frame.

Busy Condition

A busy condition occurs when a station temporarily cannot receive I Frames due to internal constraints, such as buffer limitations. The Busy Condition is reported by the transmission of a RNR Frame with the N(R) of the next expected I Frame. All frames equal to or less than N(R)−1 are acknowledged. I Frames received by a station which has transmitted a RNR are responded to by another RNR, and the received I Frames are ignored. When a RNR is received, the station ceases transmitting I frames. The station does not resume the transmission of I Frames until the Busy condition has been cleared. The Busy Condition is normally cleared by the receipt of a RR Frame. Other frames are clear a busy condition are:
  REJ Frame
  SABM Frame Exception Conditions N(S) Sequence Error An N(S) sequence exception is established in the receiving station when an I Frame, otherwise error free, contains an N(S) sequence number which is not equal to the expected Receive variable. The receiving station ignores the I Frame, and responds with a REJ Frame indicating the next expected sequence number specified by the N(R). Previous I Frames with sequence numbers equal to or less than N(R)−1 are acknowledged.

The station which received a REJ Frame shall retransmit all outstanding I Frames starting with the sequence number as specified by the N(R) in the REJ Frame. New I Frames shall be held until the retransmission has completed.

N(R) Sequence Error

When a frame is received with an N(R) greater than the next send sequence number a non-recoverable exception has been established. The received frame is discarded and a FRMR is sent indicating the invalid N(R) condition. This error can only be cleared by the resetting of the send and receive variables at both stations. The station that receives the FRMR responds by the transmission of a SABM Frame. The completed SABM sequence clears the exceptions and re-establish the send and receive variables at both stations.

Timeout Recovery

In the event a receiving station, due to a transmission, does not receive, or receives and discards an I Frame or the last I Frame in a sequence of I Frames, it will not detect an out-of-sequence exception and therefore will not transmit a REF Frame. The station which transmits the unacknowledged I Frame retransmits the I frame following the Timeout period (2 seconds) for that frame. When a station has reached the maximum number of outstanding I Frames (not acknowledged), the station only retransmits the last I Frame on the timeout and takes the appropriate recovery action based on the response from the distant station. The distant station responds with an S Frame indicating the acknowledgment for the frames, or indicate a Busy condition, or send a REJ indicating which frames are to be retransmitted. Should a frame be transmitted five (5) times without an acknowledgment, the transmitting station shall declare a protocol failure and initiate the transmission of a DISC Frame. After receiving an acknowledgment for the DISC Frame or after five transmission of the DISC Frame without an acknowledgment, the station enters the ETM of the LDS.

Default Frame Transmission

In the event a station does not have any I Frames to transmit, it transmits the current S Frame after two (2) seconds of interframe fill time. This S Frame indicates the current state of the station BUSY/NOT BUSY (RR/RNR), indicate the next expected I Frame number, and provides assurance to the distant station that the protocol and the link is operational.

If a valid Frame is not received within a fifteen (15) second time period, the detecting station shall initiate disconnect procedures by the transmission of a DISC Frame. The Default Frame Transmission every two seconds will reset the fifteen second timer when the frame is received correctly. These procedures will detect out of synchronization in the absence of I Frame traffic.

LAPB System Parameters

The system parameters apply to both the DCE and the DTE. No variation shall exist between the two stations. The values of these parameters are fixed. The DCE and DTE system parameters are as follows:

T1 Timer

The T1 timer is the maximum time a station waits for an acknowledgment of a frame transmitted before the frame is retransmitted. The value of T1 shall be 2 seconds. Each frame transmitted shall be assigned a T1 timer. When the T1 timer expires for an I Frame, the last I frame transmitted shall be retransmitted. Also the T1 timeres for 1 Frames are halted in the event the receive station replies with an RNR S Frame indicating a busy condition. The T1 timers shall be resumed after the busy condition clears when the frames are retransmitted in order of their N(S) number.

T2 TIMER

The T2 timer is the amount of time a station should wait before an acknowledging frame is initiated for a received frame. For the IMPROVED User Data Protocol this value is 200 milliseconds. In the case of acknowledging an I frame, an S Frame is scheduled in 200 ms when there is no pending I Frames that can acknowledge the received frame on the transmit queue. If an I frame is placed on the transmit queue prior to the expiration of the T2 timer, then the timer is canceled. If the T2 timer is acitve, it is not restarted when subsequent I Frames are received. U Frames are acknowledged at the next transmission opportunity after reception or if required, implementation of the frame.

T3 TIMER

The T3 timer is a no traffic timer. Its value is 15 seconds. This timer is reset upon the receipt of a valid frame. When the T3 timer expired link disconnect procedures are to be initiated by the transmission of a DISC Frame.

N2 Maximum Transmission Attempts

The N2 parameter indicates the maximum number of attempts to complete the successful transmission of a frame. The value of N2 is five (5), the original transmission and four (4) retransmissions.

N1 Maximum Number of Bits in an I Frame

N1 is an adjustable parameter based on the system classmarks. The default value is 2,048 or 256 octets. This parameter must be padded to align on an octet boundary.

K Maximum Number Of Outstanding I Frames

The value of K indicates the maximum number of sequentially numbered I Frames that a station may have outstanding (Not acknowledged) at any given time. For the IMPROVED User Data Protocol this value is seven (7), the modulus (8) minus 1.

Network Layer Processing

The network layer provides both the Internet and Intranet routing. The Internet addressing is a "built in" function of the IMPROVED User Data Protocol. The random access Intranet routing for half duplex (radio) interfaces shares the network layer.

The foundation of the Network layer 3 is the Internet Header. The Internet Header also supports the other OSI layers of the IUDP. The network layer receives addressed frames from either the Transport or the Link layers. The Internet Header is initially examined for routing purposes. Frames which terminate at this station are passed to layer 4. Frames which require additional transmission are returned to layer 2 with a new internet header and if the interface is half duplex, a new Intranet Header. Further, if the net uses the Relay option, then a new Link Relay Header is also created.

Internet Header

The Internet Header identifies the message, its originator, its classmarks, and its addresses. The FIG. 26 shows a layout of the Internet Header with two addressees. The first addressee is formatted using the basic Internet address, while the second is shown as an extended addressee. The Internet Header supports up to 16 addressees. The End of Routing (EOR) bit in the addressee status byte indicates the last addressee in the header. The table of FIG. 27 summarizes the Internet Header Elements and the following paragraphs describes each element in the Internet Header.

EOM Bit

The EOM bit is set (one) by the Transport Layer for the last Frame of a message.

Frame Sequence Number

The Frame Sequence Number is assigned initially by the Transport Layer. Each frame of a message is sequentially numbered and the last frame is indicated by the EOM bit. It should be noted that message that are contained in a single frame have a sequence number of one (1) and have the EOM bit set (one) indicating that its is a single frame message. When Transport generates multiple frames for a message, the Internet Header is copied (except for the EOM bit and Frame Sequence Number) into each frame. The Originator User-Id, Message Sequence Number, Precedence, Security, and Message Type/Protocol fields in conjunction with the Frame Sequence Number are used to identify the frames of a message.

Originator's Internet Address (User-Id)

This field contains the originator's User-Id. It is used to identify the originator of the message and uniquely identify the frames that belong to a multi frame message. When acknowledgments or other notifications are to be returned, they are addressed to this User-Id.

Message Sequence Number

The Message Sequence Number is a number assigned by the originator. It is used to identify message and message frames. Transport uses this field in the reassembly of messages from frames. Users use this field to identify the message being acknowledged. The Message Sequence Number is a four (4) digit number stored in the Internet Header as four (4) Binary Coded Decimal (BCD) digits.

Message Precedence

The Message Precedence field specifies the precedence of this message. Messages are transmitted First In First Our (FIFO) by precedence. This field is used in conjunction with the net priority classification on half duplex (radio) nets. The NETCON (Network) precedence is restricted to SYSCON and ICMP message types. The NETCON precedence shall not be used with any other message types. It should be noted that SYSCON and ICMP message types may use lower precedence values.

Message Security

The Message Classification field specifies the classification of the message. The IMPROVED User Data Protocol assumes a NETWORK HIGH classification as specified in the System parameters. Messages which exceed this level are not processed. They are discarded and a Security Violation is reported.

Message Type/Protocol

The Message Type or Protocol specifies the format and content of the data which follows the Internet Header. The SYSCON and Internet Control Message Protocol types are subsets of the IMPROVED User Data Protocol. These topics are not discussed in detail in this document. Refer to the applicable documents for detail formats and message contents. The User Defined Message type permits users of this protocol to define message types for their communication needs. Two values have been allocated in the User Defined range, these are as follows:

1. Message Acknowledgments, value is 41
2. Message Non delivery Notification, value is 42.

The Message Acknowledgment message indicates a Received, Read, and Printed confirmation by the recipient as requested by the originator.

FIG. 28 shows a table depicting the allocated range of message type values. Values not specified are reserved for future applications of the IMPROVED User Data Protocol.

The Tables of FIGS. 29 and 30 show some specific values assigned to each protocol class.

The Internet Control Messages are indicated in the Table of FIG. 30. For the message format and content see the Internet Control Message Protocol Specification.

The user defined message types have the following assignments as shown in FIG. 31. The user may specify the remaining values within their range to provide unique message or protocol identification.

FIG. 32 shows the format of the User Acknowledgment message Text Header.

The remaining User Defined Message types assigned by the implementors of this protocol for a given system. The User Defined types, are transparent to the internals of this protocol and as such provided an interoperatibility capability between systems or networks. The upper layers of each system resolve the differences between user groups.

The Encapsulated protocols that have been defined are listed in the Table of FIG. 33.

Maximum Hop Count

The maximum hop count is set by the originator to limit the number of internet transmission (hops) of the message. This count is decremented by each internet transmission. When the count reaches zero, the message is discarded. This field should be set to minus one (−1) when the count is unknown. Control of the value used here may be controlled by the System Management.

Destination's Internet Address (User-Id)

Figure 34:
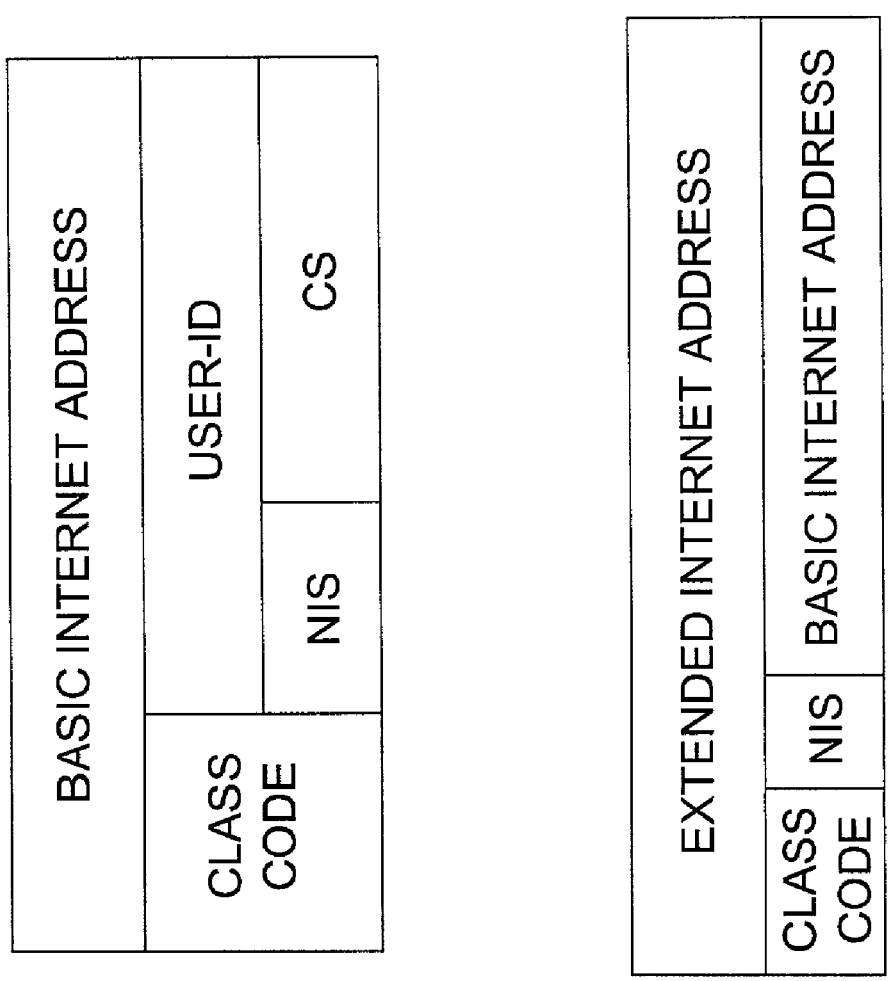
FIG. 34 is a table depicting an Internet Address.

There are two general classes of destination addressee, the Basic or normal Internet Address which consists of a USER-ID, and the Extended Internet Address which consists of a temporary net affiliation followed by the USER-ID. USER-IDs contain two fields, a net identifier (NIS) and a call sign (CS). The Extended Address has a net identifier, which specifies the net where the addressee can be found, followed by the addressee's USER-ID. FIG. 34 shows simple illustrations of the Basic and Extended Internet Addresses with the address Class Code field.

The Class Code depicted in FIG. 34 in the extended address is NOT required to be the same as the Class Code in the basic address. The NIS ranges up to a maximum of 14 Bits.

Each destination address entry in the Internet Header contains a status byte. This field indicates the address type (Basic or Extended), the addressee's acknowledgment responsibilities, and the status of the addressee (delivered/not delivered). The Table of FIG. 35 shows the format and content of the status byte.

The Status bits A1, A2 & A3 of FIG. 35 specify the destination End-to-End Acknowledgment requirements for each addressee. Each addressee is required to return these acknowledgments to the originator for each acknowledgment indicated when the event occurs. These are not link layer frame acknowledgment.

Internet Addresses (User-Ids)

The Internal address is in the form of: NIS/CS or NIS:NIS/CS which is stored in 3 or 5 octets/bytes. The NIS is a Net Identification String and the CS is a Call Sign. This address is stored right justified in a 4 or 6 octet field. The Most Significant Byte is the address status byte. This status byte contains a indicator which specifies the number of address bytes that follow. The indicator is designated as the "EXTEND" bit and when set (1) specifies an extended address of 5 bytes. FIGS. 36 and 37 depict the general format of these two Internet Addresses.

In FIGS. 36 and 37, the XXZ is the user's original Internet Address and the YY is the assigned Net. The Internet Address is often referred to as the USER-ID. The IMPROVED User Data Protocol provides multiple classes of Internet Addresses. The general break down of the Internet address is shown in FIG. 38.

The Class Codes of FIG. 38 are the two (2) most significant bits of the address and the values are as follows:

00 User Class I
01 Reserved
10 Internet Equipment/Function Class I
11 Reserved

The Class codes can be logically included in the NIS codes. The purpose of these classes is to extend the addressing capabilities through the use of address masks. The NIS has been depicted as a two (2) octet field and the call sign has been depicted as a one (I) octet field. Using the address class, the remaining 22 Bits of addressing can be allocated by the use of address mask. For example, the allocation can reassign the NIS to a single octet, and the call sign to a two (2) octet field. The User Class 1 address consists of 14 bits for the NIS and eight (8) bits for the call sign, and the Internet Equipment Class 1 address consists of 14 bits for the NIS, two (2) bits for a function code, and six (6) bits for the call sign. In the later case the function code can be combined with the call sign for routing purposes, however, the final destination can use the function bits for special purposes.

Implementors of this protocol can used this classification of Internet Addresses to solve their communication requirements. When address masks are used to isolate the addressing elements, they must be defined in the System Classmarks to prevent addressing errors within the Network.

The following routing description do not describe the address classes or the use of the address masks. These descriptions show how the NIS and Call Sign elements represent the routing functions of first, reaching the destination net, second, reaching the destination station, and finally reaching the destination process or user.

Network Layer 3a Routing

In general, the Network Layer 3A routing examines the destination addressee(s) int he Internet Header and determines the disposition for that addressee by the directions found in the routing tables. This process determines the next action based on the protocol of the routing table. There are three general disposition types:

1. Local Termination
2. Transmission over an Access Circuit
3. Transmission over a Half Duplex Radio Net Each addressee is examined to determine if the addressee is located in the home net. If the home net is indicated, the home net numbers routing tables are used to determine the disposition of the local addressee. If the addressee is not located in the home net, the Internet routing tables are used to find the disposition of the addressee. This disposition is usually to the next HOP toward the destination net. If the net is not found in the table, one of two options are available:

1. Send the frame with the addressee to a default Exit Point or Router
2. Discard that addressee as an invalid address The entry for each address argument in the routing table should indicate the following:

1. Channel/Port number when this route requires an access circuit transmission.
2. Station Address/Port number when this route requires a radio net transmission.
3. An interface protocol procedure or queue when this route terminates at this station.

The Channel/Port number indicates a transmission queue for an interface to another switching node. That switching node shall repeat the routing process for all the addressee(s) routed there. The routing process sorts the addressee by disposition class and port, builds a new Internet Header with only those addressee(s) which are to be transmitted over that port.

The Station Address/Port number indicates the port and the station address/number to be added to the Intranet Header. Again only the addressee(s) for that port shall be placed in a new Internet Header in addition to the addressee's station number being placed in the Intranet header.

The interface protocol procedure or designated queue is for the application processing of the message at the local destination. Again only those addressee(s) with the same disposition is placed in the new Internet Header prior to the execution of the protocol procedure or the enqueuing of the message to the specified queue. Detail demultiplexing of messages by the Message Type/Protocol field shall be the responsibility of the initial application or Transport Layer.

Network Layer 3B Routing

The Network Layer 3B only applies to half duplex "Relay" nets. The network Layer 3B uses the Intranet Header generated by the Network Layer 3A to generate the Link Layer Header which contains a list of destination and/or relay stations. As an independent and optional feature, this layer and its related protocols are presented in Reference 1, Intranet Packet Relay Protocol Specification.

Network Congestion Control

Network congestion is monitored by the net controllers. When data activities exceed a threshold, the net controller sends a Net Congestion Control Notification (NCCN) to all net members. The NCCN is an I Frame which request the restriction of low precedence traffic, to one, reduce the amount of Intranet traffic, and two, to insure enough bandwidth for high precedence traffic.

Internet congestion is monitored by the Internet nodes, BICCs and Gateways. When an Internet node becomes congested it sends a Link Congested Control Notification (LCCN) to the members of one or more connected nets restricting low precedence Internet traffic. The LCCN reduces Intranet traffic by reducing the amount of traffic sent to one, the Internet Routers by individual stations, and two, by reducing the traffic loads between the Internet Routers and Internet Switching Nodes.

These and other congestion controls are described in more detail in the paragraphs below.

Station Congestion Control

The IUDP provides the ability for every station to restrict the receipt of data traffic (I Frames) through the use of Receiver Ready and Receiver Not Ready supervisory frames.

Congestion normally occurs when buffer or queue resources are almost exhausted. This event causes a station to enter the Busy mode or condition, as it can no longer accept data traffic. When the station declares the Busy condition by the transmission of the RNR, it does not accept any additional I Frames. When an I Frame is received while in the Busy condition, the station reinforces its Busy condition by the transmission of another RNR. The RNR has the Global address for Half Duplex interfaces. Additional congestion controls are described in the paragraphs below.

Half Duplex Interfaces

The Half Duplex Interfaces have, in addition to the S Frames, the Frame Type field which specified the station's mode Busy/Not Busy. The Frame Type makes it possible to indicate the originating station's condition without the repeated transmission of an S Frame. S Frame Commands which indicate a station's mode use the global address. Use of a specific address only effects the addressed station and Not the other stations on the Net.

Full Duplex Interfaces

The Full Duplex interface only uses the Receiver Ready and Receiver Not Ready supervisory frames. It should be noted that the N(R) does acknowledge frames up to N(R)−1 in both the RR and RNR frames. The Busy condition can be cleared with a REJ S Frame or a mode setting U Frame. The best way to clear the busy condition is by the transmission of the RR S Frame, as the other methods require additional time with the possibility of lost data due to the clearing of queue as in the case of the SABM or DM U Frame.

Link/Net Congestion Controls

The Net Controller can regulate the amount of data traffic on a link/net to reduce congestion and insure the success of high precedence traffic with the transmission of a Net Congestion Control Notification (NCCN). The NCCN is an I Frame addressed to various members of the Link/Net restricting routine and priority precedence traffic. The Net Controller determines the utilization of the Link/Net and makes either an automated or command decision. Destinations which receive a NCCN shall lock or unlock the specified precedence queue.

Internet Node Congestion Controls

Internet nodes (BICC & Gateway) have the same link layer congestion control procedures as any other station. They can use the link layer S Frames, Receiver Ready & Receiver Not Ready, to regulate the input traffic for processing.

Internet nodes use a flow control scheme to regulate the types of input traffic being transmitted through it. This scheme uses a Link Congestion Control Notification (LCCN). The LCCN is an Information Frame which regulates the traffic by precedence. The LCCN restricts the lowest precedence Internet traffic first. If congestion is not relieved the next precedence level Internet traffic is restricted. The highest precedence level traffic is Not restricted by LCCNs, this precedence is only restricted by the link layer S Frame, which stops all traffic.

The Interent node sends a LCCN to restrict routing Internet traffic when its resource utilization is greater than 60% and sends a LCCN to resume routing Internet traffic when the utilization falls below 55%. The priority Internet traffic is restricted at 70% and resume at 64% or lower. Flash Internet traffic is not restricted by the LCCN. It is noted that the LCCN does not restrict traffic that is addressed to Users attached to the Interent Node, or traffic which is addressed to the Node functions.

Internet Control Message Protocol (ICMP)

This is a comprehensive description of the Internet Control Message Protocol (ICMP). The ICMP manages and supports Internet communications. The protocol exists in the User Data Terminals (UDT), the Basic Interent Control Cards (BICC) applique, and the CIS Gateways. The MIS uses the SYSCON Message Protocol for its management of the system.

The ICMP operates over all communication links. The ICMP is a Network Layer (Layer three) function, and is independent of the Link and Physical Layers. The ICMP is the means by which the Internet regulates congestion, informs peer processes of changes in the Internet, and performs "Network Management" of the Internet.

Internet Control Message Protocol Requirements

The Interent Control Message Protocol (ICMP) requires the use of the IMPROVED User Data Protocol Internet Header. The descriptions used below are limited to the fields and functions used by the ICMP. The ICMP uses the Message Type/Protocol field to define its message types. Each ICMP Message is described with its format and content.

The ICMP extends the service of the IUDP Internet. This service includes, Error notification, Status reports, Adaptive Internet Routing and Internet Routing Update messages, Internet Congestion Control, and Internet Enquiry/Response messages.

FIG. 39 specifies the ICMP Messages using the Message Type/Protocol values. Each message is presented it the paragraphs below.

Transport Acknowledgment Message

The Transport Acknowledgment is created by the Destination Transport Control specifying the received frames of a multiple frame message. The message is addressed to the Originating Transport Control Process. This message is created when, all the frames of a multiple frame message are received, or after a timeout occurs after receiving some frames of a multiple frame message. The Originating Transport Control Process will retransmit those frames not acknowledged in the acknowledgment message.

The Table of FIG. 40 specifies the message format and contents of the Transport Acknowledgment Message. The Acknowledgment message is variable in size and immediately follows the Internet Header. The Interent Header of the Transport Acknowledgment message is built from the data extracted from the message's Internet Header. The fields that are used are specified below.

Original Message Acknowledgment Message
Originators Address Destination Address
Message Serial Number Message Serial Number
Message Precedence Message Precedence The Following Internet Header Fields in the acknowledgment message are set as follows:
 1. Security set to UNCLASS
 2. Originator Address set to the first Address in the body of the Acknowledgment message
 3. Message Type/Protocol set to "01"

Link Congestion Control Notification (LCCN)

The LCCN message is generated by Internet Routers and Internet Points when congestion thresholds are crossed. The LCCN restricts/reinstated Internet traffic by specific message precedence values. The message uses a boolean indicator for each precedence level. When the boolean is "True" the precedence is restricted, when the boolean is "FALSE" the restriction is lifted. FIG. 41 specifies the LCCN text. The Internet Router/Point is identified by the originator's Internet Address. The destination address uses the "ALL" or Broadcast address.

The information from a received LCCN is placed in the Internet Address Status table for the Internet Router/Point as specified by the Originator Address Field in the Internet Header.

If the Internet Address can not be found in the recipient's Table, then this LCCN is ignored.

It should be noted that the LCCN restriction will affect the congestion in the net by restricting the internet that can be originated by the members of the net.

NET CONGESTION CONTROL NOTIFICATION (NCCN)

When a Net Controller wants to restrict traffic in a congested net, a NCCN is generated and sent to all members in the net. The NCCN restricts the transmission of specified precedure traffic within the net. The table of FIG. 42 specifies the NCCN text.

The NCCN is addressed using the global Internet Address. Recipients of the NCCN adjust their message queues to enable/disable the processing of the precedence levels as specified in the NCCN. The NCCN ignores the originator address in the NCCN's Internet Header is not the designated Net Controller.

It should be noted that the NCCN will affect all internet traffic on the net. Internet Points that are members of the affected net are regulated by the NCCN.

INTERNET NODE QUERY MESSAGE

The Internet Node Query Message is sent to Internet Routers and Internet Points when insufficient traffic is present to determine the operational status of the Internet Node. This message is normally sent by the Net Controller. The message can be generated either on demand or automatically on an event basis. The query message is a Header only message addressed to one or more Internet Routers/Points. Each recipient shall respond to the originator of the query message with a LCCN, specifying its status. The lack of any response in an "All Informed" net shall indicate a Failed Internet Node.

Retries of the query message can be attempted to resolve this issue in a "Relay" net where link layer acknowledgments are not received by the originator.

Internet Status Report Message

There are two basic Statue Reports that are provided by the Internet Nodes, the Node Status Report and the Internet Route Report. The Node Status Report provides the following information:

1. Number of message frames transmitted and Received
2. The average and peak number of frames in the transmit queue
3. The percentage of net usage (Net in use voice & data)

The Interent Route Report specified the usage of internet routes. This includes the number of times each route has been used.

The Status Report is sent either upon request or under Alarm condition. The Alarm condition is activated when established thresholds are exceeded. FIGS. 43 and 44 show the table of conditions for REPORT TEXT & HEADER.

Internet Status Report Format

The Internet Status Report is generated by Internet Nodes and reflect status data for each internet interface. The Internet Header indicated the originating node, while the text of the report indicates each internet interface and the status data based on its perspective.

The TABLE format of FIG. 45 uses a two (2) net report as an example. Nodes which interface to more than two nets use the same format. The text just contains more than two entries.

Internet Route Report Format

The Internet Route Report contains a list of the nets (NIS'), a usage flag, and a count of the number of frames that were addressed to that NIS. This report is requested and provides management with internet traffic patterns. Unused internet routes can be removed and heavily used routes can be provided with alternate routes. FIG. 46 shows a TABLE depicting the ROUTE REPORT TEXT.

User Registration Messages

The User Registration messages are exchanged between Net Controllers and the CIS Gateway and the Net Controller and the Net Members. When a user moves into a net and registers (voice contact) with Net Controller the Net Controller adds the User to the Net Members List, distributes the addition to the net members and sends the User Registration message to the Gateway.

The Gateway upon receipt of the User Registration message attempts to update the User's Home Net, and if the user was already in another net, de-register the user. The Gateway finds the user's User-Id in its "Home" net members list, extract an existing Out-of-Net NIS if present. The Gateway updates its copy of the Net Members List, and forwards a Change User Registration message to the home net specifying the New Out-of-Net NIS. If the user was in another net, the Gateway forwards a De-registration Message to the Net Controller of the previous Out-of-Net NIS. Each Net Controller updates the Net Members List and distributes the change using the appropriate Registration message.

The three registration message types are: Register, De-register, and Change Registration. Table 41 shows the FIELDS VALUE/RANGE & DESCRIPTION OF THE REGISTRATION TEXT HEADER.

After a user registers in a net, the Net Controller updates/loads the net's data base to the user using the SYSCON message protocol.

System Control (SYSCON) Message Protocol

This is a functional description of the System Control (SYSCON) Message Protocol. The SYSCON supports Internet communications. The protocol exist in the User Data Terminals (UDT), the BASIC Internet Control Cards (BICC) applique, the CIS Gateways and the MIS Terminals. SYSCON is considered to be an application layer function; however, because the Internet layers generate SYSCON message, the basic formats and structures are defined in this document. The Internet uses the SYSCON Message protocol to report events and Internet conditions to the MIS manager. This description does not attempt to define the detail messages, or processing procedures for SYSCON. This description does define the functional message types and the overall format for SYSCON messages without specific implementation details.

All SYSCON messages interface with the Internet through the Transport Layer. The Internet event handlers that generate SYSCON messages shall envoke the Transport Layer to introduce the SYSCON message in to the network. It should be noted that while the Internet generates SYSCON messages, it is not a target or destination of SYSCON messages. The Internet uses the ICMP for peer to peer communication.

The SYSCON Message Protocol is an application which uses the IMPROVED User Data Protocol as its communication link between the controlling entity and the functions which receive and process the SYSCON messages. SYSCON shall interface through the IUDP through the Transport Layer and shall be independent of the Link and Physical layers.

Syscon Message Protocol Requirements

The SYSCON Message Protocol requires the use of the IMPROVED User Data Protocol Internet Header. The Internet Header is described later. The descriptions used below are limited to the fields and functions used by the SYSCON Messages. The SYSCON uses the Message Type/Protocol field to define its message types. The SYSCON message is the interface for the administration and control of the communication system, and the reporting of events and conditions by the Internet to the MIS. The SYSCOM message service includes, Table and Data Base management, including initial data base loading, Error Notification, Status Reports, Non-Adaptive Routing and Routing Override Table Update messages, and Enquiry/Response messages.

FIG. 48 depicts a table which specifies the SYSCON Message types using the Message Type/Protocol values. Each message class contains its own messages which shall be defined for each implementation.

Syscon Directives

FIG. 49 is a TABLE which specifies the format of the Text Header for SYSCON directives and FIG. 50 defines the Directive text format. SYSCON processing uses the originator address, message precedence, message serial number, and destination address fields of the Internet Header. These fields are used to qualify and validate the message. SYSCON Directives can use any of the precedence levels. The precedence should be selected based on the urgency of the directive.

Syscon Alarms & Notifications

FIG. 51 is a Table which specifies the format of the SYSCON Alarm & Notification Text Header and FIG. 52 is a Table which defines the Alarm & Notification Text Format. SYSCON processing establishes the originator address, message precedence, and destination address(es) in the Internet Header. Alarms should use the Network Precedence level, while notifications should use the lower precedence levels.

FIG. 53 is a Table which specifies the format of the SYSCON Report Text Header and FIG. 54 defines the Report Text Format. SYSCON processing establishes the originator address, message precedence, and destination address(es) in the Internet Header. Reports should NOT use the Network Precedence level.

Syscon Acknowledgments

FIG. 55 is a Table which specifies the SYSCON Acknowledgment Text Header. If the acknowledgment specifies Not Implemented, then the Acknowledgment Text is required as a specified in FIG. 56. The Acknowledgment Message shall use the same precedence level found in the Directive. The destination is set to the originator of the directive and the Message Sequence Number shall be the same as that used in the directive.

Origination Transport Control

The transport control accepts an Internet Header and message text. If the text portion exceeds the frame size specified in the System Classmarks, then multiple frames are created using the Internet Header in each frame along with up to the specified number of bytes of text. This process continues until the input text is completely processed.

These frames are passed to Network Layer (layer 3) for routing and output into the network. A table is built for each addressee in the message and a timer is started. This timer is set for a wait time for the peer transport control to acknowledge ALL the frames of this message. When the timer expires the frames NOT acknowledged are then retransmitted through layer 3. At this time the transport control window contains ALL message frames.

The timeout period and the maximum number of retransmissions are established in the System Classmarks.

Destination Transport Control

The transport control accepts message frames from layer 3. A table is built for each originator/message serial number combination. A timer is started to time the wait period for all the frames. This timer is the maximum wait time as the total number of frames is not known until the last frame has been received. The timer value is defined in the System Classmarks.

The frames are accumulated and sorted by frame number. When all the frames are received an acknowledgment message is sent to the peer process at the originating User-Id. If the timer expires prior to receiving all the frames, an acknowledgment is sent to those frames that have been received, and a new timer is started. The peer process should retransmit those frames not in the acknowledgment. If the timer expires again without receiving any of the missing frames, the accumulated data is discarded and a receive log entry is created indicating that an aborted process has occurred. If additional frames are received the process continues until either a complete message is received or an abort timeout occurs.

Completed messages are reassembled into a single unit consisting of an Internet Header and the message text. This complete message is then passed to the application using the Message Type/Protocol field.

Transport Acknowledgment Message

The ICMP message was described above and functions as the transport acknowledgment message.

Presentation Layer Processing

The presentation layer accept addressing data and message text from the user/application layer. The addressing data, if symbolic in nature is converted to internal encoding and merged with other message classmarks such as precedence, security, and message types.

The presentation layer provides a system service of extending the Internet Header with Global Positioning System data, if present, for its peer process at the destinations. If the peer process accumulates position data, this information is extracted for the positioning "module". If the peer process does not accumulate positioning data, then the data is ignored. In either case the actual text of the message is passed to the application.

Presentation Layer Processing

The presentation layer accept addressing data and message text from the user/application layer. The addressing data, if symbolic in nature is converted to internal encoding and merged with other message classmarks such as precedence, security, and message types.

The presentation layer provides a system services of extending the Internet Header with Global Positioning System data, if present, for its peer process at the destinations. If the peer process accumulates position data, this information is extracted for the positioning "module". If the peer process does not accumulate positioning data, then the data is ignored. In either case the actual text of the message is passed to the application.

This GPS data is extracted from the application data base when present and is stored in the GPS Field of the Layer 6 Internet Header. The GPS Field follows the last destination addressee in User Defined message types. The GPS Data is variable and the format is specified by the GPS Flag. The GPS Flag specifies the type, size, and format of the GPS data. The GPS FLAG indicates one of the following:

1. NONE There is no GPS data
2. TYPE 1=Latitude/Longitude (Degrees, Minutes & Seconds)
3. TYPE 2=Latitude/longitude (Degrees & Minutes)
4. TYPE 3=Universal Transverse Mercator (UTM)
5. TYPE 4=Military Grid Reference System (MGRS)

FIG. 57 depicts the Internet Header with respect to the Presentation Layer (Layer 6) and the lower Internet layers (Layers 4, 3, & 2). It should be noted that the figure depicts an Internet Header for a User Defined Message, that is the message type/protocol field is within the range of 41 through 60. System Control (SYSCON) and Internet Control Message Protocol (ICMP) do NOT contain the GPS Field.

This Presentation process builds the Internet Header, the Global Positioning System data, and combines them with the specified text into a contiguous data unit which is passed to Transport Layer. It should be noted that if the Transport Layer segments the message into multiple frames, the GPS Field is not copied into every frame. The transport treats the GPS as message text.

The Transport layer passes received messages to a presentation layer based on the Message Type/Protocol disposition specified in the routing tables. The presentation layer shall have final disposition of the message to the user application layers.

System Control (SYSCON) Applications

The SYSCON applications performs directive execution and acknowledgment, report generation, Inquiry and Response processing. These application module interface with the Transport Layer. SYSCON applications provide the Network management in conjunction with the operator, the NIS and the Network Layer Internet Control Message Protocol. The SYSCON applications also interface with the Man/Machine Interface modules on systems that have operator positions.

X.21 Half Duplex Physical Layer

This Physical layer is a half duplex variation of an X.21 point-to-point connection. The "C" circuit of X.21 is a transmit request (PTT) from the DTE to the Radio (DCE). The "I" circuit of X.21 is a "BUSY" indicator from the radio (DCE) to the DTE. This "BUSY" indicator may indicate receive data. When there is data for the DTE the radio provides CLOCK to the DTE which brings in the data. When the data transfer to the DTE is complete, both the "I" and CLOCKS will be disabled. If CLOCKS never occur while the "I" is enabled, the radio is BUSY processing VOICE or is NOT Available/Present.

FIG. 58 shows a state chart of a Half duplex interface between two DCES or radio 85 and 86 and communicating interfacing with DTEs.

X.21 Full Duplex Physical Layer

The X.21 full duplex physical layer shall be a full duplex point-to-point circuit. This circuit can operator at either 16 KBPS or 32 KBPS, and the DCE shall provide clock for both the transmit and receive data. The "C" and "I" circuits are used to indicate the presence of DTE and DCE respectively.

Figure 59:
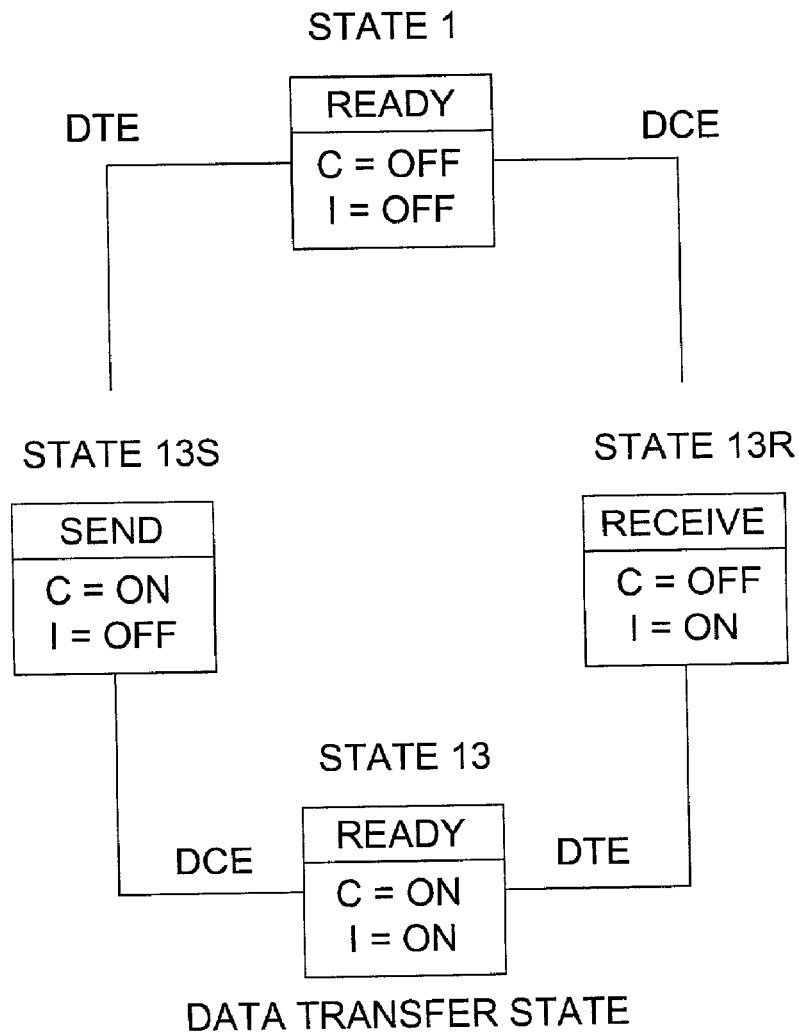
FIG. 59 is another state diagram showing a connection between a DCE and a DTE.

The state chart of FIG. 59 depicts the Full Duplex X.21 interface between two Stations (DCE/DTE).

EXAMPLES OF PROTOCOL ENCAPSULATION

Encapsulation of X.25 Packets

Figure 61:
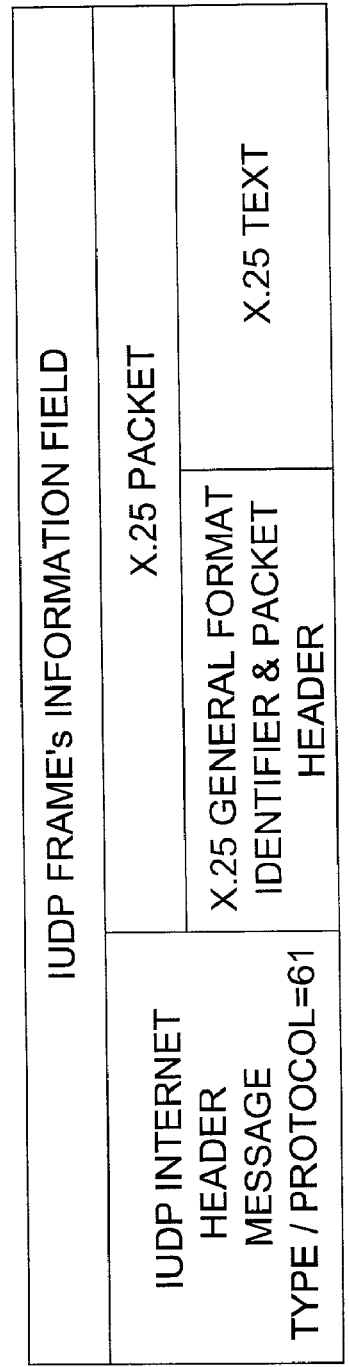
FIG. 61 is a table showing the IMPROVED protocols frame information field.

FIG. 61 shows an encapsulated X.25 Packet.

Asynchronous Physical Layer

The Asynchronous Physical Layer is a full duplex, eight (8) bit characters, with or without parity, operating in a range of 1,200 to 9,600 BPS. Every asynchronous transmission is proceeded with the asynchronous preamble of "SYN SYN SI XXXX CR", where:

SYN is the ASCII Sync character

SI is the ASCII SI Character

XXXX is the number of Bytes/Octets in four (4) ASCII Numeric Characters. This is the number of Octets in the link layer frame. The Valid range of XXXX is two (0002) through Maximum Frame size as established in the System Classmarks.

CR is the ASCII Carriage Return Character.

The link layer frame follows the carriage return. This includes the frame Address, Control, & Information fields. It should be noted that both the Full Duplex and the Half Duplex Point-to-Point Link Layers can be carried by this Physical layer. The Frame Check Sequence for the asynchronous layer is Not used. The Link layer frame is followed by the asynchronous checksum. This checksum is a two (2) octet field which contains the addition of all the octets in the Link layer frame.

Figure 60:
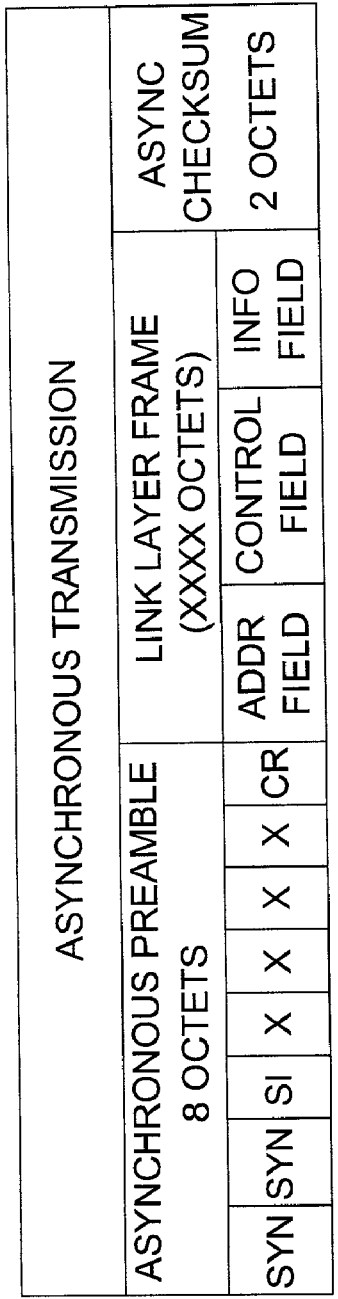
FIG. 60 is a table showing an asynchronous transmission.

It should be noted that this interface requires two (2) SYN characters, additional SYN characters are ignored. The following Figure depicts the Asynchronous transmission format. Each subfield in the preamble is 1 octet (ASCII Character) with the character parity bit being ignored. The value of X=is the decimal number of octets in the link layer frame. The sub fields of the link layer frame are as specified in the other Full Duplex frame formats, with the exception of the FCS as described above. FIG. 60 is a table showing asynchronous transmission.

Encapsulation of X.25 Packets

FIG. 61 shows an encapsulated X.25 Packet.

The X.25 General Format Identifier specifies the X.25 Packet Type. The Types are listed below:

Call Set-up Packets

Clearing, flow control, interrupt, reset, restart, registration and diagnostic packets Data Packets The individual packet types are specified by the "Packet Type Identifier" in the X.25 Header. The X.25 packet level is well known and well documented.

FIG. 62 shows the encapsulation of an IP Packet.

FIG. 63 shows the encapsulation of a TCP header followed by its upper layer data.

What is claimed is:

1. A transmission frame for transporting information in a plurality of interconnected communication networks including a plurality of communication nodes, wherein an originating node of said transmission frame belongs to a home network corresponding to one of said plurality of interconnected communications networks, said frame comprising:

a message field containing message information; and a plurality of destination node addresses to facilitate transmission of said frame to different destination nodes, wherein each destination node address identifies a different final destination in the plurality of interconnected communication networks to receive said frame transmitted by said originating node, and wherein said frame supports said destination node addresses in the form of local home network addresses and extended network addresses indicating networks other than said home network;

an extended network identifier selectively included within said frame for said destination node addresses to identify a network for a corresponding destination node address other than said home network of said originating node to which to send the message information; and an extended address indicator indicating the presence of said extended network identifier for corresponding destination node addresses.

2. The transmission frame of claim 1, further comprising an originator's address identifying an originator of the message information.

3. The transmission frame of claim 1, further comprising a maximum hop indicator indicating a maximum number of transmissions of the message information to reach one of the destination nodes.

4. The transmission frame of claim 1, further comprising a precedence indicator indicating a level of priority for scheduling transmission of the message information across the interconnected networks.

5. The transmission frame of claim 1, further comprising a security indicator indicating a level of security for the message.

6. The transmission frame of claim 1, further comprising a message delivery status indicator associated with one of the plurality of addresses indicating if the message information was sent to said address.

7. The transmission frame of claim 1, wherein at least one of the plurality of addresses comprises a home network identifier and an identifier of a terminal device within the home network.

8. The transmission frame of claim 1, further comprising a user-defined indicator for use by an application layer process.

9. The transmission frame of claim 1, further comprising an end of routing indicator identifying the last of the plurality of addresses in the transmission frame.

10. The transmission frame of claim 1, further comprising an acknowledgement indicator indicating a disposition of the message information.

11. The transmission frame of claim 10, wherein the acknowledgement indicator indicates that the message information is received by a user at one of the plurality of addresses.

12. The transmission frame of claim 10, wherein the acknowledgement indicator indicates that the message information is read at one of the plurality of addresses.

13. The transmission frame of claim 10, wherein the acknowledgement indicator indicates that the message information is printed at one of the plurality of addresses.

14. The transmission frame of claim 1, wherein at least one destination node is a radio.

15. A method of routing a message addressed to a plurality of addressees among a plurality of interconnected communication networks having a plurality of communication nodes, wherein the message is included within a transmission frame having a header containing the plurality of addresses, and the transmission frame is located at one of the plurality of communication nodes, the method comprising:
   determining if any of the plurality of addresses contained in the header corresponds to a device serviced by the communication node;
   determining a routing disposition for the plurality of addresses contained in the header that do not correspond to the device serviced by the communication node;
   generating a new header containing addresses among the plurality of addresses determined not to correspond to the device serviced by the communication node and that have the same routing disposition; and
   transmitting a new transmission frame containing the message and the new header according to the determined routing disposition for the addresses contained in the new header.

16. A method of routing a message addressed to a plurality of addressees among a plurality of interconnected communication networks having a plurality of communication nodes, wherein the message is included within a transmission frame having a header containing the plurality of addresses each associated with a corresponding delivery indicator and the transmission frame is located at one of the plurality of communication nodes the method comprising:
   determining if any of the plurality of addresses contained in the header corresponds to a device serviced by the communication node;
   determining a routing disposition for the plurality of addresses contained in the header that do not correspond to the device serviced by the communication node;
   setting the delivery indicator of an address to which the message is delivered; and
   transmitting the transmission frame according to the determined routing disposition for the addresses with delivery indicators not set.

17. The method of claim 15, wherein the routing disposition is determined according to routing information available at the communication node.

18. The method of claim 15, wherein the routing disposition for the plurality of addresses is determined only for the plurality of addresses to which the message has not been sent.

19. The method of claim 18, wherein the header contains information indicating to which of the plurality of addresses the message has been sent.

20. A communications node in a network interconnected with a plurality of communication networks, the communications node routing a message addressed to a plurality of addressees, the message being contained in a transmission frame that includes a header containing the plurality of addresses, the communications node comprising:
   means for examining the plurality of addresses in the header;
   means for sending the message to a terminal device within the network containing the communication node if one of the plurality of addresses in the header corresponds to the terminal device;
   means for determining a routing disposition for the plurality of addresses in the header that do not correspond to the terminal device; and
   means for generating a new header containing addresses among the plurality of addresses determined not to correspond to the terminal device and that have the same routing disposition; and
   means for transmitting a new transmission frame containing the message and the new header, according to the determined routing disposition for the addresses contained in the new header.

21. The communication node of claim 20, wherein the means for sending the message to the terminal device is a radio transmitter.

22. The communication node of claim 20, wherein the means for determining a routing disposition is a network router with a routing table.

23. A communication node in a home network interconnected with a plurality of communication networks, for processing a transmission frame having a message and a header containing a plurality of destination addresses, the communication node comprising:
   a home network routing table having recorded therein addresses of terminals in the home network;
   an internetwork routing table having recorded therein routing information for routing messages destined for at least one of the plurality of networks;
   a router, coupled to the home network routing table and the internetwork routing table, the router identifying as a home address an address among the plurality of destination addresses in the header that is present in the home network routing table, and determining a routing disposition for addresses among the plurality of destination addresses that are not present in the home network routing table, wherein the routing disposition is determined based on the routing information recorded in the internetwork routing table; and
   a transmitter coupled to the router, sending the message to terminals in the home network having addresses identified by the router as home addresses generating a new transmission frame including the message and the addresses having the same routing disposition determined by the router, and outputting the new transmission frame in accordance with the routing disposition.

24. A communication node in a home network interconnected with a plurality of communication networks, for processing a transmission frame having a message and a header containing a plurality of destination addresses, the communication node comprising:
- a home network routing table having recorded therein addresses of terminals in the home network;
- an internetwork routing table having recorded therein routing information for routing messages destined for at least one of the plurality of networks; and
- a router, coupled to the home network routing table and the internetwork routing table, the router identifying as a home address an address among the plurality of destination addresses in the header that is present in the home network routing table, and determining a routing disposition for addresses among the plurality of destination addresses that are not present in the home network routing table, wherein the routing disposition is determined based on the routing information recorded in the internetwork routing table;
- wherein each of the plurality of destination addresses in the header has a delivery indicator indicating if the message has been sent toward the corresponding destination address, the communication node further comprising a transmitter, coupled to the router, sending the message to a terminal in the home network having an address identified by the router as a home address, setting the delivery indicator for the address identified as a home network address, and in accordance with the routing disposition sending the message to addresses in the header that do not have delivery indicators set.

25. The communication node of claim 23, wherein the communication node is included in a radio.

26. An originating terminal in a plurality of interconnected communication networks, wherein said originating terminal belongs to a home network corresponding to one of said plurality of interconnected communications networks the originating terminal comprising:
- a message generation device generating a message for delivery to a plurality of destination terminals in the interconnected networks each serving as a final destination for the message;
- a network interface device coupled to the message generation device, and in response to receiving the message, generating a transmission frame having a message and a header including: addresses each identifying a different one of the plurality of destination terminals to receive said message, wherein said header supports said addresses in the form of local home network addresses and extended network addresses indicating networks other than said home network; an extended network identifier selectively included within said header for said addresses to identify a network for a corresponding destination terminal other than said home network of said originating terminal to which to send the message information; and an extended address indicator indicating the presence of said extended network identifier for corresponding addresses; and
- a transmitter coupled to the network interface device, transmitting the transmission frame to a communication node in one of the interconnected networks for routing to each of the different destination terminals identified by said addresses.

27. A method of generating a message addressed to a plurality of terminals among a plurality of interconnected communication networks, wherein an originating terminal of said message belongs to a home network corresponding to one of said plurality of interconnected communications networks, the method comprising:
- generating a message for delivery to the terminals each serving as a final destination for the message;
- generating a header including: a plurality of addresses each identifying a different one of the terminals to receive the message, wherein said header supports said addresses in the form of local home network addresses and extended network addresses indicating networks other than said home network; an extended network identifier selectively included within said header for said addresses to identify a network for a corresponding destination terminal other than said home network of said originating terminal to which to send the message information; and an extended address indicator indicating the presence of said extended network identifier for corresponding addresses; and
- transmitting a transmission frame including the header and the message to a communication node among the plurality of communication networks for routing to each of the different addressed terminals.

28. The method of claim 27, wherein generating the header includes generating the plurality of addresses having said local home network address identifying a terminal within one of the plurality of interconnected networks, and said extended network address identifying said one of the plurality of interconnected networks containing said terminal.

29. A program product apparatus including a computer-readable medium with computer program logic recorded thereon, comprising:
- program instructions for examining a header of a transmission frame, the header containing addresses of a plurality of destination terminals among a plurality of interconnected communication networks;
- program instructions for determining if any of the addresses contained in the header corresponds to a terminal connected to a home network, wherein an address for the terminal connected to the home network is recorded in a home network routing table;
- program instructions for determining a routing disposition for the addresses in the header that do not correspond to a terminal in the home network;
- program instructions for generating a new header containing addresses among the plurality of addresses determined not to correspond to the terminal and that have the same routing disposition; and
- program instructions for transmitting a new transmission frame containing the message and the new header, according to the determined routing disposition for the addresses contained in the new header.

30. A method of receiving a message within a plurality of interconnected communications networks, the message being transmitted by an originating node in a plurality of frames, wherein said originating node belongs to a home network corresponding to one of said plurality of interconnected communications networks, the method comprising:
- receiving and storing a first message frame transmitted by said originating node at a receiving node within said interconnected communications networks, wherein each message frame includes: a frame sequence number; an originator's address; a plurality of destination addresses, wherein said message frame supports said addresses in the form of local home network addresses and extended network addresses indicating networks other than said home network; an extended network identifier selectively included within said frame for said addresses to identify a network for a corresponding destination other than said home network of said originating node to which to send the message information; and an extended address indicator indicating the presence of said extended network identifier for corresponding addresses;
receiving a second message frame at said receiving node;
comparing an originator's address in the second frame with an originator's address in the first frame; and
ordering the first and second frames based on the frame sequence numbers in the first and second frames in response to the first and second frames including the same originator's address.

31. The method of claim 30, wherein each frame of the message includes a delivery indicator associated with each of the destination addresses, the method further comprising setting the delivery indicator of one of the destination addresses if the frame is delivered to said destination address.

32. The method of claim 30, further comprising determining if one or more frames of the message are not received at a destination address, and requesting retransmission of only those frames.

33. The method of claim 32, wherein the determining if a frame of a message is not received and requesting retransmission of the frame is performed in a transport layer of a set of communication protocols.

* * * * *